United States Patent
Sadanaka et al.

(10) Patent No.: US 7,150,032 B1
(45) Date of Patent: Dec. 12, 2006

(54) ELECTRONIC APPARATUS AND CONNECTION MODE SETTING METHOD

(75) Inventors: Kazue Sadanaka, Tokyo (JP); Satoshi Kobayashi, Tokyo (JP); Futoshi Kaibuki, Tokyo (JP); Hiroshi Utsunomiya, Chiba (JP); Yuji Kimura, Kanagawa (JP); Kazuhiro Suzuki, Kanagawa (JP); Kenji Matsuoka, Kanagawa (JP); Masahiko Sato, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1236 days.

(21) Appl. No.: 09/698,992

(22) Filed: Oct. 27, 2000

(30) Foreign Application Priority Data

Oct. 29, 1999  (JP)  ............................... P11-308166
Dec. 9, 1999  (JP)  ............................... P11-350077

(51) Int. Cl.
*H04N 7/18* (2006.01)

(52) U.S. Cl. ........................................ 725/80; 725/141

(58) Field of Classification Search ................ 725/133, 725/141, 153; 709/226, 228, 229; 710/1, 710/14, 100
See application file for complete search history.

(56) References Cited

FOREIGN PATENT DOCUMENTS

| EP | 0 682 430 | 11/1995 |
|---|---|---|
| EP | 0 766 428 | 4/1997 |
| EP | 0 921 472 | 6/1999 |
| EP | 0 930 747 | 7/1999 |
| EP | 0 940 946 | 9/1999 |

*Primary Examiner*—John Miller
*Assistant Examiner*—Christopher Lambrecht
(74) *Attorney, Agent, or Firm*—Frommer Lawrence & Haug LLP; William S. Frommer

(57) ABSTRACT

When a connection mode change setting instruction input entered by a user is supplied to the control unit 20, the control unit 20 controls the IEEE 1394 I/F circuit to set the value of oPCR and iPCR of an electronic apparatus for forming a channel so that the channel between target electronic apparatus is formed in the connection mode instructed by the user. Thereby, a channel between electronic apparatus is formed flexibly and an information output apparatus that is capable of forming a convenient electronic apparatus network is provided. One electronic apparatus connected to the digital bus inquires of an electronic apparatus connected to the digital bus whether it is a monitor apparatus (first receiving apparatus) that receives the data mainly through a channel formed in the broadcast connection mode or not, and channels connected in the broadcast connection mode are allocated to monitor apparatus respectively. A receiving apparatus other than the monitor apparatus forms a channel of the PtoP mode avoiding the channel of the first connection mode allocated to the first receiving apparatus, and receives supply of the data. As the result, a transmission line using method, an information transmission system, and an electronic apparatus that are capable of utilizing a plurality of channels on the digital bus efficiently, and capable of providing the convenient digital content using environment are realized.

50 Claims, 32 Drawing Sheets

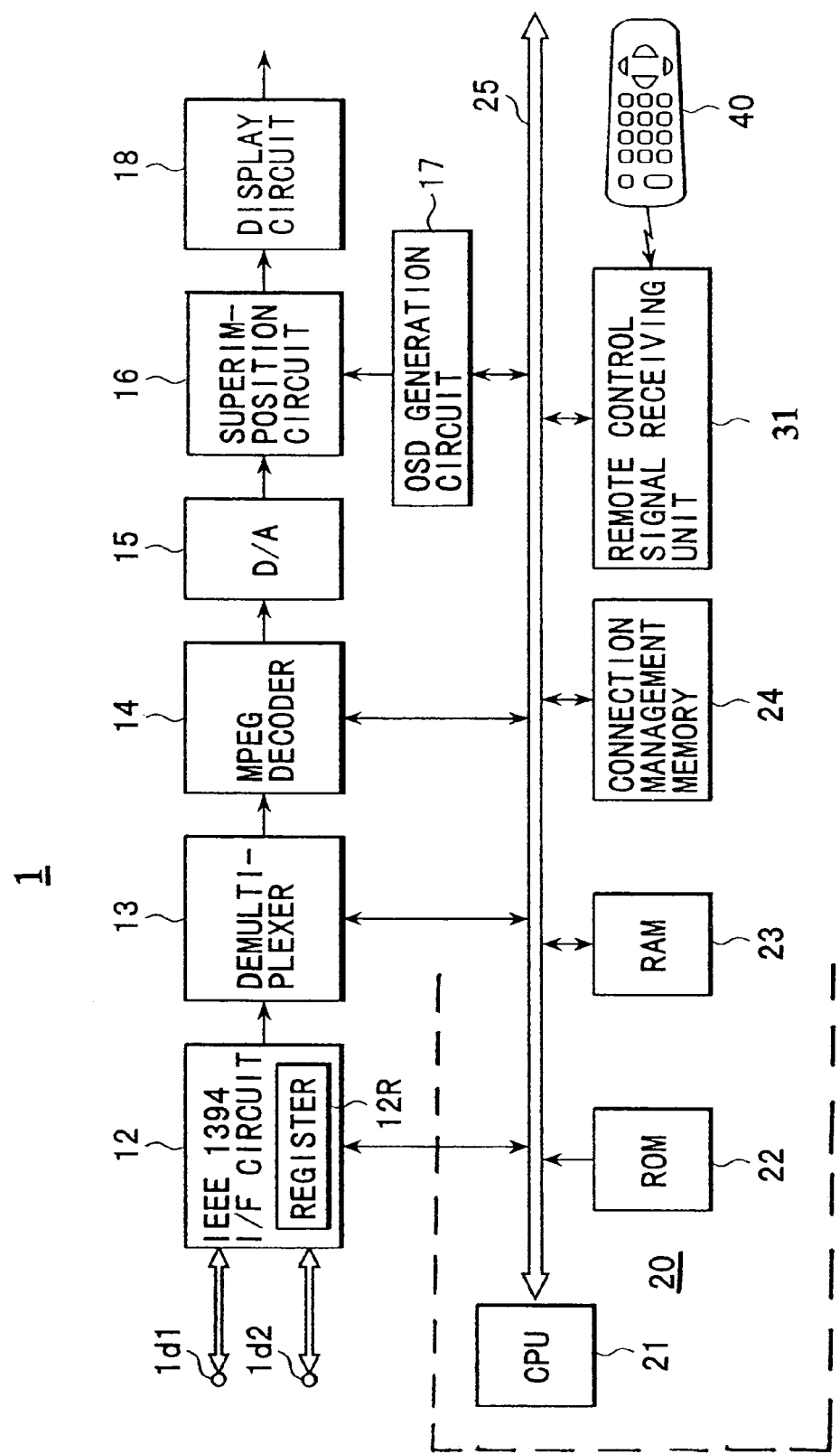

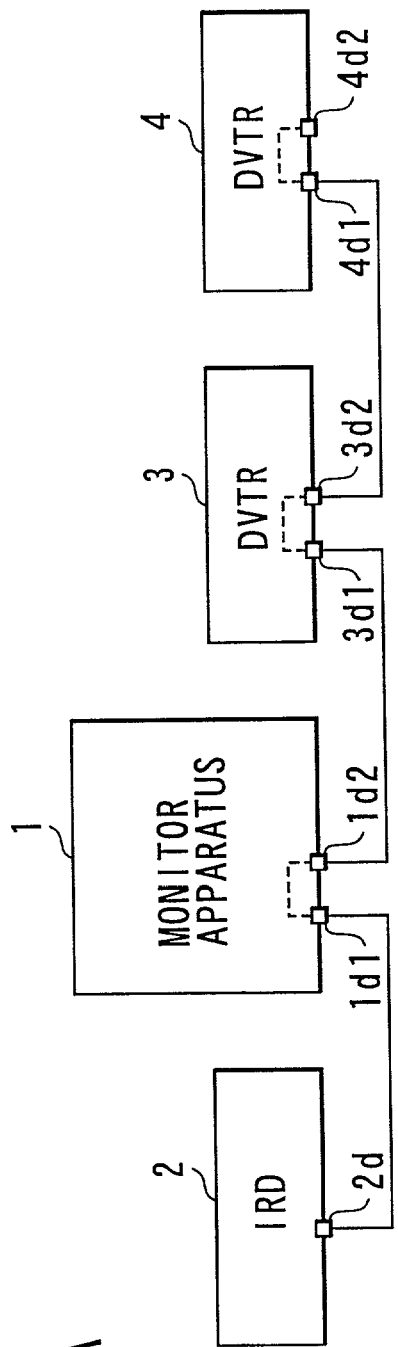
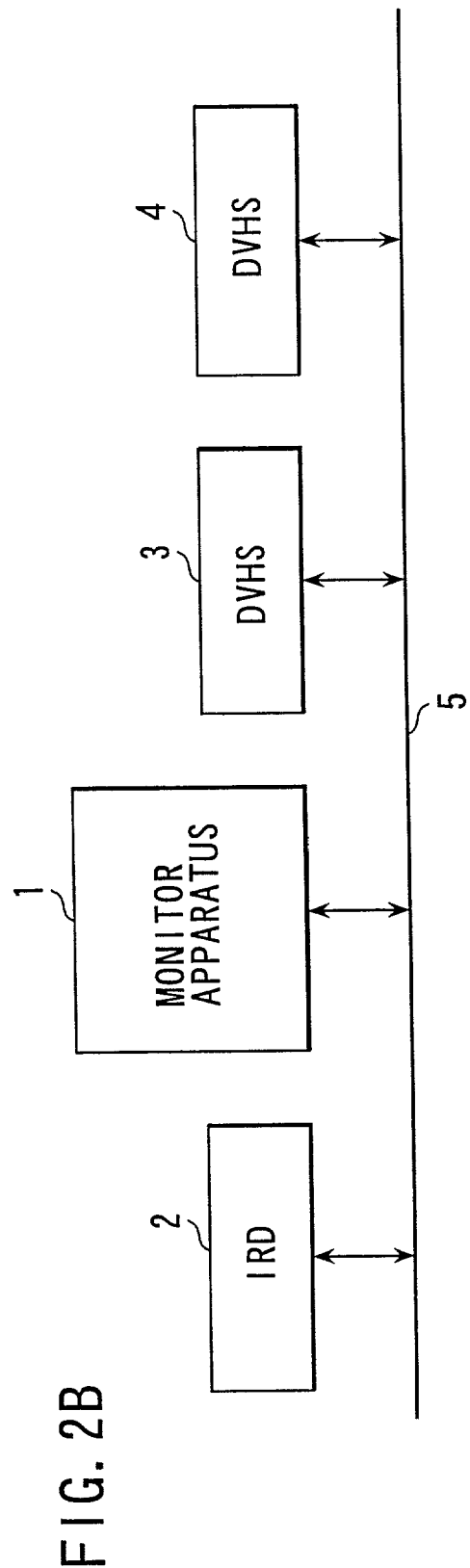
FIG. 2A
FIG. 2B

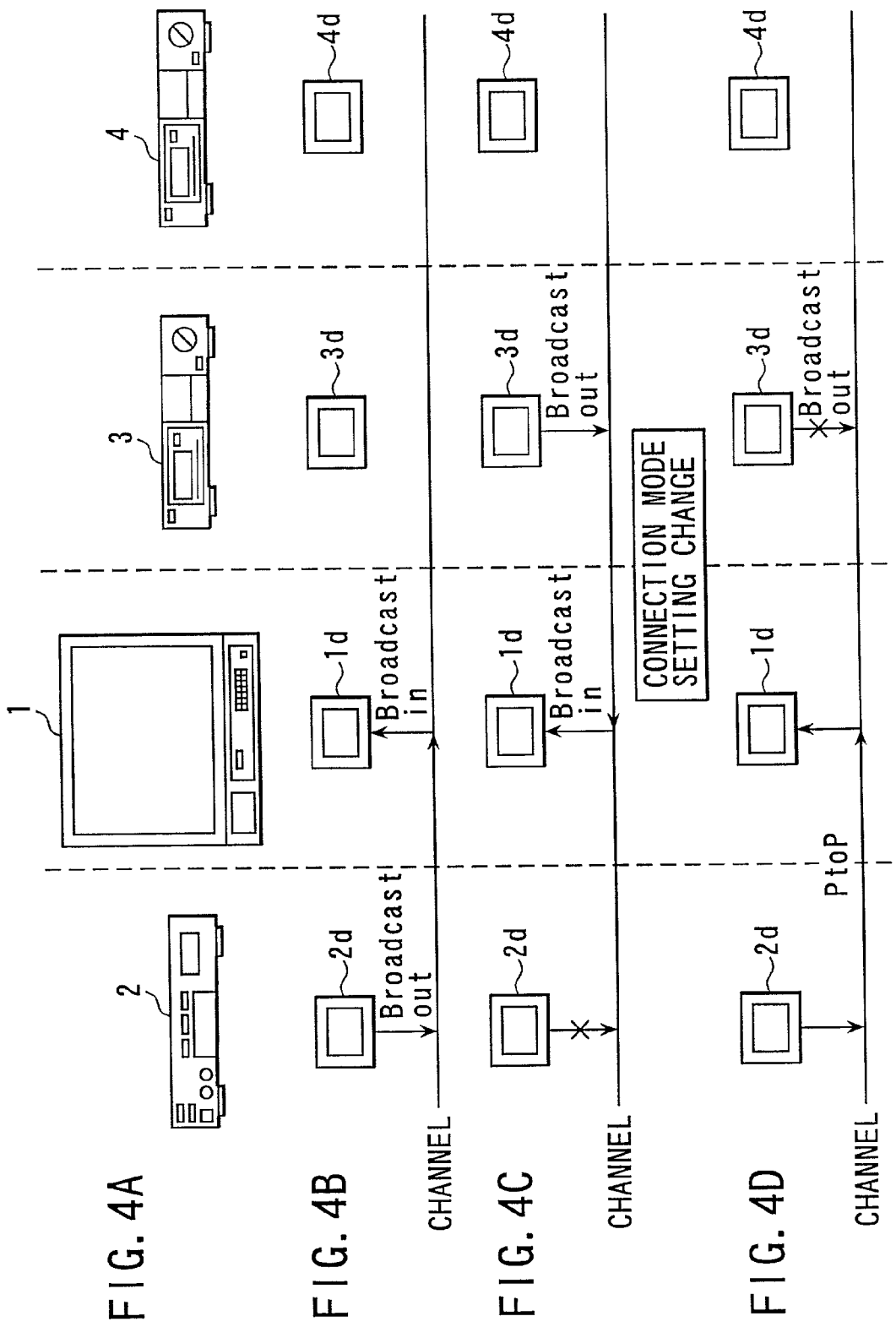

FIG. 5A

CONNECTION TABLE FORMED IN MONITOR APPARATUS
(BEFORE CHANGING)

| TARGET APPARATUS (OUTPUT APPARATUS) | CONNECTION MODE TO THIS APPARATUS |
|---|---|
| IRD | BROADCAST |
| DVTR No.1 | |
| DVTR No.2 | |
| ⋮ | ⋮ |

FIG. 5B

CONNECTION TABLE FORMED IN MONITOR APPARATUS
(AFTER CHANGING)

| TARGET APPARATUS (OUTPUT APPARATUS) | CONNECTION MODE TO THIS APPARATUS |
|---|---|
| IRD | PtoP |
| DVTR No.1 | |
| DVTR No.2 | |
| ⋮ | ⋮ |

FIG. 17

TRANSMISSION APPARATUS REGISTER

| CHANNEL | iPCR | | oPCR | |
|---|---|---|---|---|
| | BC | PtoP | BC | PtoP |
| 63 | | | | 1 |
| 62 | | | | |
| 61 | | | | |
| ... | | | | |
| 0 | | | | |

RECEIVING APPARATUS REGISTER

| CHANNEL | iPCR | | oPCR | |
|---|---|---|---|---|
| | BC | PtoP | BC | PtoP |
| 63 | | 1 | | |
| 62 | | | | |
| 61 | | | | |
| ... | | | | |
| 0 | | | | |

CHANNEL No. 63 (PtoP CONNECTION)

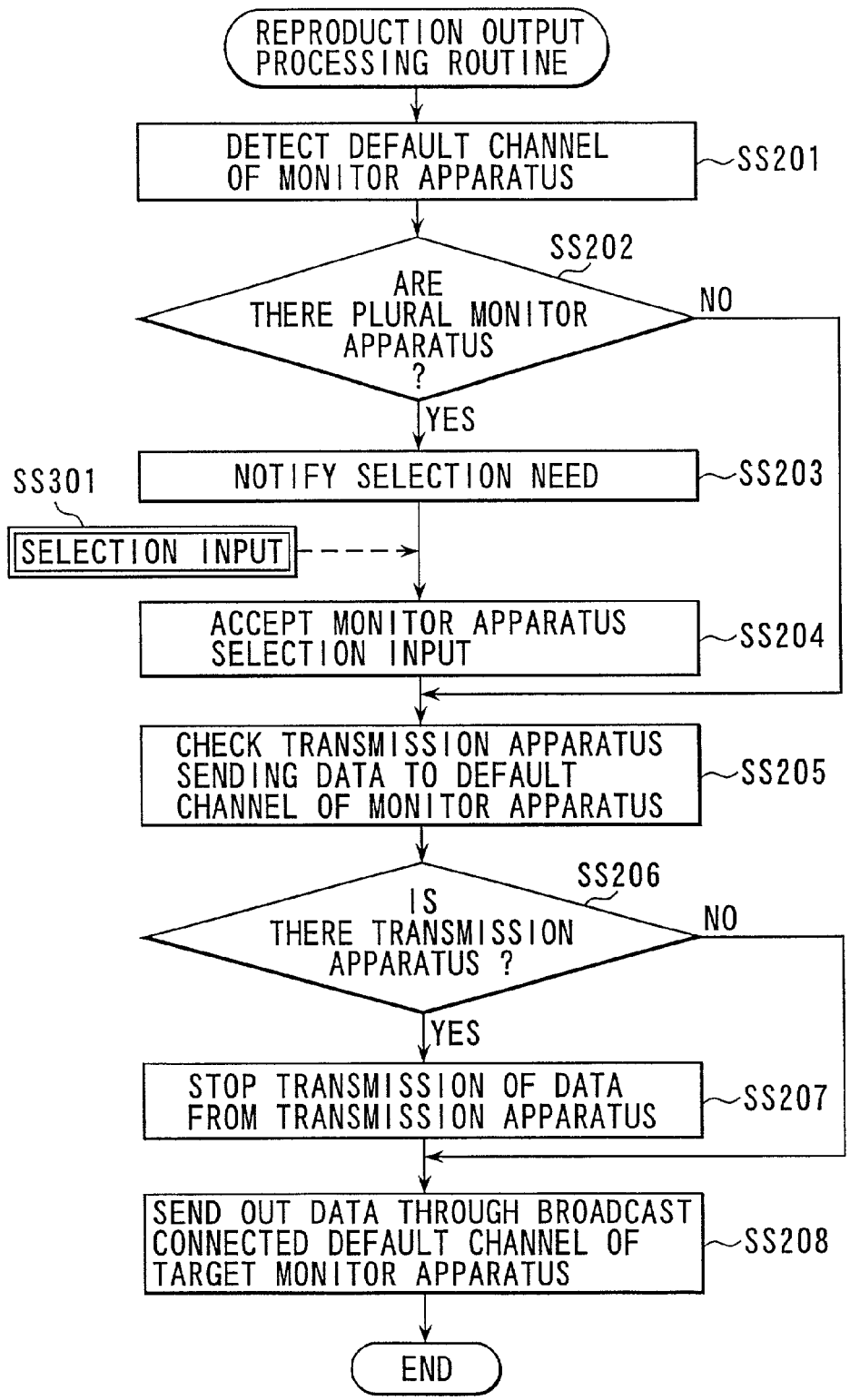

ELECTRONIC APPARATUS AND CONNECTION MODE SETTING METHOD

BACKGROUND OF THE INVENTION

1. Field of the Invention

This invention relates to an electronic apparatus for being connected to a digital bus of, for example, the IEEE 1394 standard, and a method for setting connection mode to be used when a transmission line is formed between electronic apparatus connected to the digital bus.

2. Description of Related Art

Recently, abundant various digital contents have been become available through the communication media such as broadcasting media and Internet or by way of various recording media such as DVD (digital vide disk). In association with the popularization of digital contents, various home-use digital audio visual apparatus (referred to as digital AV apparatus hereinafter) such as digital broadcast receivers so-called IRD (Intelligent receiver device) having a digital interface, digital television digital monitors, DVTR (digital video tape recorder), and DVD players have been become available.

Various digital AV apparatus having a digital interface are connected through a digital bus in home to form a network to thereby widen the usage range of digital contents that have been become available abundantly and to thereby arrange the easy-to-use environment of digital contents for users.

Various digital interfaces have been available. Among these digital interfaces, the digital serial interface according to IEEE 1394 standard standardized by IEEE (American Electric Electronic Association) that is capable of high rate transfer of digital video signal and digital audio signal that require real time transfer to which IEC 61883-1 standardized standard is applied has attracted attention.

In the present specification, the IEEE 1394 standard digital serial interface to which IEC 61883-1 standardized standard is applied is simply referred to as IEEE 1394 standard digital interface.

In the IEEE 1394 standard digital interface, when a channel (transmission line) between electronic apparatus connected to a digital bus is formed (connection), two connection modes, namely broadcast connection mode and point-to-point connection mode (simply referred to as PtoP connection mode hereinafter), are available.

In the broadcast connection mode, a connection comprises a broadcast-out connection that connects one output plug to one channel and a broadcast-in connection that connects one input plug to one channel.

In the case of the broadcast connection, an electronic apparatus that is a data supplier supplies (broadcast-out) the data to all the electronic apparatus connected to a digital bus, electronic apparatus that are ready to receive the data supply form broadcast-in connection to thereby form a channel between electronic apparatus through which the data is transmitted, and as the result communication through the channel becomes possible.

In the case of the broadcast connection mode, even though there is an electronic apparatus that is transmitting the data already through the broadcast-out connection, sending out of the data from another electronic apparatus that forms broadcast-out connection later is permitted. In this case, sending out of the data from the electronic apparatus that is sending out the data through the broadcast-out connection is stopped, and the data supplied from the electronic apparatus that broadcast-out connects later is transmitted through the digital bus preferentially.

In detail, for example, in the case that an IRD, a digital monitor apparatus, and a DVTR are connected to an IEEE 1394 standard digital bus and the digital monitor apparatus is receiving the digital data from the IRD through a channel formed between the IRD and the digital monitor apparatus according to the broadcast connection, when the DVTR forms connection to a channel according to the broadcast-out connection and sends out the data, sending out of the data from the IRD is stopped and the data sent out from the DVTR is supplied to the digital monitor apparatus.

In this case, for example, without any operation to the digital monitor apparatus entered by a user, the data generated from the DVTR is supplied to the digital monitor apparatus instead of the data generated from the IRD only by instructing playback of the data recorded in a video tape to the DVTR.

Therefore, in the above-mentioned example, when the broadcast connection mode is used, a user can supply the data generated from the target electronic apparatus to the digital monitor apparatus without complex operation performed by a user to the respective IRD, digital monitor apparatus, and DVTR connected to the digital bus.

On the other hand, in the case of the PtoP connection mode, one input plug and one output plug are connected to one channel. Therefore, the data transmission is allowable for electronic apparatus between which a channel has been already formed in the PtoP connection mode, and the data sent out from another electronic apparatus other than the electronic apparatus that have been PtoP connected already cannot be accepted by the network when the data is sent out later.

For example, in the same way as described hereinabove, in the case that the IRD, digital monitor apparatus, and DVTR are in connection through the digital bus, and the digital monitor apparatus is receiving supply of the data sent out from the IRD through a channel formed in the PtoP connection mode, sending out of the data that is sent out from the DVTR through a channel formed in, for example, the broadcast-out connection mode to the digital bus from the DVTR cannot be accepted and the transmission of the data from the IRD to the digital monitor apparatus is maintained unchanged.

The selective usage of the broadcast connection mode and the PtoP connection mode is previously determined for each electronic apparatus having the IEEE 1394 standard digital interface. In other words, which connection mode is used out of the broadcast connection mode and the PtoP connection mode is previously determined according to the predetermined condition for each electronic apparatus.

By the way, as described hereinbefore, the selective usage of the broadcast connection mode and the PtoP connection mode is predetermined for each electronic apparatus having the IEEE 1394 standard digital interface. In the case that a network is formed by connecting a plurality of electronic apparatus having the IEEE 1394 standard to a digital bus, the data could not be transmitted as desired by a user of the network.

For example, as shown in FIG. 10A, in some cases a digital monitor apparatus 1, an IRD 2, a DVTR 3, and DVTR 4, each of which is provided with an IEEE 1394 standard digital interface, are connected to a digital bus to structure an AV apparatus network in home. In FIG. 10B and FIG. 10C, a character 1*d* denotes a digital input/output terminal of the digital monitor apparatus 1, a character 2*d* denotes a digital input/output terminal of the IRD 2, a character 3*d* denotes a digital input/output terminal of the DVTR 3, and a character 4*d* denotes a digital input/output terminal of the DVTR 4.

In this example, the IRD 2, DVTR 3, and DVTR 4 are connected to the channel of the digital bus of the broadcast-out connection and transmit the data, and also form a channel of the PtoP connection with a requester target apparatus in response to a request from the target apparatus and supply the data only to the requester electronic apparatus.

As shown in FIG. 10B, in the case that the data is being transmitted through a broadcast connected channel from the IRD 2 to the digital monitor apparatus 1, when the DVTR 3 is switched erroneously to the playback mode, transmission of the data from the IRD 2 is stopped, and the data is automatically supplied from the DVTR 3 to the digital monitor apparatus 1 undesirably.

Because in this case the digital television broadcast program received by means of the IRD 2 cannot be viewed, it is required to transmit again the data by means of the broadcast connection from the IRD 2 to the digital bus, for example, the power source of the IRD is supplied again.

Furthermore, because transmission of the data from the IRD 2 is automatically stopped and the data is not supplied from the DVTR 3 to the digital monitor apparatus 1, a scene that is to be seen cannot be seen or the information that is to be obtained cannot be obtained as desired.

As in the case shown in FIG. 10A, as shown in FIG. 11A, in the case that apparatus, each of which has an IEEE 1394 standard digital interface, are connected to form an AV apparatus network, the PtoP connection can cause inconvenience.

For example, as shown in FIG. 11B, while a channel has been formed in the PtoP connection mode between the DVTR 3 and DVTR 4 in response to a request from the DVTR 3 to the DVTR 4 and the data sent out from the DVTR 4 is being recorded in the DVTR 3, the time when a digital television broadcast program that is to be recorded has come and the data from the IRD 2 is wanted to be recorded by means of the DVTR 3, at that time it takes a some considerable time to switch the digital data output apparatus and the data from the IRD 2 is recorded not promptly.

In other words, in the case that the channel is formed in the PtoP connection mode between the DVTR 3 and the DVTR 4 as shown in FIG. 11B, a user instructs a stop of recording processing to the DVTR 3 to release the channel formed in the PtoP connection mode between this apparatus and the DVTR 4 as shown in FIG. 11C (first step). Then, the user sets the DVTR 3 so as to receive the data transmitted from the IRD 2 (second step).

Next, the user turns on a power source to the IRD 2 to set the IRD 2 so as to receive a digital broadcast (third step). Then, the user instructs the DVTR 3 so as to record the data to be supplied (fourth step). Through the first step to fourth step, it becomes possible to duplicate the data to be supplied from the IRD 2 as shown in FIG. 4D.

As described hereinbefore, when an output apparatus formed in the PtoP connection mode that supplies the digital data to other electronic apparatus is to be changed, the operation of the first step to the fourth step is required as described hereinbefore, the operation can require some troublesome work and time. Therefore, in the exemplary case described hereinabove, recording of a target digital television broadcast program from the IRD 2 cannot be started promptly, and the entire target digital broadcast program cannot be recorded.

As the result, even though a plurality of electronic apparatus having an IEEE 1394 standard digital interface are connected through a digital bus to structure an AV apparatus network, an AV apparatus network that is sufficiently convenient for a user cannot be structured in some cases.

By the way, in the case that a plurality of electronic apparatus are connected to the IEEE 1394 standard digital bus and all the electronic apparatus form broadcast connection to the same channel on the IEEE 1394 standard digital bus so as to transmit the data, the data sent out from an electronic apparatus that sends out the data later is allowed to be sent out always. Therefore, in some cases, a plurality of channels of the IEEE 1394 standard digital bus are not used effectively.

To solve the above-mentioned problem, a method has been proposed, in which a communication channel has been set previously for each apparatus to prevent the channel use competition and the channels on the digital bus are used effectively when electronic apparatus connected to the digital bus communicate the data. According to the basic concept of this method, a receiving apparatus for receiving the data is waiting for supply of the data from a channel that has been set previously, and the transmission apparatus for transmitting the data sends out the data to the channel without specifying the receiving apparatus, and it is possible to communicate the data statically.

Furthermore, in this method, the receiving apparatus that is on the side for waiting the data and the transmission apparatus that is on the side for transmitting the data are connected in the above-mentioned broadcast connection mode specified according to the IEEE 1394 standard or IEC 61883-1 standardized standard that are both digital serial interface standard.

Therefore, also in this method, when a transmission apparatus is changed by means of a trigger such as an operation performed by a user, the transmission apparatus that will transmit the data newly works upon the transmission apparatus that is transmitting the data to the channel allocated to the target receiving apparatus to stop the transmission of the data at first, and forms a broadcast-out connection to the channel and transmits the data.

Therefore, the input data is switched without any operation of the receiving apparatus. Furthermore, because the transmission channel is allocated to each apparatus, the different transmission receiver of the data necessarily involves the different channel for transmitting the data, and the competition between a plurality of apparatus for getting one channel is prevented.

However, when the data supplied from a transmission apparatus that forms the broadcast-out connection to the channel allocated to the target receiving apparatus and is transmitting the data as described hereinabove is to be recorded by means of, for example, a recording apparatus such as a DVTR, the recording apparatus forms a connection of the PtoP connection mode additionally to the channel through which the transmission apparatus is sending out the data through the connection formed in the broadcast connection mode.

In the case of recording of the data, a channel is connected in the PtoP connection mode as described hereinabove. The reason is that, because the data to be recorded should be recorded in a recording medium surely differently from the case in which the data is merely monitored, the PtoP connection mode, that protects the channel from being snatched by another electronic apparatus, is used for forming a channel to secure the recording.

However, a channel connected in the PtoP connection mode cannot be used by another electronic apparatus as long as the receiving apparatus to which the channel is connected is not released. Therefore, in some cases that the above-mentioned method is applied to a home network system to which, for example, a DTV and DVTR are connected though the IEEE 1394 standard digital bus, the inconvenience will occur as described herein under.

For example, when the data is to be recorded by a DVTR while a DTV is receiving supply of the data through the broadcast connected channel allocated to this apparatus, the channel formed by the broadcast connection allocated to the DTV is changed to a PtoP connected channel by the DVTR.

In this case, when the DTV is to receive supply of the output data supplied from another apparatus, because the channel allocated to this apparatus is being used as the PtoP connection mode channel by the DVTR, the DTV cannot snatches the channel and the output data supplied to the DTV cannot be switched.

In other words, as shown in FIG. 34, for example, in the case that a channel having the channel No. 63 is allocated to the DTV and, for example, the PtoP connection mode channel is connected between the apparatus K2 and the apparatus K3 to the channel, even if the apparatus K1 is to be connected to the channel in the broadcast connection mode to send out the data, the apparatus K1 cannot be connected to the channel. Furthermore, even if the apparatus K4 is to be connected to the channel in the PtoP connection mode, the apparatus K4 cannot be connected to the channel.

In this case, as long as the PtoP connection mode channel connected between the apparatus K2 and the apparatus K3 is not released, another apparatus cannot sends out the data to the channel. As described hereinbefore, in the case that the broadcast connection mode and the PtoP connection mode are both used, in some cases, the same inconvenience as in the case that all the electronic apparatus connected to the IEEE 1394 standard digital bus use the same channel is caused.

In the case of the broadcast connection mode channel, as described hereinabove, the data to be supplied to a receiving apparatus can be changed only by changing the transmission apparatus that sends out the data to the channel without any operation of the receiving apparatus. On the other hand, in the case of data recording, because the channel is connected in the PtoP connection mode, the data to be supplied to the receiving apparatus that is served as a recording apparatus cannot be changed not only by changing the sender transmission apparatus of the data.

Furthermore, in the case that the communication channel is allocated for each apparatus as described hereinabove, for example, when the data is transmitted and recorded through a channel that a user or a monitor apparatus such as a DTV is not aware of as in the case of timer recording or reservation recording, the user is not aware of the information of the channel through which the data is being transmitted.

For example, in the case that a user sets timer recording because the user will go out but the user cancels the going out and wants to view the program that has been set to be recorded, in some cases the user cannot view immediately the program that is being recorded because the user is not aware of the channel through which the data of the target program is transmitted.

In view of the above, the present invention has been accomplished to eliminate the above-mentioned problem, and it is the object of the present invention to provide an electronic apparatus and a connection mode setting method that are capable of structuring a convenient electronic apparatus network.

SUMMARY OF THE INVENTION

To solve the above-mentioned problem, one of the present invention provides an electronic apparatus connected to a digital bus that is capable of using first connection mode that forms a transmission line that always allows the data sent out to the digital bus newly to be transmitted and transmits the above-mentioned data sent out newly so as to be receivable for any electronic apparatus connected to the above-mentioned digital bus, and that is capable of using second connection mode that forms a transmission line that transmits the data between only the predetermined two electronic apparatus and does not accept the data sent out to the digital bus from other electronic apparatus, comprising:

connection mode instruction means for accepting and holding the instruction input to instruct which connection mode of the above-mentioned first connection mode and the above-mentioned second connection mode is to be used to form the transmission line; and connection control means for controlling to form a transmission line for transmitting the data between the above-mentioned electronic apparatus that communicate the data in the connection mode corresponding to the above-mentioned instruction input held by the above-mentioned connection mode instruction means. According to the electronic apparatus, the connection mode used when the connection mode of the transmission line (channel) that has been already connected is changed or a transmission line is newly formed is set based on the instruction entered by a user that has been accepted and held by the connection mode instruction means. Thereby, the connection mode corresponding to the instruction entered by a user is used for forming the transmission line (channel) between the electronic apparatus, and a network that is capable of transmission of the data corresponding to the intention of the user is formed.

Furthermore, to solve the above-mentioned problem, the transmission line using method of the present invention is a method for using a plurality of transmission lines of a digital bus that is capable of selecting any of a first connection mode and second connection mode for the above-mentioned plurality of transmission lines, wherein the above-mentioned first connection mode forms a transmission line that transmits the data sent out from one electronic apparatus so as to be receivable for all other electronic apparatus connected to the above-mentioned digital bus, the above-mentioned second connection mode forms a transmission line that transmits the data between only predetermined two electronic apparatus and does not accept the data sent out from other electronic apparatus, the above-mentioned plurality of electronic apparatus connected to the above-mentioned digital bus are classified into the first receiving apparatus that receives the data mainly through the above-mentioned first connection mode transmission line and the second receiving apparatus that receives the data mainly through the above-mentioned second connection mode transmission line, some of the above-mentioned plurality of transmission lines are secured for the above-mentioned first connection mode, and the residual transmission lines other than the transmission lines secured for the above-mentioned first connection mode out of the above-mentioned plurality of transmission lines are allocated to the above-mentioned second connection mode. According to the transmission line using method, for example, electronic apparatus connected to the digital bus are classified into the first receiving apparatus and the second receiving apparatus by means of any one of electronic apparatus connected to the digital bus. Some of the plurality of transmission lines on the digital bus are secured for the first connection mode, and the residual transmission lines other than the transmission lines secured for the first connection mode are allocated to the second connection mode.

Thereby, it is prevented that a transmission line of the first connection mode and a transmission line of the second connection mode are formed on the same transmission line. The first electronic apparatus and the second electronic apparatus can receive the data through different transmission lines, and a plurality of transmission lines of a digital bus can be utilized efficiently.

BRIEF DESCRIPTION OF THE DRAWINGS

FIG. 1 is a block diagram for illustrating a monitor apparatus to which one embodiment of the information output apparatus in accordance with the present invention is applied.

FIG. 2A and FIG. 2B are diagrams for illustrating an exemplary network formed by connecting the monitor apparatus shown in FIG. 1 and other electronic apparatus.

FIG. 4A to FIG. 4D are diagrams for describing the case in which a channel formed in the broadcast connection mode is changed to a channel formed in the PtoP connection mode.

FIG. 5A and FIG. 5B are diagrams for describing an exemplary connection table formed in the connection management memory of the monitor apparatus shown in FIG. 1.

FIG. 17 is a diagram for describing the PtoP connection mode and the use of oPCR and iPCR.

FIG. 21 is a flowchart for describing a routine implemented in playing back output operation when the data is sent out.

DETAILED DESCRIPTION OF THE PREFERRED EMBODIMENTS

Figure 3A:
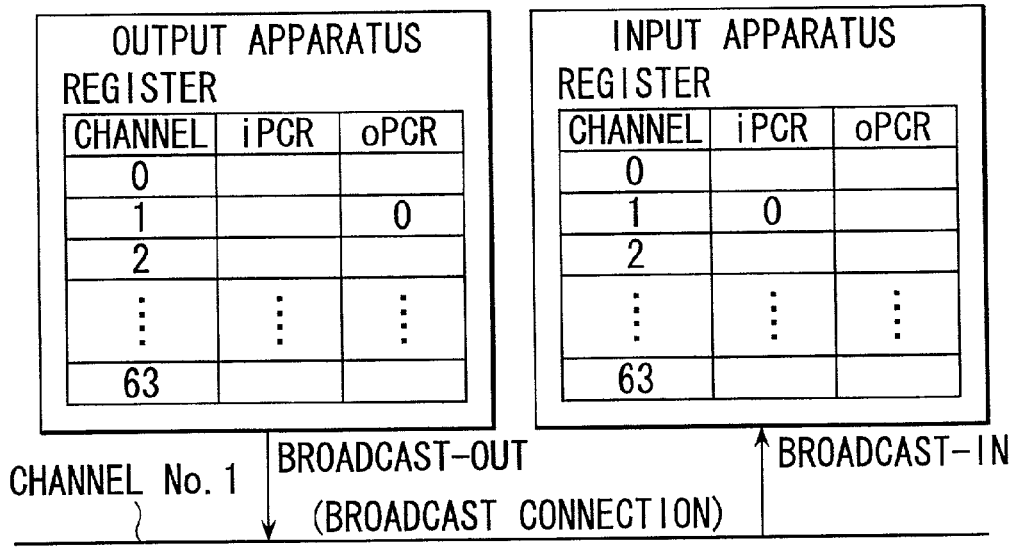
FIG. 3A and FIG. 3B are diagrams for describing iPCR (input plug control register) and oPCR (output plug control register).

At first, an embodiment of an electronic apparatus and a connection mode setting method for solving the problem that a user cannot transmit the data as desired in the case that a plurality of electronic apparatus provided with the above-mentioned IEEE 1394 standard digital interface are connected to a digital bus to form a network will be described hereinafter.

FIG. 1 is a bock diagram for illustrating an embodiment of a monitor apparatus 1 to which an electronic apparatus in accordance with the present invention is applied. FIG. 2A and FIG. 2B are diagrams for describing one example of a digital AV apparatus network in home structured by connecting a plurality of electronic apparatus having an IEEE 1394 standard digital interface.

In detail, in the present embodiment, a monitor apparatus 1, each of an IRD 2, a DVTR 3, and a DVTR 4 is provided with an IEEE 1394 standard digital interface (IEC 61883-1 standardized standard is applied), and form (connection) a transmission line (channel) with electronic apparatus connected to the same digital bus in any one of the broadcast connection mode and PtoP connection mode.

At first, before the structure and the operation of the monitor apparatus 1 of the present embodiment is described, an example of a digital AV apparatus network to be formed in the present embodiment will be described. The digital AV apparatus network formed in the present embodiment is formed by connecting the monitor apparatus 1, IRD 2, DVTR 3, and DVTR 4 in the form of the daisy chain connection in the same manner as in the case of the digital AV apparatus network described with respect to FIG. 10A to FIG. 10C and FIG. 11A to FIG. 10D.

In the present embodiment, the monitor apparatus 1 is an apparatus to which the electronic apparatus in accordance with the present invention is applied as described hereinabove, provided with digital input/output terminals 1d1 and 1d2, receives supply of the digital video signal from the IRD 2, DVTR 3, and DVTR 4, and displays an image corresponding to the supplied digital video signal on a screen of a display element (display) of this apparatus as described hereinafter out of electronic apparatus that constitute the electronic apparatus network as shown in FIG. 2A.

In the present embodiment, the IRD 2 is a receiver for receiving digital broadcast, and in the present embodiment, the IRD 2 receives the digital television broadcast that is formed by multiplexing a plurality of MPEG-encoded television programs. The IRD 2 sends out the received and tuned digital broadcast signal as it is through the digital input/output terminal 2d, and supplies it to a recording apparatus such as a VTR having a built-in camera or DVD recording/reproducing apparatus or an electronic apparatus such as the monitor apparatus 1 of the present embodiment.

The DVTR 3 is provided with digital input/output terminals 3d1 and 3d2, and the DVTR 4 is provided with digital input/output terminals 4d1 and 4d2. Each of the DVTR 3 and the DVTR 4 records the digital data such as digital video signal and digital audio signal supplied through the digital input/output terminal of the apparatus, or convert the analog signal supplied through an analog input terminal of the apparatus not shown in the drawing and compresses and records it on a video tape.

Furthermore, each of the DVTR 3 and the DVTR 4 reads out the digital data recorded on a video tape mounted on the apparatus and sends it out through the digital input/output terminal. In other words, each of the DVTR 3 and the DVTR 4 is provided with recording function for recording the digital data supplied to the apparatus on a video tape and provided with playback function for playing back the digital data recorded in a video tape.

In the present embodiment, as shown in FIG. 2A, the digital input/output terminal 2d is connected with the digital input/output terminal 1d1 of the monitor apparatus 1, and the input/output terminal 1d2 of the monitor apparatus 1 is connected to the digital input/output terminal 3d1 of the DVTR 3. Furthermore, the digital input output terminal 3d2 is connected to the digital input/output terminal 4d1 of the DVTR 4. The electronic apparatus are connected each other as described hereinabove to structure the digital AV apparatus network of the present embodiment.

As described hereinabove, the electronic apparatus are connected in the form of daisy chain connection in the present embodiment, this structure is equivalent to the case in which all the electronic apparatus are connected to one digital bus 5 as shown in FIG. 2B, the monitor apparatus 1 can receive the data not only from the IRD 2 and DVTR 3 connected directly to this apparatus but also from the DVTR 4.

As a matter of course, the same is true for other electronic apparatus, for example, the data sent out from the IRD 2 is supplied to the DVTR 3 or DVTR 4, or the digital data can be communicated between the DVTR 3 and the DVTR 4.

As described hereinbefore, in the present embodiment, when a channel is formed between electronic apparatus, whether the channel is formed in the broadcast connection mode or in the PtoP connection mode is determined according to the predetermined condition in the electronic apparatus. In the electronic apparatus of the present embodiment, the broadcast connection mode and the PtoP connection mode are selectively used as described herein under.

In detail, in the present embodiment, the monitor apparatus 1 receives the digital data such as the digital video signal from another electronic apparatus as described hereinabove, and structured so as to receive the supply of the digital data through a channel formed in the broadcast connection mode always. In other words, the monitor apparatus 1 forms the broadcast-in connection to a channel through which the digital data is transmitted from the target electronic apparatus.

The IRD 2 that sends out the digital broadcast signal received by this apparatus as described hereinabove transmits the digital data to a channel formed in the broadcast connection mode usually. In other words, the IRD 2 usually forms broadcast-out connection to a channel for transmitting the digital data and transmits the digital data.

However, it is possible that the IRD 2 forms a channel in the PtoP connection mode between this apparatus and the recording apparatus in response to, for example, a request from the so-called recording apparatus such as recording apparatus or recording/reproducing apparatus of DVTR or DVD and transmits the digital data through the channel.

Furthermore, each of the DVTR 3 and the DVTR 4 is provided with recording function and playback function as described hereinabove. When recording processing is performed by this apparatus, a channel is formed in the PtoP connection mode between this apparatus and an electronic apparatus that sends out the digital data, and this apparatus can receive supply of the digital data through the channel formed in the PtoP connection mode.

Furthermore, each of the DVTR 3 and the DVTR 4 forms a channel in the PtoP connection mode between the recording apparatus and this apparatus in response to, for example, a so-called recording apparatus such as recording apparatus or recording/reproducing apparatus of DVTR or DVD that is to be a receiver of the digital data, and transmits the digital data through the channel.

Furthermore, each of the DVTR 3 and the DVTR 4 transmits the digital data to a broadcast-connected channel excepting the case in which a channel is formed in the PtoP connection mode in response to a request from, for example, a recording apparatus. In other words, when each of the DVTR 3 and the DVTR 4 supplies the digital data to an electronic apparatus such as monitor apparatus 1, each of the DVTR 3 and the DVTR 4 forms broadcast-out connection to a channel for transmitting the digital data and transmits the digital data.

In the present embodiment, the data communication performed through a channel formed in the broadcast connection mode or the PtoP connection mode is controlled by means of an output plug control register (simply referred to as oPCR hereinafter) provided on, for example, an IEEE 1394 interface (I/F) circuit portion of each electronic apparatus and input plug control register (simply referred to as iPCR hereinafter).

In other words, each of the monitor apparatus 1, IRD 2, DVTR 3, and DVTR 4 is provided with an IEEE 1394 I/F circuit for transmitting the digital data such as the control data or the target digital video signal through an IEEE 1394 standard digital bus. As described hereinafter, the IEEE 1394 I/F circuit of each electronic apparatus has the same structure as the IEEE 1394 I/F circuit 12 of the monitor apparatus 1 of the present embodiment shown in FIG. 1, and has an iPCR for controlling the connection mode.

Figure 3B:
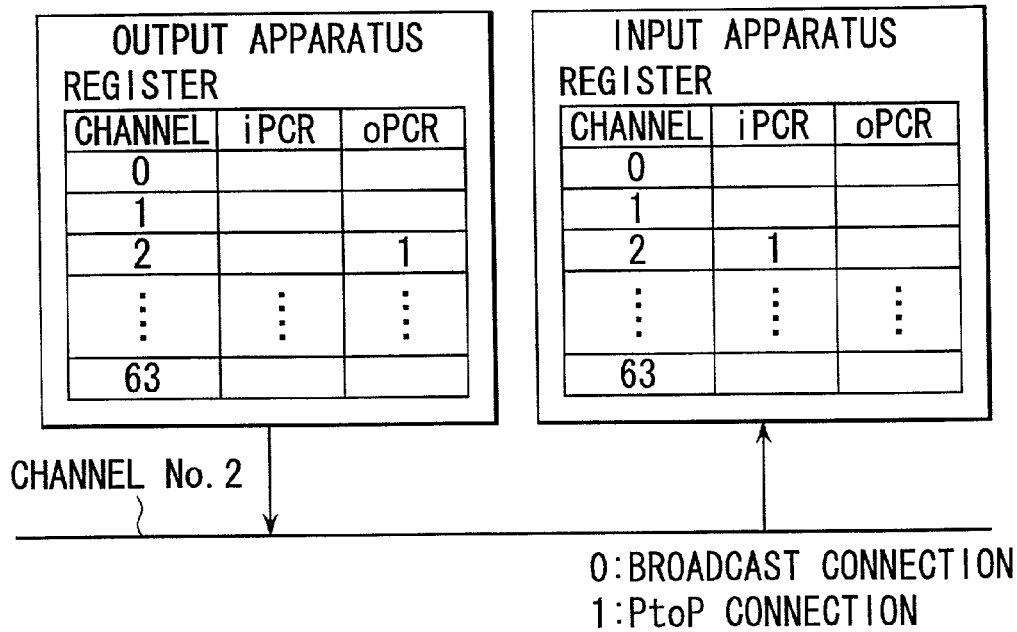

FIG. 3A and FIG. 3B are conceptual diagrams for describing oPCR and iPCR of the IEEE 1394 I/F circuit of an electronic apparatus such as the monitor apparatus 1, IRD 2, DVTR 3, and DVTR 4 connected through an IEEE 1394 standard digital bus. The iPCR and oPCR are defined for every channel in the IEEE 1394 I/F circuit of each electronic apparatus as shown in FIG. 3A and FIG. 3B. In the present embodiment, the iPCR and oPCR for every channel is cleared (initialized) at the initial state.

In the present embodiment, in the case of an IEEE 1394 standard digital interface, total 64 channels from channel 0 to channel 63 are prepared. Depending on which channel is used between electronic apparatus selectively from among the 64 channels, in detail, depending on which channel is used between electronic apparatus in the broadcast connection mode or between electronic apparatus in the PtoP connection mode, the channel is formed (connection) between the electronic apparatus.

The digital data is transmitted in the form of the packet data through the channel. Therefore, the iPCR and oPCR of the IEEE 1394 I/F circuit of each electronic apparatus are given 64 channels.

In the case that the data is communicated through a channel formed in the broadcast connection mode between electronic apparatus in the present embodiment, an electronic apparatus (output apparatus) that generates the digital data selects a channel for transmitting the digital data by means of the IEEE 1394 I/F circuit of this apparatus and sets the oPCR value corresponding to the channel to 0. As described hereinabove, the output apparatus forms broadcast-out connection to the selected channel.

Furthermore, in the present embodiment, as shown in FIG. 3A, in the case that an electronic apparatus (input apparatus) (receiving apparatus) that receives the digital data transmitted from the output apparatus forms broadcast-in connection to a channel that transmits the digital data generated from the target output apparatus, a channel used for transmitting the digital data supplied from the target output apparatus is detected in the IEEE 1394 I/F circuit of the input apparatus. Then, out of the registers of this apparatus, the value of iPCR corresponding to the detected channel is set to 0.

Thereby, as shown in FIG. 3A, the channel is formed between the input apparatus and the output apparatus in the broadcast connection mode. In the case of the example shown in FIG. 3A, the output apparatus and the input apparatus are connected in the broadcast connection through the channel having the channel No. 1, and the data is transmitted from the output apparatus to the input apparatus through the channel.

On the other hand, in the case of the PtoP connection, a channel is formed between the input apparatus and the output apparatus in response to a request from the input apparatus to the output apparatus. Also in the case of the PtoP connection, in the same manner as described in the case of the broadcast connection mode with respect to FIG. 3A, the connection is managed by means of iPCR and oPCR defined every channel for a register of the IEEE 1394 I/F circuit of the input apparatus and the output apparatus.

In detail, in the present embodiment, in the case that a channel is formed in the PtoP connection mode, as shown in FIG. 3B, the value of oPCR corresponding to the channel used for transmitting the data is set to 1 in the IEEE 1394 I/F circuit of the output apparatus, and the value of iPCR corresponding to the channel used for transmitting the data is set to 1 in the IEEE 1394 I/F circuit of the input apparatus.

Thereby, as shown in FIG. 3B, the channel is formed between the output apparatus and the input apparatus in the PtoP connection mode. In the example shown in FIG. 3B, the output apparatus and the input apparatus are connected in the PtoP connection through the channel having the channel No. 2, and the data is transmitted from the output apparatus to the input apparatus through the channel.

As described hereinabove, which channel is to be used for data transmission, and which of the broadcast connection mode and the PtoP connection mode is used for forming the channel are determined depending on the state of oPCR and iPCR of the output apparatus and the input apparatus.

Next, the structure of the monitor apparatus 1 of the present embodiment will be described with reference to FIG. 1. In the present embodiment, the monitor apparatus 1 receives supply of the digital data through a channel formed in the broadcast connection mode always as described hereinbefore. For example, in the case that the digital data is received from the IRD 2, the monitor apparatus 1 operates as described herein under.

A user of the monitor apparatus 1 turns on the power source to supply the power to the monitor apparatus 1 at first, and operates a remote commander (remote operation apparatus) 40 of the monitor apparatus 1 and instructs to the monitor apparatus 1 to receive the digital data to be transmitted from the IRD 2. The instruction is sent out from the remote commander 40, for example, as an infrared remote control signal, received by the remote control signal receiving unit 31, and supplied to the control unit 20.

The control unit 20 is a micro-computer provided with a CPU 21, ROM 22, and RAM 23 as shown in FIG. 1, and controls every unit of the monitor apparatus 1. The control unit 20 supplies a control signal to the IEEE 1394 I/F circuit 12 so as to form a channel of the broadcast-in connection for transmission of the digital data to be transmitted from the IRD 2 in response to the instruction given by the user who has entered it by use of the remote commander 40.

The IEEE 1394 I/F circuit 12 detects the digital data transmitted from the IRD 2 out of the digital data (packet data) supplied through the digital input/output terminal 1*d*1 or digital input/output terminal 1*d*2 corresponding to the control signal supplied from the control unit 20, and forms connection of the broadcast-in connection to the channel through which the detected digital data has been transmitted.

In the case of the broadcast-in connection, as described hereinabove with respect to FIG. 3A, in the IEEE 1394 I/F circuit 12 of the monitor apparatus 1, the value of iPCR corresponding to the channel through which the digital data is transmitted from the IRD 2 in the register 12R of the IEEE 1394 I/F circuit 12 is set to 0.

As described hereinabove, the data is communicated between electronic apparatus by means of packet system in the case of the IEEE 1394 standard digital interface. The header of a packet includes the source ID that instructs the channel number and the type of a receiving electronic apparatus on the IEEE 1394 standard digital interface.

The IEEE 1394 I/F circuit 12 of the monitor apparatus 1 discriminates the channel of the packet transmitted from the IRD 2 based on the header information of the packet supplied to this apparatus through the digital input/output terminal, forms broadcast-in connection to the channel, and receives the digital data transmitted from the IRD 2.

On the other hand, the user enters a channel selection instruction for selecting the digital broadcast signal of the target broadcast station to the IRD 2 after the user turns on the power source, the IRD 2 thereby selects and receives the target digital broadcast signal, and converts the digital broadcast signal to packet in the IEEE 1394 I/F circuit of this apparatus not shown in the drawing. The IRD 2 forms the broadcast-out connection to the predetermined channel on the IEEE 1394 standard digital interface and sends out the digital packet data.

When the broadcast-out connection is formed, as described hereinbefore with respect to FIG. 3A, the value of oPCR corresponding to the channel selected to send out the data of the register of the IEEE 1394 I/F circuit of this apparatus is set to 0 in the IEEE 1394 I/F circuit of the IRD 2.

The channel is formed in the broadcast connection mode between the IRD 2 and the monitor apparatus 1, and the digital data such as the digital video signal is supplied from the IRD 2 to the monitor apparatus 1 through the channel formed as described hereinabove. The digital data supplied to the monitor apparatus 1 is taken in by the IEEE 1394 I/F circuit as shown in FIG. 1, and supplied to a demultiplexer 13.

The IEEE 1394 I/F circuit 12 extracts, for example, the information on the sender electronic apparatus or the control information added to the header of the packet from the packet that is addressed to this apparatus, and supplies the information to the control unit 20.

In the case that the supplied digital data is the multiplexed information of a plurality of broadcast programs or EPG (electronic program table), the demultiplexer 13 extracts a broadcast program or EPG corresponding to the instruction from the user based on the control signal supplied from the control unit 20 corresponding to the selection instruction input entered by the user, and supplies it to a MPEG decoder 14.

The MEG decoder 14 compresses/expands (MPEG decode) the digital data such as a broadcast program supplied to the MPEG decoder 14 to restore the uncompressed digital data, and supplies the restored digital data to a D/A conversion unit 15. The D/A conversion unit 15 converts the digital data supplied to the D/A conversion unit 15, namely the digital video signal in the present embodiment, to the analog signal, and supplies the analog signal to a superimposition circuit 16.

The superimposition circuit 16 receives the display data (OSD data) generated by means of an OSD (On Screen Display) generation circuit 17. The OSD data forms various display information for displaying with superimposition on the picture corresponding to the digital video signal supplied to the monitor apparatus 1.

The OSD generation circuit 17 forms, for example, the channel number displayed when the channel is called, the sound volume bar for instructing the sound volume displayed when the sound volume is adjusted, or the display information such as various messages. The OSD generation circuit 17 receives supply of the information for generating the OSD information from the control unit 20, and generates the OSD data.

The superimposition circuit 16 superimposes the OSD message (display information) corresponding to the OSD data supplied from the OSD generation circuit 17 on the video signal supplied from the D/A conversion circuit 15, and supplies the video signal on which the OSD message has been superimposed to a display circuit 18. The display circuit 18 forms the signal to be supplied to the display element from the video signal supplied to the display circuit 18. The signal formed therein is supplied to the display element such as a cathode ray tube of the monitor apparatus 1, and a picture corresponding to the digital video signal supplied from the IRD 2 is displayed on the display screen G.

In the case that a channel is formed in the broadcast connection mode, when another electronic apparatus tries to transmit the data interruptedly to the IEEE 1394 standard digital bus while the data is being communicated through the channel, the data sending out from the electronic apparatus that has sent out the data previously is stopped and the data from the electronic apparatus that tries to transmit the data interruptedly is supplied to the input apparatus. In other words, the output apparatus is switched automatically.

Such automatic switching is convenient because the output apparatus is switched to the input apparatus without any complex operation as described hereinbefore. However, in some cases, the output apparatus (data sender electronic apparatus) is switched undesirably though the user does not want to switch the output apparatus. FIG. 4A to FIG. 4D are diagrams for describing the inconvenience that likely occurs while a channel is being formed in the broadcast connection mode.

As described hereinbefore with respect to FIG. 2A and FIG. 2B and as shown in FIG. 4A, in the present embodiment, the monitor apparatus 1, IRD 2, DVTR 3, and DVTR 4 are connected to a digital bus to form a network of digital electronic apparatus. In the network of the digital electronic apparatus, the user operates the monitor apparatus 1 and IRD 2 to form the broadcast connection between the monitor apparatus 1 and IRD 2, and the digital video signal is thereby supplied from the IRD 2 to the monitor apparatus 1.

As described hereinabove, while the digital video signal is being supplied from the IRD 2 to the monitor apparatus 1 through a broadcast connected channel, a user activates erroneously the playback function of the DVTR 3, as the result, the digital video signal recorded in a video tape mounted on the DVTR 3 is just read out and supplied to the digital bus.

In this case, an instruction is sent out to the DVTR 3 and IRD 2 so as to stop the output of the digital video signal, and the output of the digital video signal from the IRD 2 is stopped correspondingly. In this case, oPCR of the register of the IEEE 1394 I/F circuit of the IRD 2 is cleared and the value of iPCR of the monitor apparatus 1 is also cleared.

Then, the DVTR 3 sets the value of oPCR of the channel that sends out the digital video signal from this apparatus out of the registers of the IEEE 1394 I/F circuit of this apparatus to be 0. Furthermore, the monitor apparatus 1 sets the value of iPCR of the register of the IEEE 1394 I/F circuit 12 corresponding to the channel through which the digital video signal is transmitted from the DVTR 3 to be 0.

As the result, a channel is formed undesirably in the broadcast connection mode between the DVTR 3 and the monitor apparatus 1, the digital video signal transmitted from the DVTR 3 is supplied to the monitor apparatus and displayed on the screen of the display element of the monitor apparatus 1 undesirably though the user want to display the digital video signal transmitted from the IRD 2 on the screen of the display element of the monitor apparatus 1.

Therefore, it is required for the user to operate or instruct the IRD 2 to send out the target digital television broadcast again in order to supply the digital data transmitted from the IRD 2 to the monitor apparatus 1 again. In this case, the user cannot see the picture corresponding to the digital video signal to be transmitted from the IRD 2 by means of the monitor apparatus 1 until supply of the digital video signal from the IRD 2 to the monitor apparatus 1 is resumed again. As the result, the user can mis the information to be seen.

To solve the above-mentioned problem, in the monitor apparatus 1 of the present embodiment, as shown in FIG. 4D, usually the broadcast connection between the monitor apparatus 1 and the IRD 2 can be changed to the PtoP connection based on the instruction input to be entered by a user. For changing the connection mode, iPCR of the register 12R of the IEEE 1394 I/F circuit 12 of the monitor apparatus 1 and oPCR of the register of the IEEE 1394 I/F circuit of the target apparatus (the IRD 2 in the present example) are changed.

As described hereinabove, the broadcast connection between electronic apparatus that is formed in normal condition is changed to the PtoP connection in response to an instruction entered by the user so that another electronic apparatus cannot interrupt the connection, and so that the sender electronic apparatus (output apparatus) of the digital video signal will not be changed against the user's intention.

Furthermore, as described herein under, the monitor apparatus 1 of the present embodiment detects the information of another electronic apparatus of the network to which this apparatus is connected by means of the function of the IEEE 1394 standard digital interface, and displays the detected information on the screen of the display element of the monitor apparatus 1 to inform the information of the user. Thereby, the user can select the connection mode between the garget electronic apparatus simply and correctly.

For example, when the connection table, that will be described hereinafter, is not generated in the connection management memory after the power source is turned on, the control unit 20 of the monitor apparatus unit 20 of the monitor apparatus 1 of the present embodiment controls the IEEE 1394 I/F circuit 12 so as to inquire of all the electronic apparatus that are capable of forming a channel with the monitor apparatus 1 through the IEEE 1394 standard digital bus, and recognizes these electronic apparatus.

In the present embodiment, the monitor apparatus inquires about the SDD (Self Describing Devices) information defined by the IEEE 1394 standard digital interface of the electronic apparatus to thereby specify the type of the electronic apparatus. The SDD information includes various information such as the name of the maker (company name), merchandise category, and type of the apparatus.

Furthermore, when a channel between this apparatus, namely the monitor apparatus 1, and another electronic apparatus is formed, the monitor apparatus 1 inquires which of the broadcast connection mode and the PtoP connection mode is used for forming the channel to thereby recognize the channel connection mode between the monitor apparatus 1 and another electronic apparatus.

The information detected by inquiring through the IEEE 1394 I/F circuit as described hereinabove is supplied to the control unit and managed by means of the control unit 20. In the present embodiment, for example, the merchandize category information is extracted out of the SDD information transmitted from electronic apparatus in response to the inquiry, and supplied to the control unit 20 from the IEEE 1394 I/F circuit 12 as the information to be used for specifying the electronic apparatus.

As described hereinabove, the monitor apparatus 1 can recognizes the electronic apparatus that can serve as a output apparatus for supplying the digital data to the monitor apparatus 1 based on the information such as SDD information supplied from electronic apparatus connected to the network, and can recognize the connection mode to be applied when a channel is formed between the monitor apparatus 1 and the electronic apparatus.

Furthermore, in the present embodiment, the control unit 20 of the monitor apparatus 1 controls the IEEE 1394 I/F circuit 12 to inquire for the value of iPCR and oPCR of each channel of the register of the IEEE 1394 I/F circuit of each electronic apparatus of all the electronic apparatus that are capable of forming a channel between the electronic apparatus and the monitor apparatus 1 through the IEEE 1394 standard digital bus.

The IEEE 1394 I/F circuit 12 of the monitor apparatus 1 detects iPCR and oPCR of each channel transmitted from the IRD 2, DVTR 3, and DVTR 4 in response to the inquiry, and supplies the detected iPCR and oPCR to the control unit 20. Also, the IEEE 1394 I/F circuit 12 of the monitor apparatus 1 supplies the value of iPCR and oPCR of each channel of the register of this apparatus to the control unit 20.

Thereby, when there is an electronic apparatus that forms a channel between this apparatus and the monitor apparatus 1, the monitor apparatus 1 can recognize what electronic apparatus forms the channel between it and the monitor apparatus 1 and which type channel connection is formed based on the iPCR and oPCR of each channel of the electronic apparatus and the iPCR and oPCR of each channel of the monitor apparatus 1.

The control unit 20 of the monitor apparatus 1 forms a connection table in the connection management memory 24 based on the SDD information of electronic apparatus supplied from the IEEE 1394 I/F circuit 12 and iPCR and oPCR information in the present embodiment. The connection management memory 24 is a so-called non-volatile memory, and the recorded information will not be deleted even though the power source of the monitor apparatus 1 is shutdown.

FIG. 5A and FIG. 5B are diagrams for describing the connection table formed in the connection management memory 24 of the monitor apparatus 1. As shown in FIG. 5A and FIG. 5B, the connection state management table includes the information for instructing the electronic apparatus that can serve as the output apparatus for supplying the digital video signal to the monitor apparatus 1 by forming a channel between the apparatus and the monitor apparatus 1, and the information for instructing the connection mode that is formed between the monitor apparatus 1 and the electronic apparatus when it is formed. The information for instructing the electronic apparatus that is served as an output apparatus is the merchandise category information extracted from the SDD information transmitted from electronic apparatus through the IEEE 1394 standard digital bus as described hereinabove in the present embodiment.

Furthermore, the information for instructing the connection mode to this apparatus is the connection mode recognized based on the iPCR and oPCR of each channel of the register 12R of the IEEE 1394 I/F circuit 12 of this apparatus, namely the monitor apparatus 1, and the iPCR and oPCR of each channel supplied from electronic apparatus through the IEEE 1394 standard digital bus in the present embodiment.

In other words, in the present embodiment, a channel is formed in the broadcast connection mode between the monitor apparatus and the IRD 2 as shown in FIG. 4B, and the digital video signal is supplied from the IRD 2 to the monitor apparatus 1 through the channel. In this case, because the iPCR of the channel n of the register of the monitor apparatus 1 and the oPCR of the channel n of the register of the IRD 2 are both 0, the connection is recognized to be formed in the broadcast connection mode.

Therefore, in the present embodiment, as shown in FIG. 5A, the field of the connection mode to this apparatus of the IRD field shows the broadcast connection, and the fact that a channel has been formed already in the broadcast connection mode between this apparatus, namely the monitor apparatus 1, and the IRD 2 is managed.

Differently from the above-mentioned example in which the information for instructing the channel connection mode formed actually is stored in the connection table, another method may be employed, in which the connection mode employed when a channel is formed between the monitor apparatus 1 and another electronic apparatus is updated in the field of connection mode to the this apparatus based on the information, that is the information stored previously in the monitor apparatus 1, for instructing the connection mode for forming a channel between the monitor apparatus 1 and another electronic apparatus connected to the digital bus.

Furthermore, in the case that a channel has been formed actually, the actual connection mode is updated in the field of connection mode to this apparatus, and the connection mode based on the information stored in the monitor apparatus 1 may be updated in the field of the connection mode to this apparatus of the field of an electronic apparatus to which another channel is not formed as described hereinabove.

The information in the field of connection mode to this apparatus out of the information in the connection table can be changed as shown in FIG. 5B, and in the case that a channel is not formed, the information of the field of connection mode to this apparatus can be previously set for using as the information to instruct the connection mode when a channel is to be formed newly as described hereinafter.

In FIG. 5A and FIG. 5B, DVTR No. 1 corresponds to the DVTR 3, and DVTR No. 2 corresponds to the DVTR 4. Because two DVTR's are connected to the network of the present embodiment, the expression such as No. 1 and No. 2 is used for easy discrimination for a user in the present embodiment.

In the present embodiment, when a user operates the remote commander 40 of the monitor apparatus 1 to enter an instruction so as to display a connection mode setting screen, the control unit 20 displays the connection mode setting screen on the display screen of the display element of the monitor apparatus 1 based on the information of the connection table formed in the connection management memory 24.

Figure 6A:
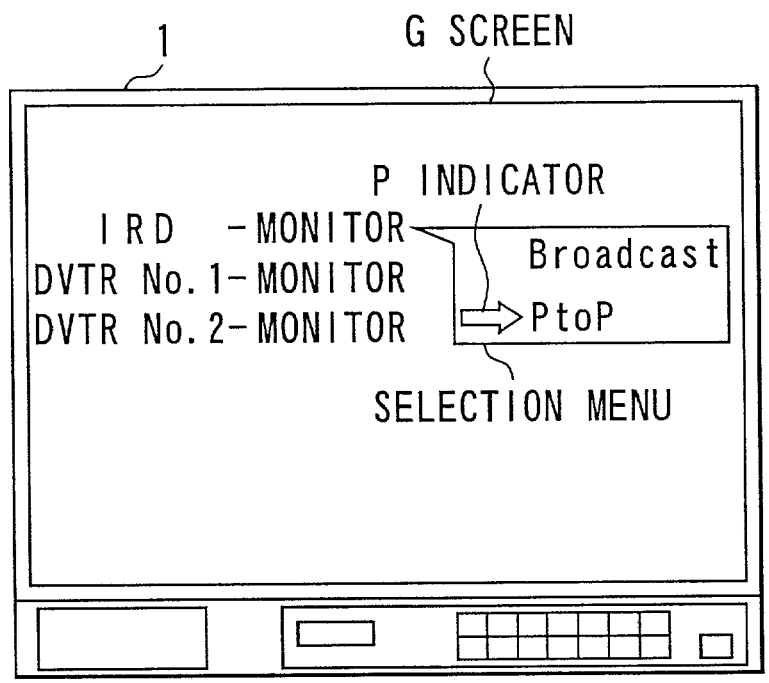
FIG. 6A and FIG. 6B are diagrams for describing an exemplary connection mode setting/changing screen.
Figure 6B:
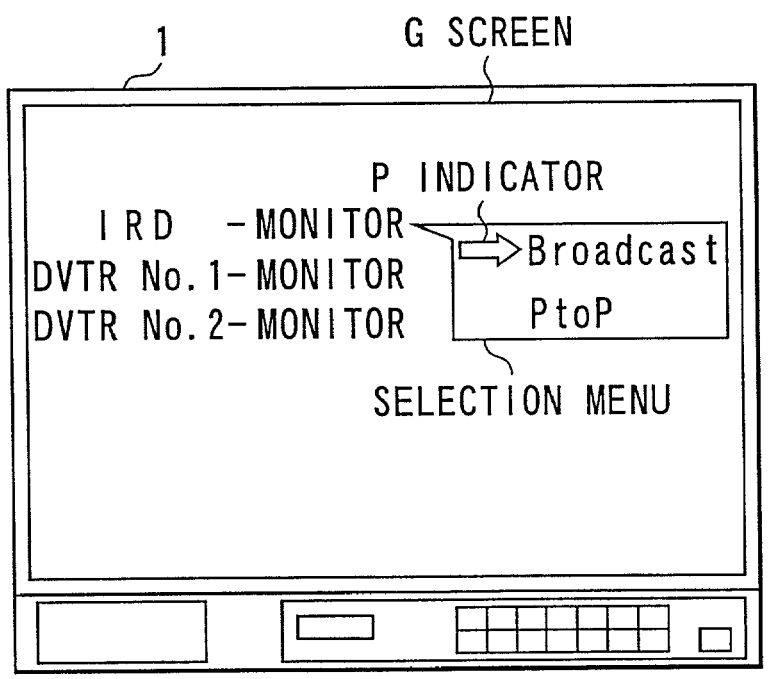

FIG. 6A and FIG. 6B are diagrams for describing an exemplary connection mode setting screen displayed on the display screen of the display element of the monitor apparatus 1 in the present embodiment. The connection mode setting screen shown in FIG. 6A and FIG. 6B show the current connection of the network with regarding the monitor apparatus 1 as the input apparatus that receives supply of the digital data, and is used when the connection mode of a channel that has been already formed is to be changed or the connection mode is to be set to form a channel.

The control unit 20 supplies the information of the connection table formed in the connection management memory 24 and other necessary information to the OSD generation circuit 17 when the control unit 20 receives a display instruction of connection mode setting screen from a user by use of the remote commander 40 and the remote control signal receiving unit 31. The OSD generation circuit 17 forms the OSD information for displaying the connection changing screen of the connection mode shown in FIG. 6A and FIG. 6B based on the information supplied from the control unit 20 and supplies it to the superimposition circuit 16, and the connection mode setting screen shown in FIG. 6A and FIG. 6B is thereby displayed on the display screen G of the display element of the monitor apparatus 1.

The connection mode setting screen includes a menu MNU on which an item for instructing the broadcast connection mode "Broadcast" and an item for instructing the PtoP connection mode "PtoP" are displayed as the item that is selectable for setting change of the connection mode between the monitoring apparatus 1 and an electronic apparatus that can be the output apparatus for supplying the digital video signal to the monitor apparatus 1.

The menu MNU is displayed correspondingly to electronic apparatus names displayed on the connection mode setting screen as shown in FIG. 6A and FIG. 6B, and, for example, an upward arrow key or downward arrow key of the remote commander 40 is operated to display the menu MNU for every electronic apparatus that forms a channel between the electronic apparatus and the monitor apparatus 1 and can be the output apparatus, and the connection mode may be set or the connection mode that has been already set may be changed.

At that time, in the present embodiment, when a channel has been formed already, the item "Broadcast" or the item "PtoP" is displayed in a mode different from the normal mode, for example, inverse mode. In the case that the item "Broadcast" or the item "PtoP" is displayed in a mode different from the normal mode, for example, inverse mode, a user can be aware that a channel has been formed in the connection mode instructed by the item that is displayed in a mode different from the normal mode.

An indicator P is displayed on the menu MNU, the indicator P is moved to the head of the display position of the item "Broadcast" or the head of the display position of the item "PtoP" as shown in FIG. 6A and FIG. 6B by operating the remote commander 40, and the desired connection mode is thereby selected. A user press down, for example, the decision key of the remote commander 40 to thereby decide the selected connection mode, the selected connection mode is written in the field of connection mode to this apparatus of the field of the corresponding output apparatus of the connection mode table.

For example, in the state that the monitor apparatus and the IRD 2 are connected in the broadcast connection mode as shown in FIG. 6A, when the PtoP connection mode is selected as shown in FIG. 6B and an operation to change the connection mode from the broadcast connection mode to the PtoP connection mode is performed, the connection mode is changed as described herein under.

The control unit 20 rewrites the information recorded in the field of connection mode to this apparatus of the field of the IRD in the connection table (FIG. 5A) formed in the connection management memory 24 from the information that instructs the broadcast connection mode to the information that instructs the PtoP connection mode at first (FIG. 5B).

Next, the control unit 20 controls the IEEE 1394 I/F circuit 12 to rewrite the value of IPCR of the register of this apparatus into 1. Similarly, the IEEE 1394 I/F circuit 12 of the monitor apparatus 1 transmits an instruction that instructs to rewrite the value of oPCR of the IRD 2 into 1 through the IEEE 1394 I/F circuit 12 and the IEEE 1394 standard digital bus. In response to the instruction, the value of oPCR of the register of the IEEE 1394 I/F circuit of the IRD 2 is rewritten into 1 in the IRD 2.

Thereby, the channel between the monitor apparatus 1 and the IRD 2 is changed from the broadcast connection to the PtoP connection, as the result even though the DVTR 3 or the DVTR 4 tries to form a channel of the broadcast-out connection later as shown in FIG. 4D, the channel is not permitted to be formed, and the channel formed between the monitor apparatus 1 and the IRD 2 is maintained.

Therefore, even if the playback function of the DVTR 3 or the DVTR 4 is activated erroneously while the monitor apparatus 1 is being received supply of the digital video signal from the IRD 2 as described hereinbefore, the digital video signal sent out from the DVTR 3 or the DVTR 4 is not supplied to the monitor apparatus 1. In other words, as long as an operation to cancel the PtoP connection is not performed, for example, as long as supply of the data from the IRD 2 to the monitor apparatus 1 is not stopped, the monitor apparatus 1 can continuously receive supply of the digital video signal from the IRD 2 without influence of another electronic apparatus.

An exemplary case in which iPCR of the monitor apparatus and oPCR of the IRD 2 corresponding to the broadcast connected channel formed already between the monitor apparatus 1 and the IRD 2 are changed is described hereinabove. However, another example may be possible.

For example, the control unit 20 of the monitor apparatus 1 controls the IEEE 1394 I/F circuit 12 of this apparatus and requests the IRD 2 to form a channel in the PtoP connection mode between the monitor apparatus 1 and the IRD 2. iPCR corresponding to the current broadcast-in connected channel is cleared in the register 12R of this apparatus.

On the other hand, the IRD 2 clears oPCR corresponding to the current broadcast-out connected channel in response to the request for changing the connection mode from the monitor apparatus 1. Then, a free channel is detected, the value of oPCR corresponding to the detected free channel is set to 1, and the digital video signal is transmitted through the channel.

The monitor apparatus 1 detects the channel through which the data is transmitted from the IRD 2, and sets the value of iPCR of the channel to 1. As described herein above, the channel connection mode between the monitor apparatus 1 and the IRD 2 may be changed to the PtoP connection mode through a different channel from the channel that is being formed in the broadcast connection mode.

Otherwise, the monitor apparatus 1 detects a free channel and notifies it to the IRD 2, and a channel is formed between the monitor apparatus 1 and the IRD 2 in the PtoP connection mode. In summary, the control information is communicated between an electronic apparatus (output apparatus) that sends out the digital video signal and an electronic apparatus (input apparatus) that receives the digital video signal through the IEEE 1394 standard digital interface, and oPCR of the output apparatus and iPCR of the input apparatus may be changed to the connection mode corresponding to the instruction entered by a user.

Herein, the case in which the connection mode of a channel that has been formed already between the monitor apparatus 1 and the IRD 2 is changed to another connection mode corresponding to the setting entered by a user is exemplified. However, as described hereinbefore, the connection mode may be set to an electronic apparatus to which a channel has not been formed yet.

In the present embodiment, in the case that the digital video signal is supplied from the DVTR 3 to the monitor apparatus 1 and in the case that the digital video signal is supplied from the DVTR 4 to the monitor apparatus 1, a channel is formed in the broadcast connection mode as described hereinbefore. In other words, this case is the same as the case in which a channel is formed between the monitor apparatus 1 and the IRD 2.

However, for example, in the case that the digital video signal is supplied from the DVTR 3 to the monitor apparatus 1 for viewing, a user does not want the digital video signal output from the DVTR 3 to be stopped due to the digital video signal output from the IRD 2 or DVTR 4 in some cases.

In such case, in the case that a channel is formed between the monitor apparatus 1 and the DVTR 3 in the connection table formed in the connection management memory 24 of the monitor apparatus 1, the information for instructing to form a channel in the PtoP connection mode is set previously. At that time, the PtoP connection mode can be set by use of the connection setting screen described hereinabove with respect to FIG. 6A and FIG. 6B.

Also in this case, the selection menu MNU is displayed correspondingly to an electronic apparatus that forms a channel between the monitor apparatus 1 and the electronic apparatus by operating, for example, the upward arrow key or the downward arrow key of the remote commander 40 on the connection mode setting screen shown in FIG. 6A and FIG. 6B in the same manner as used in the case that the connection mode connection between the monitor apparatus 1 and the IRD 2 is changed as described hereinabove, and the menu MNU is set so as to use the PtoP connection mode as the connection mode used for forming a channel.

Thereby, the information for instructing that the PtoP connection mode is to be used is set in the field of the connection mode to this apparatus (monitor apparatus 1) of the field of the DVTR 3 of the connection table described hereinabove with respect to FIG. 5A and FIG. 5B formed in the connection management memory 24 of the monitor apparatus 1.

When a user operates the monitor apparatus 1 so as to receive the digital video signal from the DVTR 3, the control unit 20 of the monitor apparatus 1 refers the connection table of the connection management memory 24. In this case, the control unit 20 supplies the instruction that instructs to form a channel in the PtoP connection mode to the DVTR 3 through the IEEE 1394 I/F circuit 12 and the IEEE 1394 standard digital bus based on the information that is set in the connection table.

Thereby, the DVTR 3 forms a PtoP connection mode channel and sends out the digital video signal, and the monitor apparatus 1 forms the PtoP connection to the channel through which the digital video signal is transmitted from the DVTR 3 and receives supply of the digital video signal from the DVTR 3. In this case, the value of oPCR of the DVTR 3 and iPCR of the monitor apparatus 1 is set to 1.

Therefore, after the channel is formed between the monitor apparatus 1 and the DVTR 3 in the PtoP connection mode, as long as the channel formed between the monitor apparatus 1 and the DVTR 3 is not canceled, the digital video signal output transmitted from another electronic apparatus is not accepted, supply of the digital video signal from the DVTR 3 to the monitor apparatus 1 will not be interrupted. The setting of connection mode between electronic apparatus as described hereinbefore can be performed also between the monitor apparatus 1 and the DVTR 4 similarly.

As described hereinabove, in the present embodiment, in addition to changing of the connection mode of a channel formed already between electronic apparatus, the connection mode of a channel to be formed between predetermined electronic apparatus may be set previously.

Furthermore in the present embodiment, the information of the connection table formed in the connection management memory 24 of the monitor apparatus 1 is displayed on the connection mode setting screen in the form of character display as described hereinabove with respect to FIG. 6A and FIG. 6B. However, the connection mode setting screen is by no means limited to this character display.

Figure 7A:
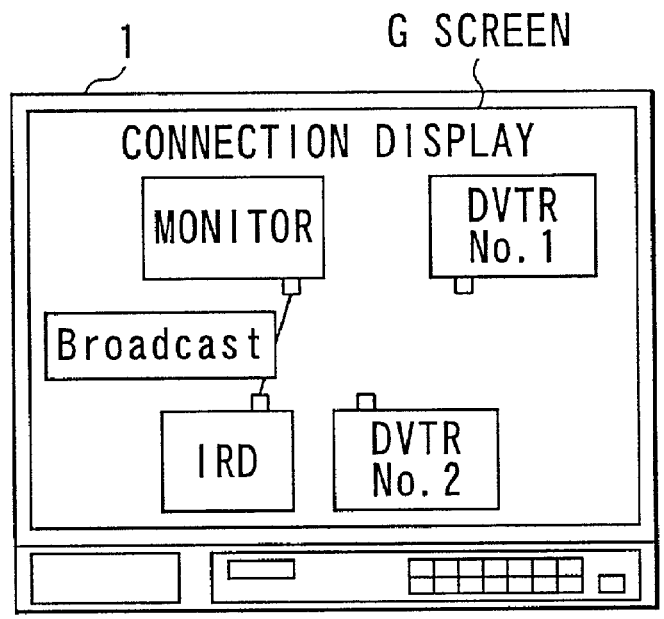
FIG. 7A and FIG. 7B are diagrams for describing another exemplary connection mode setting/changing screen.
Figure 7B:
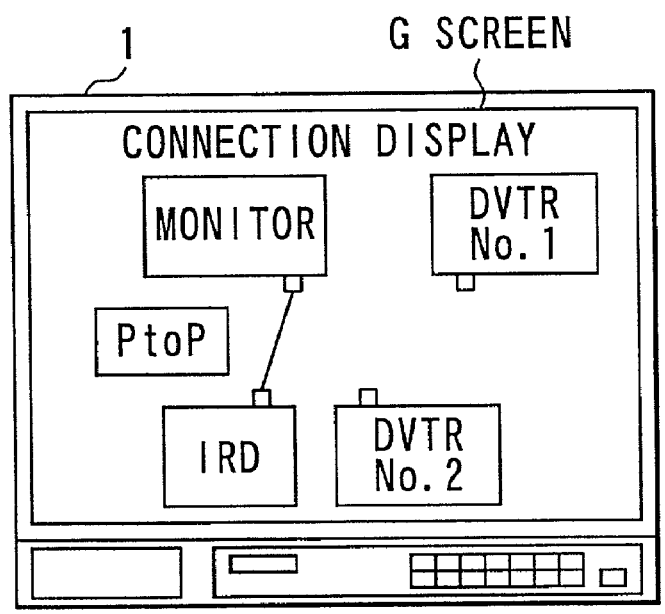

FIG. 7A and FIG. 7B are diagrams for describing another exemplary connection mode setting screen. The exemplary connection mode setting screen shown in FIG. 7A and FIG. 7B is also formed in the connection management memory 24 of the monitor apparatus 1 based on the information on the connection table. The connection is displayed iconically in FIG. 7A and FIG. 7B, in which the monitor apparatus 1 appears as the input apparatus and the IRD 2, the DVTR 3, and the DVTR 4 appear as the output apparatus.

In other words, icons that instruct the electronic apparatus that form a network are displayed on the display screen G of the display element of the monitor apparatus 1 based on the connection table information formed in the connection management memory 24. In the case that a channel has been formed already between the monitor apparatus 1 and another electronic apparatus, the electronic apparatus having the channel between the electronic apparatus and the monitor apparatus 1 and the connection mode of the channel are displayed on the display screen G of the display element of the monitor apparatus 1.

In the present embodiment, the monitor apparatus 1 and the IRD 2 form broadcast connection as described hereinabove. Therefore, the monitor apparatus 1 is connected with a line to the IRD 2 and the characters for instructing the connection mode "Broadcast" are displayed on the side of the line as shown in FIG. 7A.

Also in this case, by operating, for example, the upward arrow key or downward arrow key of the remote commander 40 of the monitor apparatus 1 to change the connection mode, the character display for instructing the connection mode is changed as shown in FIG. 7B, and by pushing down the deciding key of the remote commander 40, the connection mode of the channel formed already between the monitor apparatus 1 and the IRD 2 is changed. In the exemplary case described hereinabove, the channel formed in the broadcast connection mode can be changed to a channel formed in the PtoP connection mode.

Furthermore, the connection mode may be set previously to the electronic apparatus to which a channel is not yet formed by use of the connection mode setting screen on which current connection is displayed as shown in FIG. 7A and FIG. 7B. In the present embodiment, because the monitor apparatus 1 is the input apparatus, for example, a line that connects between the monitor apparatus 1 and a selected electronic apparatus is displayed by selecting an output apparatus by use of the remote commander 40.

Characters for instructing the connection mode display that is changeable successively is displayed as in the case of character display for instructing the above-mentioned connection mode on the side of the displayed line. In other words, "Broadcast" or "PtoP" is displayed so as to be selectable. When the connection mode is set in the case that a channel is formed, the display of the line that connect between electronic apparatus and the display of the connection mode is displayed in a different mode from the case of the channel that has been formed already, for example, the display is displayed in different color.

By introducing the above-mentioned displaying method, when a user operates the remote commander 40 to set or change the connection mode, a user can discriminate between the operation for changing the connection mode of the channel that has been formed already and the operation for previously setting of connection mode of the channel to be formed later. Thereby, the user can perform operation correctly without mis-operation and mis-information input.

The connection mode setting screen is displayed in the form of icon display as shown in FIG. 7A and FIG. 7B, and a user can be thereby aware of the current connection state and changed or set contents easily.

As described hereinbefore, the connection mode of a channel to be formed is determined for an electronic apparatus connected to a digital bus according to the predetermined condition, and the information is stored. Therefore, when the connection is to be changed, in some cases, a notice that the connection mode is changed is notified from the input apparatus to the output apparatus.

For example, though the monitor apparatus 1, namely the input apparatus, requests the IRD 2, namely the output apparatus, to form a channel in the PtoP connection mode, the information stored in the IRD 2 can be, for example, the information for instructing that the data is not transmitted to the monitor apparatus in the PtoP connection mode. In such case, the information should be rewritten temporarily.

When it is required that the change of connection mode is notified to the output apparatus as described hereinabove, the monitor apparatus 1 inquires of each electronic apparatus for the predetermined connection mode to be connected to the monitor apparatus 1 as described hereinabove, and the monitor apparatus 1 can be aware of the connection mode. If it is required to notify the change of the connection mode to the output apparatus, then the connection mode change is notified from the input apparatus to the output apparatus.

The notice is notified by use of AV/C Command specified by, for example, the IEEE 1394 standard digital interface. As a matter of course, the notice may be notified by use of other methods.

Figure 8:
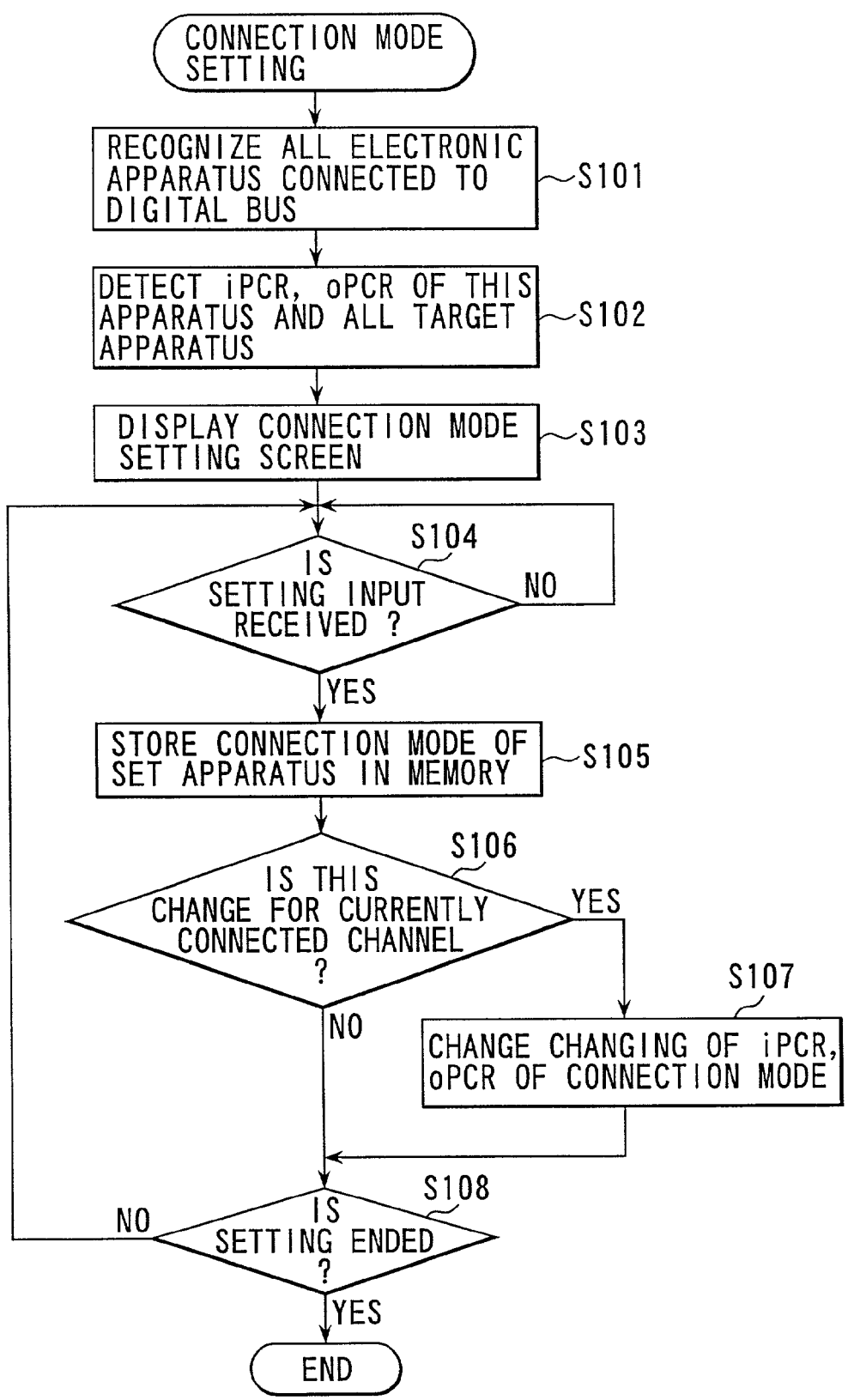
FIG. 8 is a flowchart for describing the connection mode setting routine.

Next, the setting routine of the connection mode performed in the monitor apparatus 1 of the present embodiment will be described with reference to a flowchart shown in FIG. 8. FIG. 8 is a flowchart for describing the connection mode setting routine performed in the monitor apparatus 1 of the present embodiment. The routine shown in FIG. 8 is implemented by means of the control unit 20 when the monitor apparatus 1 is connected to the IEEE 1394 standard digital bus and the power source is turned on.

When the routine shown in FIG. 8 is started, at first the control unit 20 controls the IEEE 1394 I/F circuit 12 to inquire of all the electronic apparatus that are connected to the digital bus to thereby recognize the type of each electronic apparatus connected to the digital bus and recognize the channel connection mode of each electronic apparatus through which the monitor apparatus 1 (this apparatus) is connected (step S101).

Next, the control unit 20 controls the IEEE 1394 I/F circuit 12 to detect iPCR and oPCR of all the electronic apparatus connected to this apparatus and the digital bus (step S102). In step S102, if a channel that has been formed already at that time point is found, then whether the connection mode of the channel formed between this apparatus and another electronic apparatus is the broadcast connection mode or the PtoP connection mode is detected.

The control unit 20 displays the connection mode setting screen on the screen of the display element of the monitor apparatus 1 as described with respect to FIG. 6A and FIG.

6B or FIG. 7A and FIG. 7B based on the information detected in S102 (step S103).

The control unit 20 determines whether a setting input entered by a user by use of the remote commander 40 has been accepted or not (step S104), and if a setting input is determined to be accepted, then the connection mode of the set apparatus is stored in the connection table of the connection management memory 24 (step S105).

Then, whether it is associated with the connection mode change of the channel formed currently between this apparatus and the electronic apparatus or not is determined (step S106), and if the connection mode change of the channel formed currently is determined to be instructed by a user, then the control unit 20 controls the IEEE 1394 I/F circuit 12 to change iPCR of this apparatus and oPCR of the target apparatus (step S107).

In the determination processing of step S106, if the setting input is determined to be not associated with the connection mode change of the channel formed currently between this apparatus and the electronic apparatus, or if the connection mode change in step S107 has been ended, then whether the setting by the user has been ended or not is determined (step S108).

In the determination in step S108, if the connection mode setting to all the electronic apparatus has not been ended and a setting instruction has not been entered, then the sequence following to step S104 including step S104 is repeated, and the connection mode corresponding to each electronic apparatus is set. If the setting is determined to be ended in the determination processing in step S108, the routine shown in FIG. 8 is brought to an end.

As described hereinabove, in the network of electronic apparatus connected through the IEEE 1394 standard digital interface, the connection mode of the channel formed between a predetermined input apparatus and the output apparatus can be set or can be changed by a user. Thereby, the output apparatus will not be changed without intention of a user.

When a channel is to be formed between the monitor apparatus 1 and another electronic apparatus newly, a channel is formed between the monitor apparatus 1 and the target electronic apparatus correspondingly to the connection mode that is set in the connection table with reference to the connection table for forming the channel in step S105 shown FIG. 8, and as the result a channel is formed between the monitor apparatus 1 and the target electronic apparatus in connection mode according to the instruction given by the user.

The connection mode may be changed many times as desired on the connection mode setting screen based on the connection table formed in the connection management table of the monitor apparatus 1 as required.

In the present embodiment, the merchandise category information of SDD information is used as the information to specify the electronic apparatus, however, it may be used otherwise. For example, the information may be used as the information to specify the maker name, the type of the apparatus, or other information in addition to the merchandise category information.

[Timing for Forming Connection Table]

In the above-mentioned embodiment, when the monitor apparatus 1 is connected to the IEEE 1394 standard digital bus and the power source is turned on, the monitor apparatus 1 inquires of the electronic apparatus connected to the digital bus, obtains the necessary information, displays the connection mode setting screen, and then sets the connection mode. However, the timing for inquiring for the necessary information and for setting the connection mode is by no means limited to the timing described hereinbefore.

For example, it is possible to start a series of processing for newly setting the connection mode for forming a channel between electronic apparatus when a new setting request of connection state that is entered by a user, for example, by means of the remote commander 40 is supplied to the monitor apparatus 1 in the case that the user disconnects the electronic apparatus from the network or connects a new electronic apparatus to the network.

Otherwise, the monitor apparatus 1 itself has been structured so as to detect that change of the network, for example, the change in which an electronic apparatus connected to the network is disconnected or the change in which a new electronic apparatus is connected to the network, and when the monitor apparatus 1 detects the change of the network, a series of processing for newly setting the connection mode for forming a channel between electronic apparatus is started.

In the network that is formed by connecting electronic apparatus through the IEEE 1394 standard digital bus, when an electronic apparatus is disconnected from the network or when a new electronic apparatus is digitally connected to the network, the change is detected and the topology (connection configuration) is restructured.

Therefore, when an electronic apparatus is disconnected from the network formed through the IEEE 1394 standard digital bus or when a new electronic apparatus is connected to the network, the change is notified to each electronic apparatus. Upon receiving the notice, the IEEE 1394 I/F circuit 12 of the monitor apparatus 1 notifies the change of the network to the control unit 20.

When the change of the digital network is notified from the IEEE 1394 I/F circuit 12 to the control unit 20, the control unit 20 may start a series of processing for forming the above-mentioned contact table.

Furthermore, as described hereinabove, the timing for forming the contact table may be selected from among three timings, namely (1) when the monitor apparatus 1 is connected to the digital bus and the power source is turned on, (2) when a starting request for new setting of connection mode is supplied to the monitor apparatus 1 from a user, and (3) when the change of the network is detected. Thereby, the monitor apparatus 1 can hold the correct connection table always in the connection management memory 24 of the monitor apparatus 1, and can display the correct connection mode setting screen any time in response to a request from a user.

Therefore, as described hereinbefore, in the case of no change in the network connection relation, the connection mode setting screen is displayed based on the connection table formed already in the connection management memory 24 to change the setting of the connection mode, and the connection mode that has been set already may be changed.

[Other Example of Information to Specify the Electronic Apparatus Connected to the Network]

Furthermore, in the embodiment described hereinabove, the information for specifying an electronic apparatus that is to be served as an output apparatus for supplying the digital data to the monitor apparatus through the IEEE 1394 standard digital bus is by no means limited to the information that uses the SDD (Self Describing Devices) information defined in the IEEE 1394 standard digital interface.

For example, a system for communicating the data having a descriptor in which the specific information in accordance with the interface is embedded between electronic apparatus has been arranged.

In this embodiment, otherwise, the monitor apparatus 1 served as the input apparatus for receiving the input of the signal refers the descriptor from the output apparatus supplied through the digital input/output terminal, and the specific information included in the descriptor is obtained as the information for specifying an electronic apparatus. In this case, the information that instructs the merchandise category corresponds to the specific information obtained from the descriptor.

In another method, the monitor apparatus 1 served as the input apparatus detects the information such as node ID defined in the IEEE 1394 standard digital interface. The control unit 20 of the monitor apparatus 1 estimates the topology (connection configuration) of the network formed by connecting by means of the IEEE standard digital bus to specify an electronic apparatus that is to be served as the output apparatus that will supply the digital data to the monitor apparatus 1.

As a matter of course, in the case that it is possible to specify an electronic apparatus that is to be served as the output apparatus to supply the digital data to the input apparatus based on other information that is detectable through the IEEE 1394 standard digital interface, that information may be used as the information used to specify an output apparatus.

Not only the information that is detectable through the IEEE 1394 standard digital interface but also the information obtained by inquiring of each electronic apparatus digitally connected to the monitor apparatus 1 for the information to specify an electronic apparatus through the digital bus or, for example, another transmission line or wireless line other than the digital bus may be received for specifying an electronic apparatus.

In summary, an electronic apparatus that receives the digital signal may obtain the information for specifying an electronic apparatus that transmits the digital signal by means of various methods. As a matter of course, in the case that a channel has been connected already, a method may be employed, in which iPCR and oPCR of the monitor apparatus 1 and each electronic apparatus are detected and are correlated to the connection mode.

In the present embodiment, the case in which the monitor apparatus 1 is assumed to be an input apparatus for receiving the digital data and another apparatus is assumed to be an output apparatus for supplying the digital data to the monitor apparatus 1 is described, however, the input apparatus is by no means limited to the monitor apparatus 1. For example, in the case of the network of electronic apparatus of the above-mentioned embodiment, the DVTR 3 or the DVTR 4 may be regarded as the input apparatus for receiving supply of the digital data.

In detail, the DVTR 3 or the DVTR 4 is provided with a display element such as LCD (Liquid Crystal Display) that is capable of displaying the display of various display information and provided with a connection management memory and various functions such as connection table forming function, display function for displaying the information used for connection mode setting change, and function for connection mode setting change as in the case of the above-mentioned monitor apparatus 1, and thereby the connection mode of a channel formed between the DVTR 3 or the DVTR 4 and another electronic apparatus may be changed or set previously.

Figure 9:
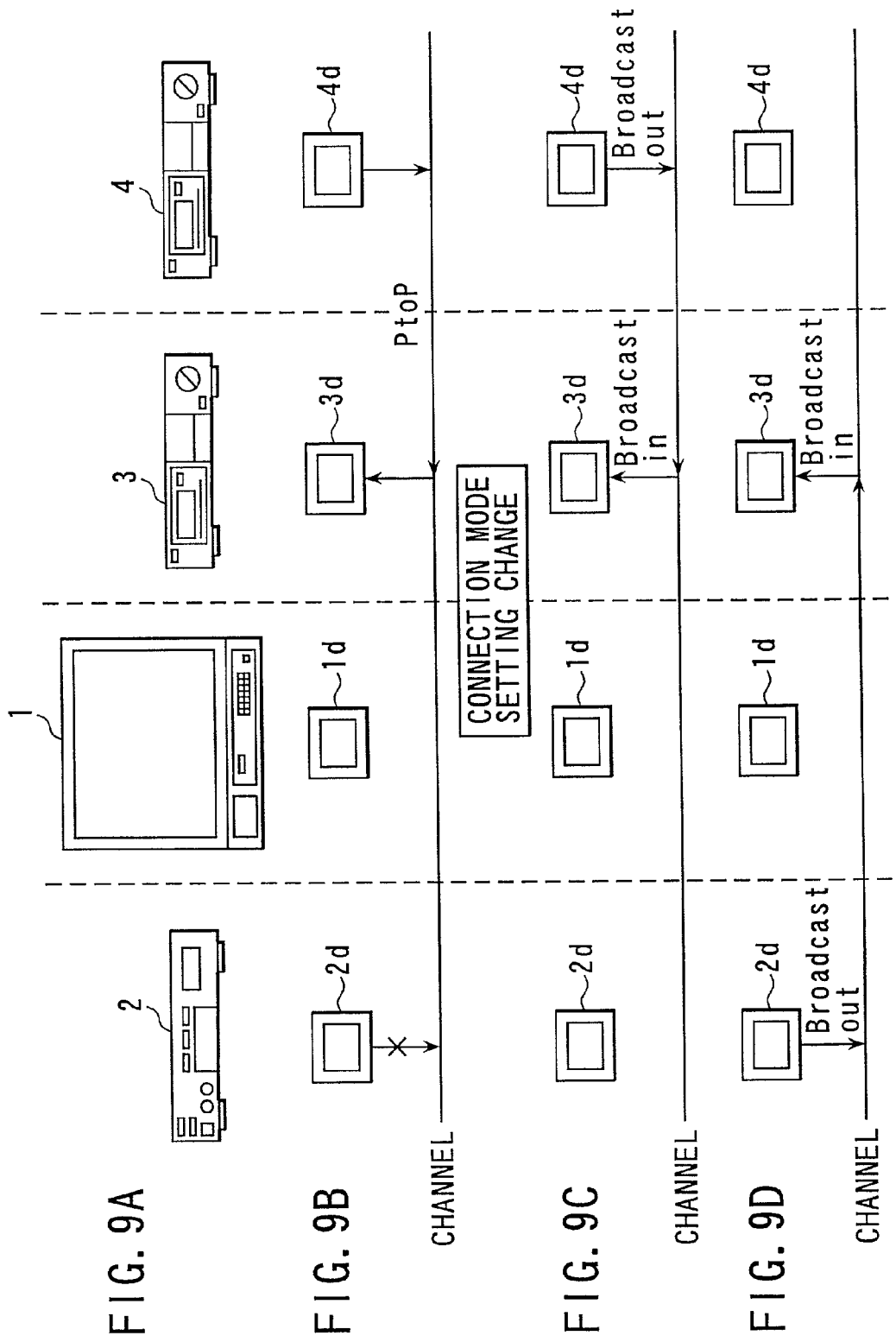
FIG. 9A to FIG. 9D are diagrams for describing the case in which a channel formed in the broadcast connection mode to a channel formed in the PtoP connection mode.
Figure 10:
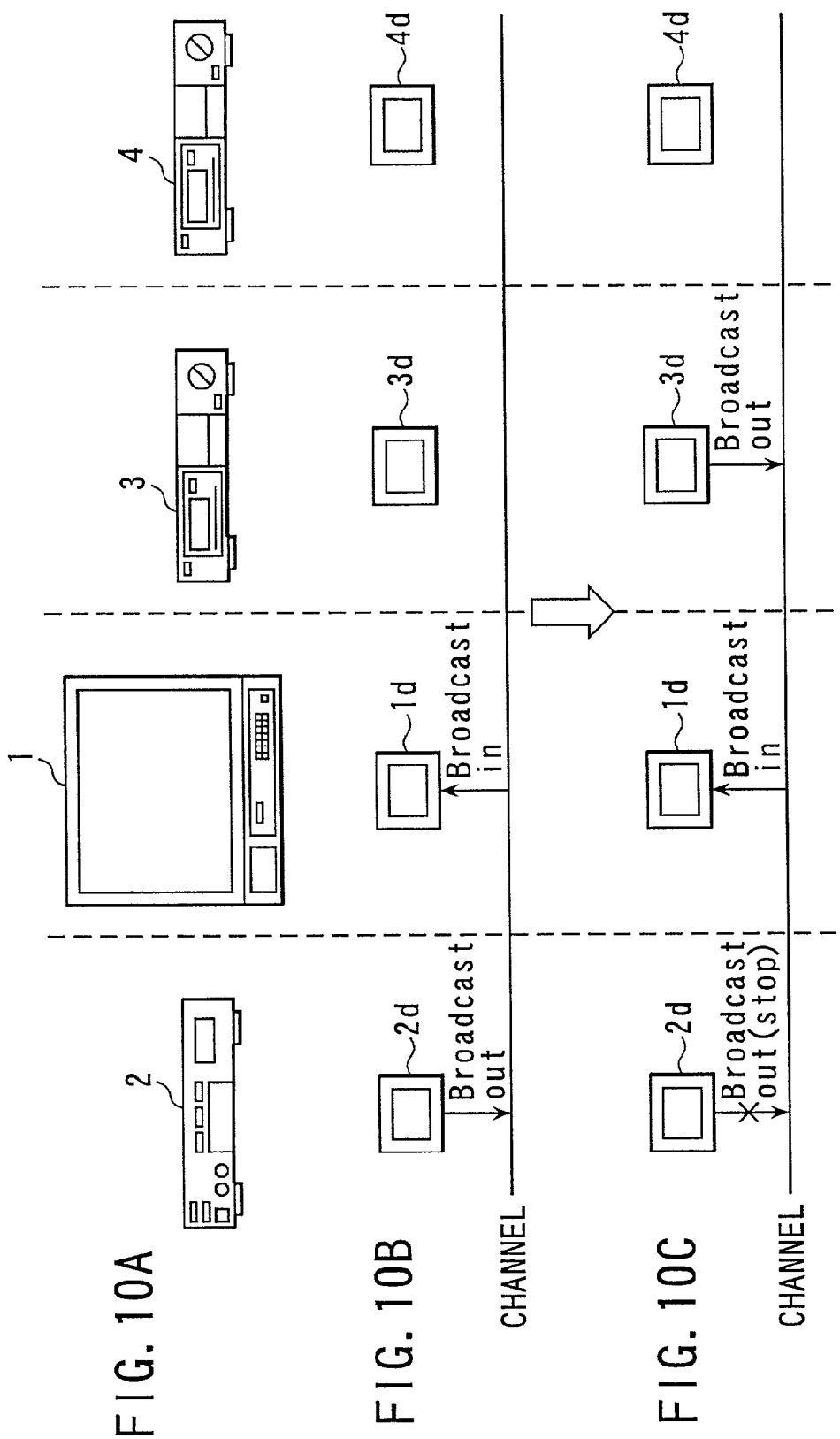
FIG. 10A to FIG. 10C are diagrams for describing the broadcast connection mode.
Figure 11:
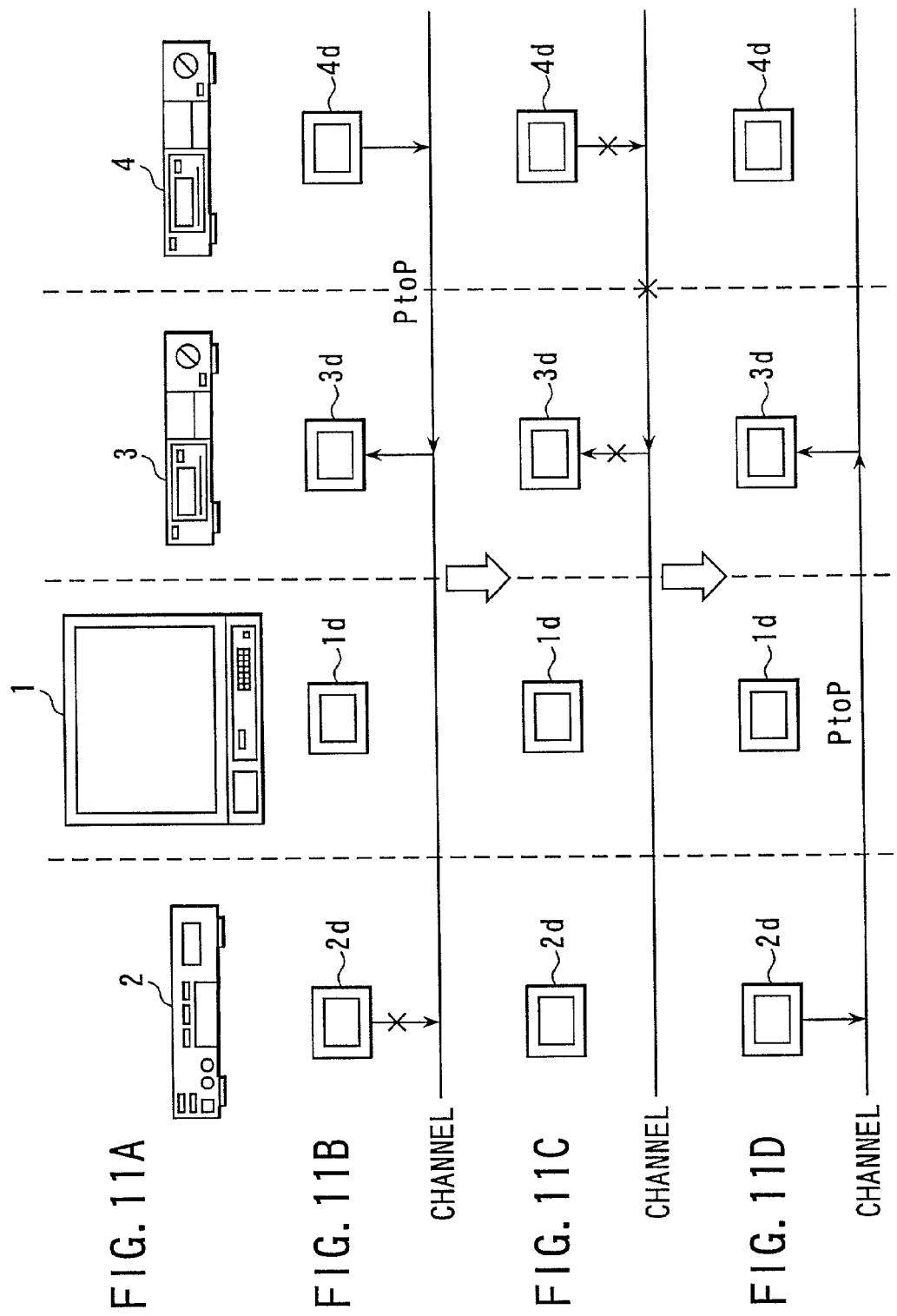
FIG. 11A to FIG. 11D are diagrams for describing the PtoP connection mode.

FIG. 9A to FIG. 9D are diagrams for describing a case in which the DVTR 3 is served as the input apparatus. In the network of electronic apparatus of the embodiment shown in FIG. 9A, for example, the case in which the digital data is doubled between the DVTR 3 and the DVTR 4 is exemplified as shown in FIG. 9B.

In this case, as described hereinabove, a channel is formed in the PtoP connection mode between the input apparatus (the DVTR 3) and the output apparatus (DVTR 4) in response to a request supplied from the input apparatus (the DVTR 3) usually.

However, in the case that a channel is formed between the DVTR 3 and the DVTR 4 in the PtoP connection mode, when the digital data supplied from the IRD 2 is to be recorded on a video tape by means of the DVTR 3, a user sets the network so that the PtoP connection between the DVTR 3 and the DVTR 4 is canceled, and the digital data supplied from the IRD 2 is thereafter received by means of the DVTR 3. The sending out instruction of the digital data should be instructed also to the IRD 2, and the instruction to start recording should be instructed to the DVTR 3.

Therefore, in some cases, the supply of the digital data from the IRD 2 cannot be switched to the DVTR 3 quickly for recording. To solve the above-mentioned problem, a connection table including the DVTR 3 as an input apparatus is formed also in the DVTR 3. The connection mode of the channel formed between the DVTR 3 and the DVTR 4 is changed to the broadcast connection mode as shown in FIG. 9C in the same way as used for changing the connection mode of the channel formed between the above-mentioned monitor apparatus 1 and the IRD 2.

As a matter of course, in the case that a channel is formed between the DVTR 4 and the DVTR 3 that is served as an input apparatus in the connection table formed in the connection management memory of the DVTR 3, the desired connection mode may be set previously so as to form the broadcast connection.

As described hereinabove, the connection mode of a channel between the DVTR 3 and the DVTR 4 between which usually a channel is formed in the PtoP connection mode may be set previously. In this exemplary case, a user can cancel the broadcast connection between the DVTR 3 and the DVTR 4 and form a new channel between the DVTR 3 and the IRD 2 in the broadcast connection mode only by operating the IRD 2 so as to receive the digital television broadcast program and to transmit it while the digital video signal supplied from the DVTR 4 is being copied to the DVTR 3.

Therefore, in this exemplary case, even though in the state that the DVTR 3 receives supply of the digital data from the DVTR 4, the DVTR 3 can start recording of the digital data supplied from the IRD 2 immediately when the digital data is sent out from the IRD 2.

As described hereinabove, the present invention is applied to various information output apparatus that receives the digital data and sends it out in various forms. The change from the broadcast connection mode to the PtoP connection mode, the change from the PtoP connection mode to the broadcast connection mode, and setting of the connection mode before a channel is formed are realized.

In the above-mentioned embodiment, it is possible to manage the connection involving the specific electronic apparatus such as the monitor apparatus 1 or the DVTR 3 as the input apparatus and involving an electronic apparatus that is to be served to supply the digital data to this apparatus as the output apparatus in the input apparatus.

Therefore, in the case that the monitor apparatus is used as the input apparatus, the management of the connection where another electronic apparatus is used as the input apparatus is not performed in the input apparatus 1, but the management where this apparatus is served as the input apparatus is performed in another electronic apparatus. However, the connection may not be managed for every input apparatus as described hereinabove.

For example, a method may be employed, in which a predetermined electronic apparatus connected to the network is regarded as the central electronic apparatus, and the connection of all the electronic apparatus connected to the network to which that electronic apparatus is connected is managed by the central electronic apparatus. For example, in the network of the above-mentioned embodiment, the monitor apparatus 1 manages the connection including the case in which the DVTR 3 or the DVTR 4 is served as the input apparatus.

The connection table used for managing the connection of all the electronic apparatus of the network formed in the connection management memory 24 of the monitor apparatus 1 is structured so that every electronic apparatus can refer the connection table through the IEEE 1394 standard digital bus and the IEEE 1394 I/F circuit. Furthermore, the monitor apparatus 1 is structured so as to give the instruction to each electronic apparatus for setting or changing the connection mode.

By structuring as described hereinabove, the connection mode between all the apparatus of the network can be changed or set by means of the monitor apparatus 1. In the case that a predetermined electronic apparatus is structured to function so as to manage the connection and to change the connection mode of all the electronic apparatus, when the connection mode between the electronic apparatus that form a channel in the PtoP connection mode is to be changed, it is required to send out a request for canceling the PtoP connection.

The reason is that, in the case that a channel is formed in the PtoP connection mode, the PtoP connection can be canceled only from an electronic apparatus that forms a channel in the PtoP connection mode, namely an input apparatus that receives the digital data through a channel formed by the PtoP connection mode.

Therefore, in the case that an electronic apparatus having the connection mode that a user want to change is an apparatus connected in the PtoP connection mode, namely an electronic apparatus that sends out the digital data through a channel formed in the PtoP connection mode, the target apparatus is found out, and the target apparatus is requested to cancel the PtoP connection.

The target apparatus is detected based on iPCR and oPCR of the channel detected from each electronic apparatus. When the electronic apparatus that has formed a channel of the PtoP connection is requested to cancel the PtoP connection, a request for cancellation of the channel formed in the PtoP connection mode (cancellation request for the PtoP connection) is transmitted by use of, for example, AV/C command defined in the IEEE 1394 standard digital interface. As a matter of course, the cancellation request for the PtoP connection may be transmitted by means of another method.

In the above-mentioned embodiment, an electronic apparatus connected to the digital bus is recognized and it is notified, and in the case that there is an electronic apparatus that has formed a channel at that time point, the apparatus and the connection mode are detected and notified. However, it is not necessarily required to detect and notify the information of the electronic apparatus connected to the digital bus and the information of the formed channel.

In detail, the apparatus for forming a channel and the connection mode of the channel are set when the AV apparatus network formed in home as described hereinbefore is used. The setting is performed from a predetermined electronic apparatus connected to the network, for example, the monitor apparatus 1. The setting performed at that time is stored in the memory of the monitor apparatus 1 in the same manner as in the case of the above-mentioned connection table, and a channel is formed in the connection mode corresponding to the setting when a set channel is formed.

As a matter of course, otherwise, an electronic apparatus connected to the network is detected and notified to thereby set the connection mode between electronic apparatus connected to the network. In other words, without a notice of information on a channel formed at that time point, a user can set or change the connection mode of a channel between predetermined electronic apparatus correspondingly to the purpose.

As described hereinabove, by notifying the electronic apparatus connected to the network, selection of a target electronic apparatus that forms a channel and setting of the connection mode can be performed simply and correctly. Furthermore, in this case, because whether the target apparatus that forms a channel described hereinabove or the output apparatus described in the above-mentioned embodiment is an apparatus that requires the notice of connection mode change or not can be known, the notice of connection mode change is notified as required, a channel is formed between electronic apparatus properly, and the digital data is communicated.

Furthermore, in the case that the information on the channel formed at that time point is also notified, because the information that a channel is formed in what connection mode between what electronic apparatus is notified, a user can recognize the information, and can change the connection mode as required.

In the above-mentioned embodiment, an exemplary case in which a monitor apparatus or a DVTR having an display element is served as an input apparatus is described, however, the input apparatus is by no means limited to these apparatus, but the present invention is applied to various electronic apparatus having the information display function as in the case of the above-mentioned embodiment.

In the above-mentioned embodiment, the connection of the electronic apparatus is notified to a user by means of a display element of a monitor apparatus or DVTR that displays a connection mode setting/changing screen, however, the notification is by no means limited to this case. For example, the connection of the electronic apparatus may be notified by means of voice or notified by means of printing on a paper by use of a printer connected to the input apparatus. In such case, a switch for switching the connection mode is provided on a remote commander or the like of the input apparatus. Otherwise, the connection mode may be switched in response to a connection mode switching request from a user without notice of connection.

In the above-mentioned embodiment, the exemplary case in which the IEEE 1394 standard digital interface is used is described, however, the digital interface is by no means limited to the IEEE 1394 standard digital interface. Various digital interfaces that are capable of transmission of the control information such as request for various information or data other than the digital data such as the video signal and audio signal may be used.

Furthermore, in the above-mentioned embodiment, the system is structured by use of so-called digital AV apparatus such as monitor apparatus, IRD, and DVTR, however, the apparatus is by no means limited to these digital AV apparatus. For example, the present invention can be applied to the information output apparatus that constitutes a system to which a computer apparatus is connected.

Furthermore, when the setting of the connection mode is to be changed, (1) the connection mode is changed correspondingly to the function of the electronic apparatus, or (2) the connection mode is changed correspondingly to combination of the electronic apparatus to be connected.

For example, in an example of (1), in the case that the input apparatus is a recording/reproducing apparatus involving a recording medium such as a DVTR or DVD, a method may be employed, in which a channel that has been formed in the broadcast connection mode is changed to a channel that is to be formed in the PtoP connection mode for recording, and a channel that has been formed in the PtoP connection mode is changed to a channel that is to be formed in the broadcast connection mode for reproduction.

For example, in an example of (2), in the case that a recording apparatus and a reproducing apparatus are connected as in the case of a DVTR and IRD, a method described herein under may be employed, in which a channel that has been to be formed in the broadcast connection mode is changed to a channel that is to be formed in the PtoP connection mode. Otherwise, in the case that one electronic apparatus is an electronic apparatus that mainly receives supply of the digital data and provides it to a user as in the case of the DVTR and monitor apparatus, a method as described herein under may be employed, in which a channel that has been to be formed in the PtoP connection mode is changed to a channel that is to be formed in the broadcast connection mode.

In the above-mentioned embodiment, the connection management memory 24 is assumed to be a non-volatile memory, in which the stored information is not deleted even though the power source of the monitor apparatus is turned off.

However, the memory may be structured so that the value of the connection table may be resumed to the initial value when, for example, the power source of the input apparatus is shutdown or the IEEE 1394 standard digital interface is subjected to resetting due to some external cause. Furthermore, when the information of the connection table becomes erroneous due to some external cause, the content of the connection table may be confirmed, reformed, or resumed to the initial value.

Otherwise, to change the connection mode only during use, a method described herein under may be employed, in which a memory for temporarily storing the information to specify the target apparatus and the channel connection mode, and a memory for continuously storing the information for specifying the target apparatus for forming a channel always in the connection mode and the channel connection mode are provided, and the information for specifying the target apparatus and the channel connection mode are stored in the continuously storing memory only when a channel is formed always in the set connection mode.

In this case, when the connection mode is set in the case that a channel is to be formed between selected electronic apparatus, a confirmation whether a user wants to form a channel in the set connection mode or not is requested, if the user requests a channel formed always in the set connection mode, then the information to specify the target apparatus and the channel connection mode are stored in the continuously storing memory.

It is not necessary to provide the temporarily storing memory and the continuously storing memory separately, but a temporarily storing area and a continuously storing area are provided in a memory and different data are stored separately in the respective areas.

The function to change or set the connection mode may be given both to an electronic apparatus that is served as the input apparatus and an output electronic apparatus that is served as the output apparatus. As a matter of course, an electronic apparatus to which a channel is formed always may not have the function to change or set the connection mode.

In the above-mentioned embodiment, the connection mode setting screen that has been described with respect to FIG. 6A and FIG. 6B and FIG. 7A and FIG. 7B is only the example, and the connection mode setting screen may be formed in various manners that are easily understandable for a user and such screen is used.

As described hereinbefore, according to the present invention, the connection mode that is determined according to the predetermined condition can be changed to the connection mode that is set by a user. Thereby, the output apparatus will not be changed without intention of a user, and on the other hand the output apparatus can be changed without complex operation. In summary, many apparatus are connected flexibly, and it is possible to connect more electronic apparatus. Because a user can be aware of the connection between electronic apparatus, the user can recognize the connection correctly. The user can change or set the connection mode simply and correctly based on the notified information. The present invention provides an electronic apparatus that satisfies the user needs and a convenient network is formed.

Next, one embodiment of a transmission line using method, an information transmission system, and an electronic apparatus for solving the problem that a plurality of channels of the above-mentioned IEEE 1394 standard digital interface cannot be utilized effectively will be described hereinafter. In the embodiment described hereinafter, an exemplary case of the transmission line using method, the information transmission system, and the electronic apparatus applied to a home network system formed by connection digital AV apparatus having the IEEE 1394 standard digital interface will be described.

[Home Network System]

Figure 12:
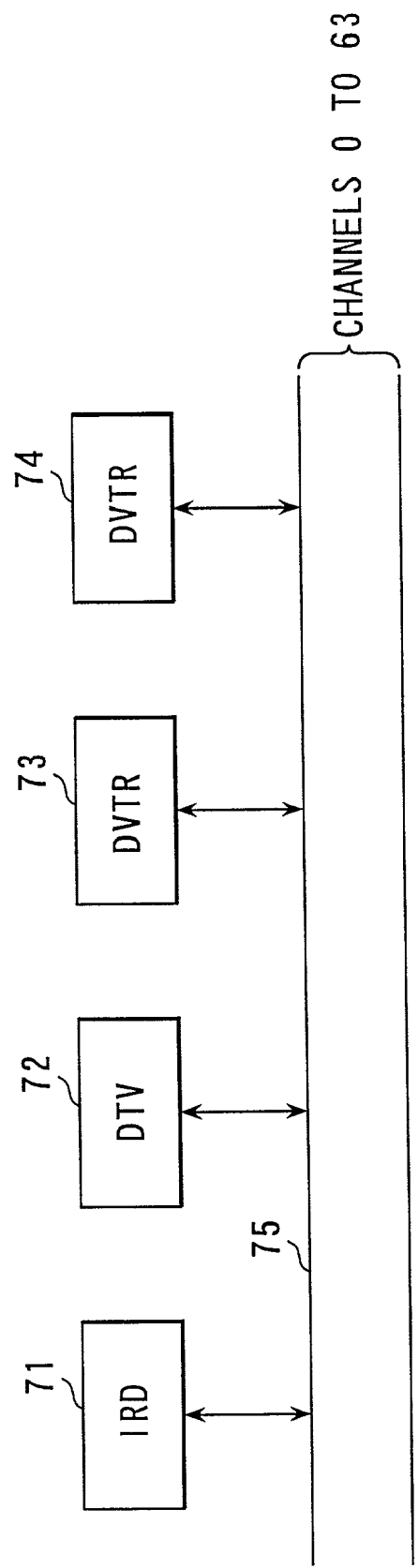
FIG. 12 is a diagram for illustrating a home network system to which an embodiment of an information transmission system in accordance with the present invention is applied.

FIG. 12 is a diagram for illustrating a home network system of the present embodiment. As shown in FIG. 12, the home network system of the present embodiment is formed by connecting an IRD (integrated receiver decoder) 1, a DTV (digital television receiver) 2, DVTR's (digital VTR) 3 and 4 having the IEEE 1394 standard digital interface.

The IEEE 1394 standard digital interface is served for transferring the digital data in two ways, namely asynchronous communication system and isochronous communication system. In the case of the asynchronous communication system, it is possible to transmit various quantities of data to a specified address and to obtain a response. On the other hand, in the case of isochronous communication system, it is possible to transmit various quantities of data to a transmission channel at intervals of a certain time. In the case of the isochronous communication system, no response to the transmitted data is obtained.

For example, various control data are transmitted by means of the asynchronous communication system. The real time data such as the video data or audio data is transmitted by means of the isochronous communication system. Furthermore, the IEEE 1394 standard digital interface is used for a plurality of transmission channels as described hereinabove. In the present embodiment, as shown in FIG. 12, the total 64 channels including from the channel having the channel No. 0 to the channel having the channel No. 63 can be used.

[IRD]

Next, each digital AV apparatus that constitute the home network system of the present embodiment will be described successively. Each of the AV apparatus described hereinafter is capable of processing not only the video signal but also the audio signal, however, description of the audio system is omitted for the purpose of simplification.

Figure 13:
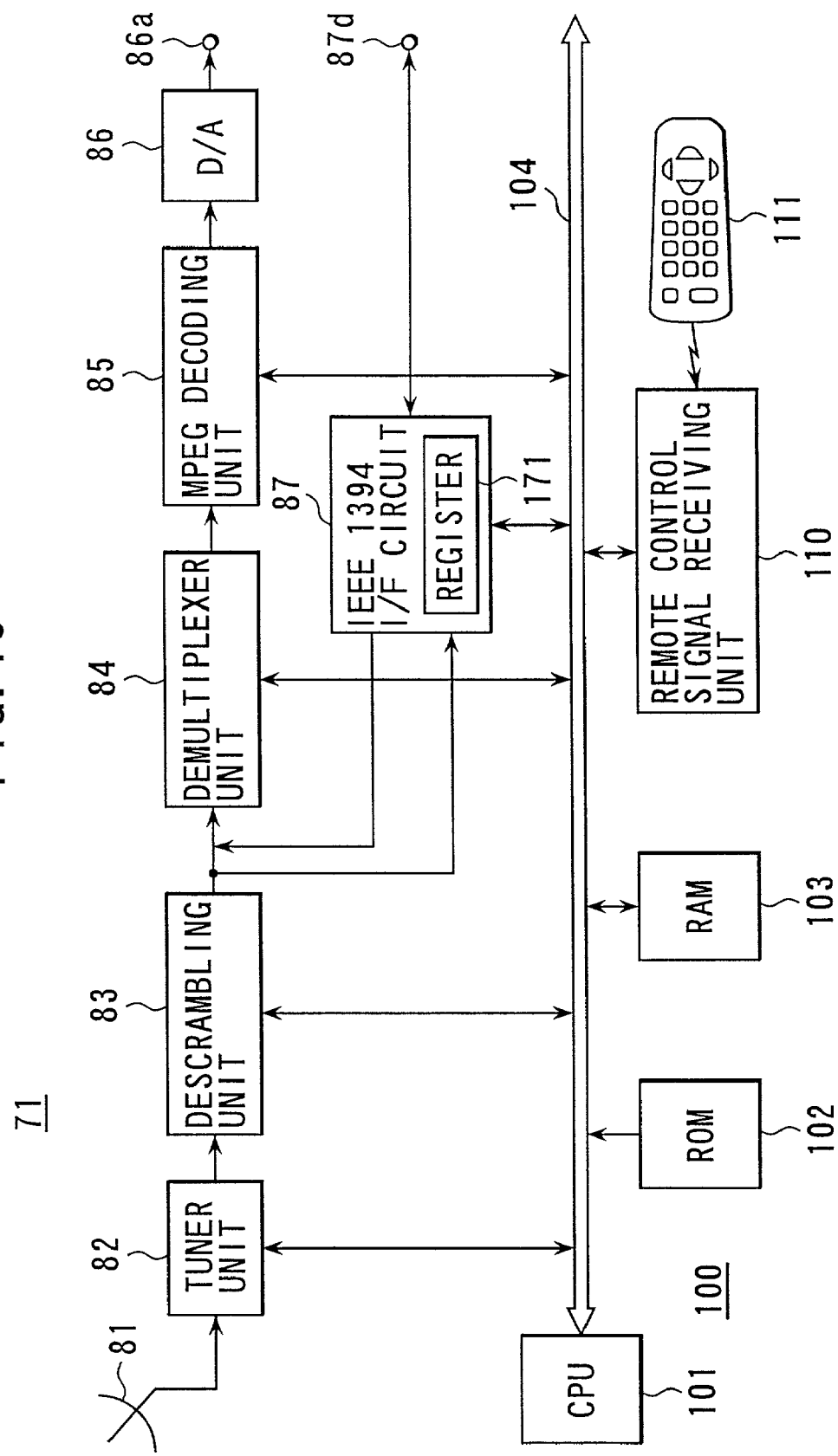
FIG. 13 is a block diagram for illustrating an IRD to which an embodiment of an electronic apparatus in accordance with the present invention is applied.

FIG. 13 is a diagram for describing the IRD 1 of the present embodiment. The IRD 1 of the present embodiment receives and tunes a digital satellite broadcast and demodulates it, and supplies the demodulated broadcast signal to an electronic apparatus such as the DTV or DVTR.

As shown in FIG. 13, the IRD 1 of the present embodiment is provided with a digital television broadcast receiving antenna 11, a tuner 12, a descrambling unit 13, a demultiplexer unit 14, an MPEG decoding unit 15, a digital/analog conversion unit (referred to as D/A conversion unit hereinafter), an analog output terminal 16a, the IEEE 1394 I/F circuit 17, a digital input/output terminal 17d, and a control unit 100.

The control unit 100 is a microcomputer formed by connecting a CPU 101, a ROM 102, and a RAM 103 through a CPU bus 104. Furthermore the control unit 100 is connected to a remote control signal receiving unit 110 that receives the remote control signal (infrared signal) from the remote commander 111 of the IRD 1, converts the remote control signal to the electric signal, and supplies it to the control unit 100.

The digital television broadcast signal received from the receiving antenna 11 is supplied to the tuner unit 12. The tuner unit 12 tunes the signal to the digital television broadcast signal to be received corresponding to the channel selection control signal supplied from the control unit 100, and demodulates the signal and supplies it to the descrambling unit 13. The channel selection control signal supplied to the tuner unit 12 is formed in the control unit 20 correspondingly to the channel selection instruction entered by a user to the IRD 1 by way of the remote commander 11 and the remote control signal receiving unit 110.

The descrambling unit 13 cancels the scrambling processing (enciphering processing) applied to the demodulated digital television broadcast signal by use of, for example, the information such as the deciphering key information supplied from the control unit 100. The digital television broadcast signal from which the scrambling has been canceled is supplied to the demultiplexer unit 14 and the IEEE 1394 I/F circuit 17.

In the case that the digital information signal supplied to the demultiplexer unit 14 is the signal that has been formed by multiplexing a plurality of broadcast programs or EPG (electronic program table), the demultiplexer unit 14 extracts a broadcast program or EPG corresponding to the instruction given by a user based on the selection control signal supplied from the control unit 100 corresponding to the selection instruction input given by the user, and supplies it to the MPEG decoding unit 15.

The MPEG decoding unit 15 subjects the digital video signal supplied to the MPEG decoding unit 15 to compression/expansion processing (MPEG decoding), the signal is thereby restored to the original uncompressed digital video signal, and the restored digital video signal is supplied to the D/A conversion unit 16. The D/A conversion unit 16 converts the digital video signal supplied to the D/A conversion unit to an analog video signal, and the analog video signal is sent out through an analog output terminal 16a.

The analog video signal sent out through the analog output terminal 16a is supplied to various electronic apparatus such as a recording apparatus, for example, a television receiver or a DVTR having an analog input terminal for using.

On the other hand, the IEEE 1394 I/F circuit 17 forms the packet digital data to be transmitted to the digital bus 5 from the digital broadcast signal supplied from the descrambling unit 13, and sends it out through a digital input/output terminal 17d. Furthermore, the IEEE 1394 I/F circuit 17 receives and takes the digital data from each electronic apparatus in this apparatus, and supplies it to the demultiplexer unit 14. Thereby, the video data is supplied from another electronic apparatus, the video data is decoded and converted to the analog signal, and sent out.

Furthermore, the IEEE 1394 I/F circuit 17 extracts the information such as SID of the sender electronic apparatus (apparatus ID) added to, for example, the head of a packet and supplies it to the control unit 100, or extracts the necessary information from the control information packet and supplies it to the control unit 100. Furthermore, the IEEE 1394 I/F circuit 17 forms a control information packet under the control performed by means of the control unit 100, and supplies it to the digital bus through the digital input/output terminal 17d.

The IEEE 1394 I/F circuit 17 of the IRD 1 is provided with a register 171 having an output plug control register (simply referred to as oPCR hereinafter) and an input plug control register (simply referred to as iPCR hereinafter) for connecting the channel in the broadcast connection mode (first connection mode) and the PtoP connection mode (second connection mode) as described hereinafter. By using the oPCR and/or iPCR of the register 171, a channel (transmission line) is connected between electronic apparatus connected to the digital bus 5 in the broadcast connection mode, the PtoP connection mode, or both broadcast connection mode and PtoP connection mode.

[DTV]

Figure 14:
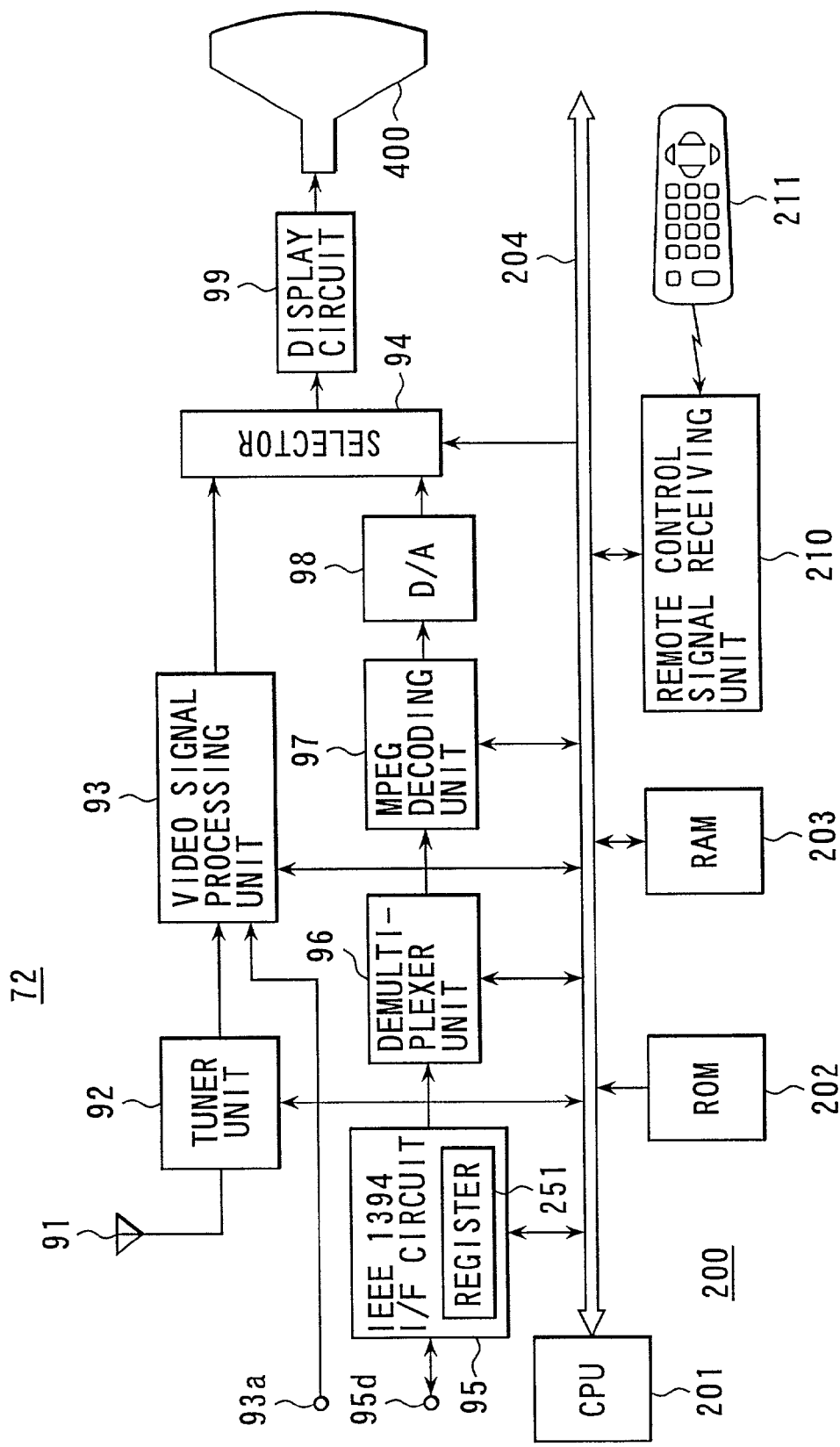
FIG. 14 is a block diagram for illustrating a DTV to which an embodiment of an electronic apparatus in accordance with the present invention is applied.

Next, the DTV 2 of the present embodiment will be described. FIG. 14 is a block diagram for illustrating the DTV 2 of the present embodiment. As shown in FIG. 14, the DTV 2 of the present embodiment is provided with an analog television broadcast antenna 21, an analog television broadcast tuner unit 22, a video signal processing unit 23, a selector 24, an IEEE 1394 I/F circuit 25, a demultiplexer unit 26, an MPEG decoding unit 27, a D/A conversion unit 28, a display circuit 29, a display element 30, and a control unit 200.

The control unit 200 is a microcomputer formed by connecting a CPU 201, a ROM 202, and a RAM 203 through a CPU bus 204 like the control unit 100 of the above-mentioned IRD 1. Furthermore, the control unit 200 is connected to a remote control signal receiving unit 210 for receiving a remote control signal (infrared signal) supplied from the remote commander 211 of the DTV 2, converting it to an electric signal, and supplying it to the control unit 200.

The analog television broadcast signal received by means of the receiving antenna 21 is supplied to the tuner unit 22. The tuner unit 22 tunes the signal to an analog television broadcast signal to be received corresponding to the channel selection control signal supplied from the control unit 200, and demodulates and supplies it to the video signal processing unit 23. Herein, the channel selection control signal to be supplied to the tuner unit 22 is generated in the control unit 200 correspondingly to the channel selection instruction entered by a user to the DTV 2 by way of the remote commander 211 and the remote control signal receiving unit 210.

The video signal processing unit 23 processes the video signal supplied to the video signal processing unit 23, and generates the output video signal. The output video signal generated by means of the video signal processing unit 23 is supplied to the selector 24. An analog input terminal 23a is connected to the video signal processing unit 23. The video signal processing unit 23 also processes the analog video signal supplied from an external apparatus through the analog input terminal 23a, and displays a picture corresponding to the analog video signal supplied from the external on the DTV 2.

In the present embodiment, the video signal processing unit 23 is switched between two operations. In one operation the video signal processing unit 23 processes the analog video signal supplied from the tuner unit 22 by use of the control signal generated in the control unit 200 correspondingly to the instruction input entered by a user by use of the remote commander 211 and sends it out. In the other operation the video signal processing unit 23 processes the analog video signal received through the analog input terminal 23a and sends it out.

On the other hand, the IEEE 1394 I/F circuit 25 has the almost same function as the IEEE 1394 I/F circuit 17 of the above-mentioned IRD 1. In detail, the IEEE 1394 I/F circuit 25 can take in the video data supplied from the IRD 1 through the digital input/output terminal 25d and the video data supplied from the DVTR's 3 and 4 that will be described hereinafter.

The IEEE 1394 I/F circuit 24 supplies the digital information in two ways. In detail, the IEEE 1394 I/F circuit 24 supplies the digital video signal to the demultiplexer unit 26 and supplies the sender node ID and the control information to the control unit 200. Furthermore, IEEE 1394 I/F circuit 25 generates a control information packet under the control performed by means of the control unit 100, and sends it out to the digital bus through the digital input/output terminal 25d.

However, the DTV 2 of the present embodiment sends out neither the video signal nor the audio signal as the sender by way of the IEEE 1394 I/F circuit 25. In other words, the DTV 2 is served as a receive only apparatus for the digital mail information signal such as digital video signal.

The IEEE 1394 I/F circuit 25 of the DTV 2 is provided with a register 251 having oPCR and iPCR for connecting a channel in the broadcast connection mode and the PtoP connection mode.

In the case that the digital video signal supplied to the demultiplexer 26 is the signal that has been formed by multiplexing a plurality of broadcast programs or EPG (electronic program table), the demultiplexer 26 extracts a broadcast program or EPG corresponding to the instruction entered by a user based on the selection control signal supplied from the control unit 200 correspondingly to the selection instruction input entered by the user, and supplies the extracted program or EPG to the MPEG decoding unit 27.

The MPEG decoder 27 subjects the digital video signal of the broadcast program supplied to the MPEG decoder 27 to compression/expansion processing (MPEG decoding) to restore the uncompressed digital video signal, and supplies the restored digital video signal to the D/A conversion unit 28. The D/A conversion unit 28 converts the digital video signal supplied to the D/A conversion unit 28 to the analog video signal, and supplies it to the selector 24.

The selector 24 switches the operation in two ways based on the switching control signal generated from the control unit 200. In one operation the selector sends out the analog video signal supplied from the video signal processing unit 23. In the other operation the selector sends out the analog video signal supplied from the D/A conversion unit 25. The switching control signal generated in the control unit 200 is generated correspondingly to the switching instruction entered by a user by use of the remote commander 211.

The analog video signal sent out from the selector is supplied to the display circuit 29. The display circuit 29 generates a signal to be supplied to the display element 30 from the requested video signal. The generated signal therein is supplied to the display element 30 such as a cathode ray tube or an LCD (Liquid Crystal Display) of the DTV 2, and a picture corresponding to the analog television broadcast video signal that has been received and tuned or a picture corresponding to the digital video signal supplied through the digital input/output terminal 25d is displayed on the display screen.

[DVTR]

Figure 15:
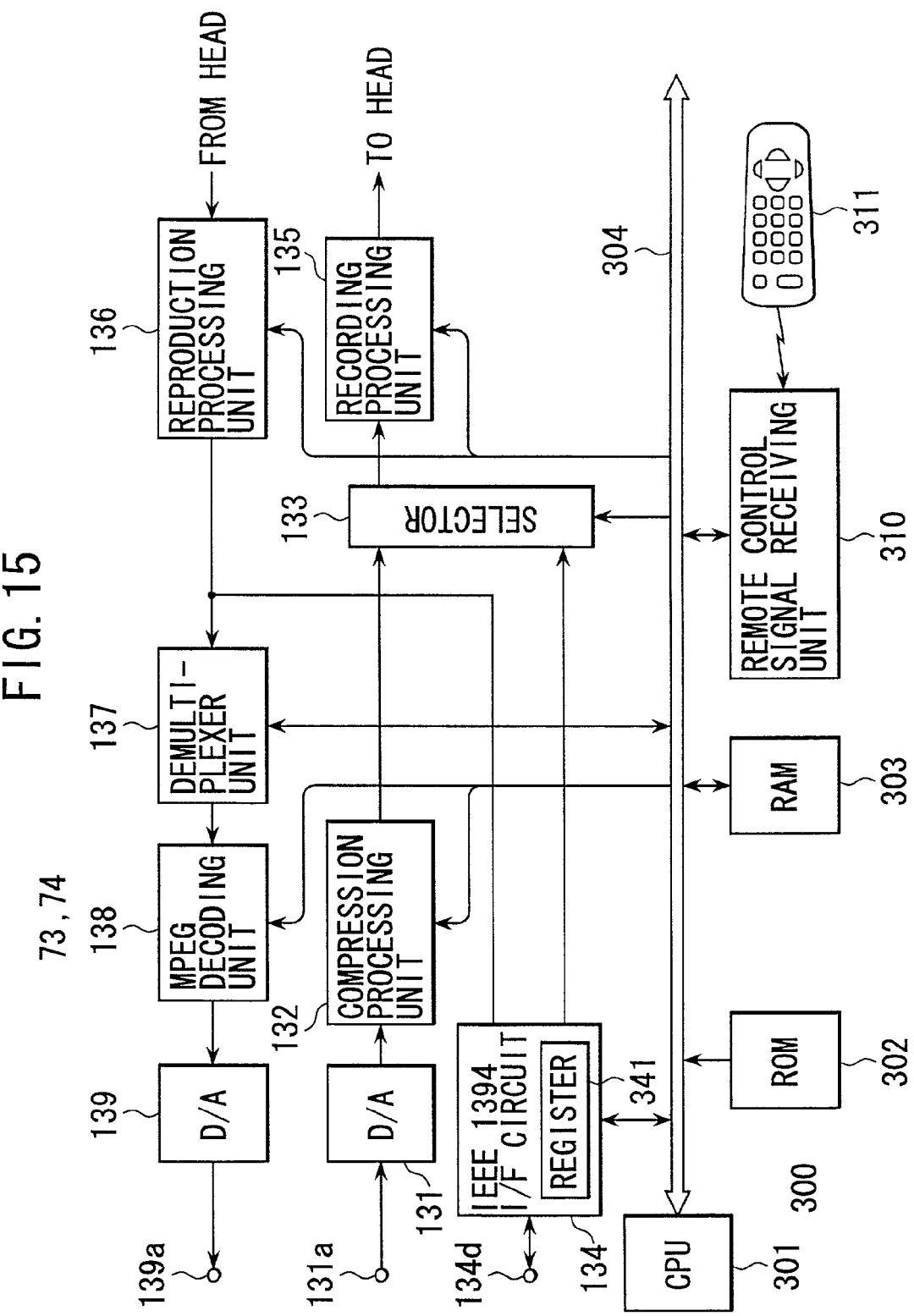
FIG. 15 is a block diagram for illustrating a DVTR to which an embodiment of an electronic apparatus in accordance with the present invention is applied.

Next, the DVTR's 3 and 4 of the present embodiment will be described. FIG. 15 is a block diagram for illustrating the DVTR's 3 and 4 of the present embodiment. In the present embodiment, the DVTR 3 and the DVTR 4 have the same structure.

As shown in FIG. 15, each of the DVTR's 3 and 4 of the present embodiment is provided with an analog input terminal 31a, an analog/digital conversion unit (referred to as A/D conversion unit hereinafter) 31, a compression processing unit 32, a selector 33, a digital input/output terminal 34d, an IEEE 1394 I/F circuit 34, a recording processing unit 35, a playback processing unit 36, a demultiplexer unit 37, an MPEG decoding unit 38, a D/A conversion unit 39, an analog output terminal 39a, and control unit 300.

The control unit 300 is a microcomputer that is formed by connecting a CPU 301, a ROM 302, and a RAM 303 through a CPU bus 304 like the above-mentioned control unit of the IRD 1 or DTV 2. Furthermore, the control unit 300 is connected to a remote control signal receiving unit 310 that receives the remote control signal (infrared signal) from a remote commander 311 of the IRD 1, converts it to an electric signal, and supplies it to the control unit 300.

Each of the DVTR's 3 and 4 of the present embodiment is provided with recording function. In detail, each DVTR receives supply of the analog video signal, converts it to the digital video data, and records the digital video data in a recording medium, or receives supply of the digital video data and records it in the recording medium. Furthermore, each of the DVTR's 3 and 4 of the present embodiment is provided with playback function. In detail, each DVTR reads out the digital video data recorded in a recording medium and sends out the analog video signal or the digital video signal as it is.

At first, the recording function of the DVTR's 3 and 4 is described. A user of the DVTR's 3 and 4 enters a selection input by use of the remote commander 311 to select any one of the analog video signal supplied through the analog input terminal 31a and the digital video data supplied through the digital input/output terminal 34d prior to starting of the recording processing. Correspondingly to the selection input, the control unit 300 generates a switching control signal for switching the selector 33, and supplies it to the selector 33 to switch the signal sent out from the selector 33.

In the case that the user selects the analog video signal supplied through the analog input terminal 31*a* and instructs to record the analog video signal, the control unit 300 controls all components to put this apparatus in the recording mode. The analog video signal supplied through the analog input terminal 31*a* is supplied to the A/D conversion unit 31.

The A/D conversion circuit 31 converts the supplied analog video signal to the digital video data, and supplies it to the compression processing unit 32. The compression processing unit 32 subjects the supplied digital video data to MPEG data compression processing in the present embodiment, and supplies the compressed digital video data to the selector 33.

Because the selector 33 is switched so as to send out the signal supplied from the analog input terminal 31*a* according to the selection instruction entered by the user as described hereinbefore, the compressed digital video data received from the compression processing unit 33 is supplied to the recording processing unit 35 through the selector 33.

The recording processing unit 35 generates the recording digital video data from the supplied digital video data and supplies it to a recording head. Thereby, the analog video signal supplied through the analog input terminal 31*a* is recorded digitally in a recording medium as the digital video data.

Similarly, in the case that a user selects the digital video data supplied through the digital input/output terminal 34*d* and instructs to record the digital video data, the digital video signal supplied through the digital input/output terminal 34*d* is taken in by means of the IEEE 1394 I/F circuit 34, and supplied to the selector 33.

The selector 33 is switched so as to send out the digital signal from the digital input/output terminal 34*d* correspondingly to the selection instruction entered by the user by use of the remote commander 311 as described hereinabove. Thereby, the digital video data taken in by means of the IEEE 1394 I/F circuit 24 is supplied to the recording processing unit 35 by way of the selector 33.

The recording processing unit 35 generates the recording digital video data from the received digital video data as described hereinabove and supplies it to the recording head. Thereby, the digital video data supplied through the digital input/output terminal 34*d* is recorded digitally in a recording medium.

As described hereinabove, the DVTR's 3 and 4 can record the signal digitally in a recording medium regardless of the type of the signal, namely the analog video signal supplied through the analog input terminal 31*a* or the digital video data supplied through the digital input/output terminal 34*d*.

Next, the playback function of the DVTR's 3 and 4 of the present embodiment will be described. When a user instructs playback by use of the remote commander 311, the control unit 300 controls all components to put this apparatus in the playback mode. The control unit 300 controls the playback processing unit 36 to read out the digital signal recorded in a recording medium, and the digital signal is demodulated and supplied to the demultiplexer unit 37 and the IEEE 1394 I/F circuit 34.

In the case that the supplied digital signal is a signal that has been formed by multiplexing a plurality of programs, the demultiplexer unit 37 extracts the digital video signal of the program to be viewed corresponding to the selection instruction entered by the user by use of the remote commander 311, and supplies it to the MPEG decoding unit 38.

The MPEG decoding unit 38 subjects the supplied digital video signal to compression/expansion processing to restore it to the uncompressed original digital video signal, and supplies it to the D/A conversion unit 39. The D/A conversion unit 39 converts the digital video signal supplied to the D/A conversion unit 39 to the analog video signal, and sends it out through the analog output terminal 39*a*. The analog video signal is supplied to an electronic apparatus such as an analog monitor apparatus for using.

On the other hand, the IEEE 1394 I/F circuit 34 that has received the digital signal from the playback processing unit 36 generates the packet transmission data from the supplied digital signal. Then, the IEEE 1394 I/F circuit 34 sends out the packet data through the digital input/output terminal 34 to thereby transmit it to an electronic apparatus connected to the digital bus.

As described hereinabove, the DVTR's 3 and 4 of the present embodiment can generate not only the analog output but also the digital output from the video signal recorded digitally in a recording medium.

The IEEE 1394 I/F circuit 34 of the DVTR 3 and 4 of the present embodiment has the same structure as the IEEE 1394 I/F circuit 17 of the above-mentioned IRD 1. In other words, the IEEE 1394 I/F circuit 34 can perform variously, the IEEE 1394 I/F circuit 34 takes in the digital data from each electronic apparatus through the digital bus, and generates the packet digital data to be supplied to another electronic apparatus and sends it out to the digital bus as described hereinabove.

Furthermore, the IEEE 1394 I/F circuit 34 extracts the necessary information such as SID of a sender electronic apparatus (apparatus ID) from the received packet and supplies it to the control unit 300, or extracts the necessary information from the control information packet and supplies it to the control unit 300. Furthermore, the IEEE 1394 I/F circuit 34 generates the control information packet under the control performed by means of the control unit 300 and sends it out to the digital bus through the digital input/output terminal 34*d*.

Furthermore, the IEEE 1394 I/F circuit 34 of each of the DVTR's 3 and 4 is provided with a register 341 having oPCR and iPCR for connecting the channel in the broadcast connection mode and the PtoP connection mode.

[oPCR and iPCR]

Figure 16:
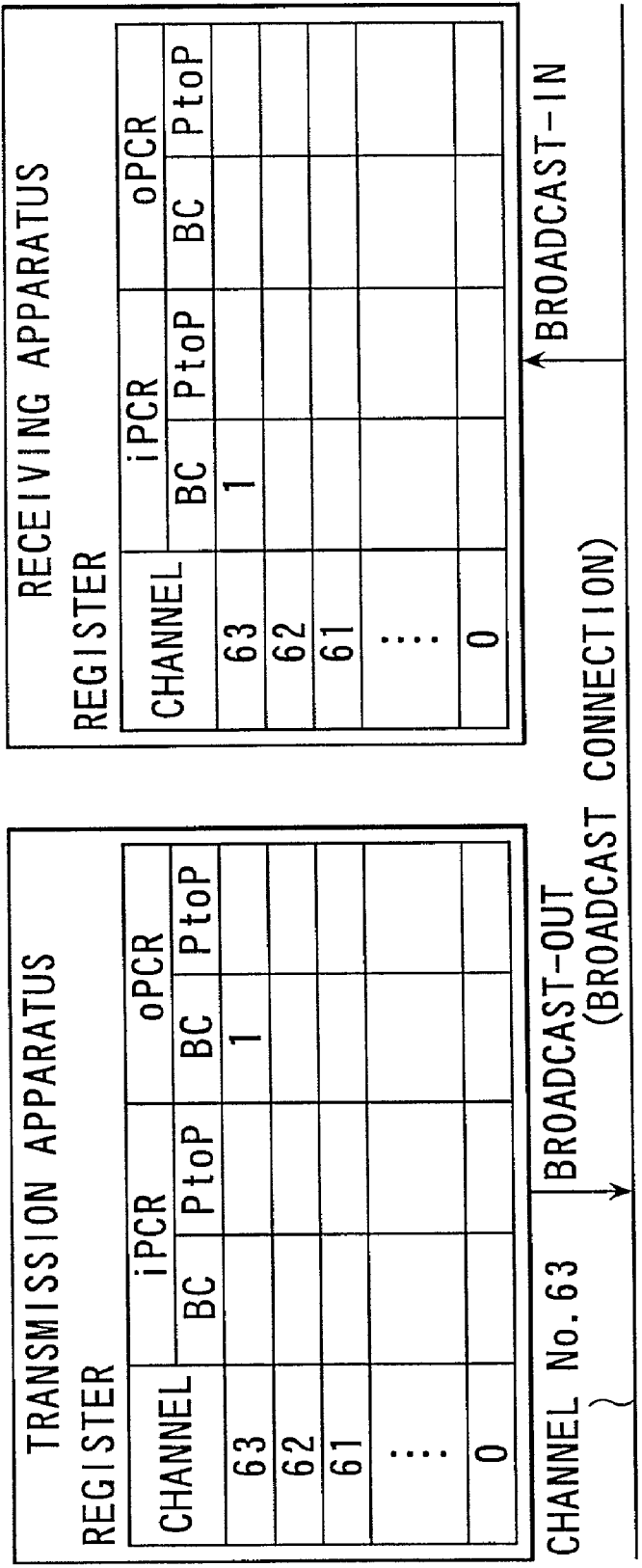
FIG. 16 is a diagram for describing the broadcast connection mode and the use of oPCR and iPCR.

FIG. 16 and FIG. 17 are diagrams for describing the register of the IEEE 1394 I/F circuit of each electronic apparatus connected through the IEEE 1394 standard digital interface and the connection of the channel between electronic apparatus performed by use of the register.

As shown in FIG. 16 and FIG. 17, each electronic apparatus connected through the IEEE 1394 standard digital interface has iPCR for controlling the channel for receiving the data input and oPCR for controlling the channel for sending the data output. These iPCR and oPCR are provided correspondingly to the connectable channel and are provided with a register BC used for the broadcast connection and a register PtoP used for the PtoP connection.

Therefore, the registers 171, 251, and 341 provided on the IEEE 1394 I/F circuits 17, 25, and 34 of the IRD 1, DTV 2, and DVTR's 3 and 4 of the present embodiment have the same structure as the registers shown in FIG. 16 and FIG. 17.

When the broadcast connection is formed between a transmission apparatus and a receiving apparatus through a predetermined channel, for example, the channel of the number 63, a flag is set to instruct the broadcast register BC in oPCR of the channel No. 63 of the transmission apparatus as shown in FIG. 16. Furthermore, in the receiving apparatus, a flag is set to instruct the broadcast register BC in iPCR of the channel No. 63.

Thereby, the transmission apparatus sends out the data through the No. 63 channel formed in broadcast-out connection mode and the receiving apparatus receives the isochronous transmitted data through the channel through the No. 63 channel formed in broadcast-in connection mode.

Another transmission apparatus that is to transmit the data to the No. 63 channel clears the flag of the register BC of No. 63 oPCR of the electronic apparatus that is sending out the data to the No. 63 channel already to thereby stop the transmission of the data to the No. 63 transmission apparatus that is sending out the data already before this apparatus sends out the data, and this apparatus can transmits the data to the No. 63 channel.

On the other hand, when a channel is connected in the PtoP connection mode to the No. 63 channel between a transmission apparatus and a receiving apparatus, the receiving apparatus requests the transmission apparatus to connect a channel of the PtoP connection. The transmission apparatus that has received the request sets a flag to the register PtoP for PtoP in the oPCR of the No. 63 channel as shown in FIG. 17. On the other hand, the receiving apparatus sets a flag to the register PtoP for PtoP in No. 63 iPCR.

Thereby, the channel is connected in the PtoP connection mode between the transmission apparatus and the receiving apparatus as shown in FIG. 17, and it is possible to transmit the data. Because only the receiving apparatus that has requested the PtoP connection can clear the flag of oPCR of the transmission apparatus in the case of the PtoP connection mode, another apparatus cannot send out the data to the channel as long as the data transmission through the channel formed in the PtoP connection continues.

[Category of the Apparatus and Allocation of Channel Attribute]

In the present embodiment, electronic apparatus that are components of the home network system connected to the digital bus 5 are classified to the electronic apparatus (first electronic apparatus) that receives the data through the channel connected mainly in the broadcast connection mode and the electronic apparatus (second electronic apparatus) that receives the data through the channel connected mainly in the PtoP connection mode, and the channel connected in the broadcast connection mode is secured previously based on the classification result.

In the present embodiment, the monitor apparatus that receives supply of the digital video signal from other electronic apparatus such as the DTV simply and supplies it to a user is regarded as the first electronic apparatus that receives the data through the channel connected mainly in the broadcast connection mode.

Furthermore, in the present embodiment, for example, the electronic apparatus that detects the increment/decrement of the apparatus connected to the digital bus 5 and the apparatus that is regarded as the control apparatus of the home network system are regarded as the apparatus that executes classification, the apparatus that executes classification inquires whether each electronic apparatus connected to the digital bus 5 is a monitor apparatus or not by use of the asynchronous communication specified to the IEEE 1394 standard digital interface, and an electronic apparatus is classified to the first electronic apparatus and the second electronic apparatus based on the response.

In this case, whether the electronic apparatus is a monitor apparatus or not is discriminated by inquiring whether the apparatus includes, for example, the monitor sub-unit specified by the AV/C (Audio/Video Control) command specified to the IEEE 1394 standard digital interface or not. As a matter of course, the classification method is by no means limited to this case, and a method in which the category information of an apparatus is inquired to discriminate whether the apparatus is a monitor apparatus that receives the data mainly or not may be employed.

The apparatus that executes classification previously secures the channel connected in the broadcast connection mode based on the classification result of the apparatus connected to the digital bus 5. A plurality of channels of the IEEE 1394 standard digital interface are used flexibly so that the previously secured channel that has been connected by the broadcast connection mode is not connected to a channel in the PtoP connection mode.

Figure 18:
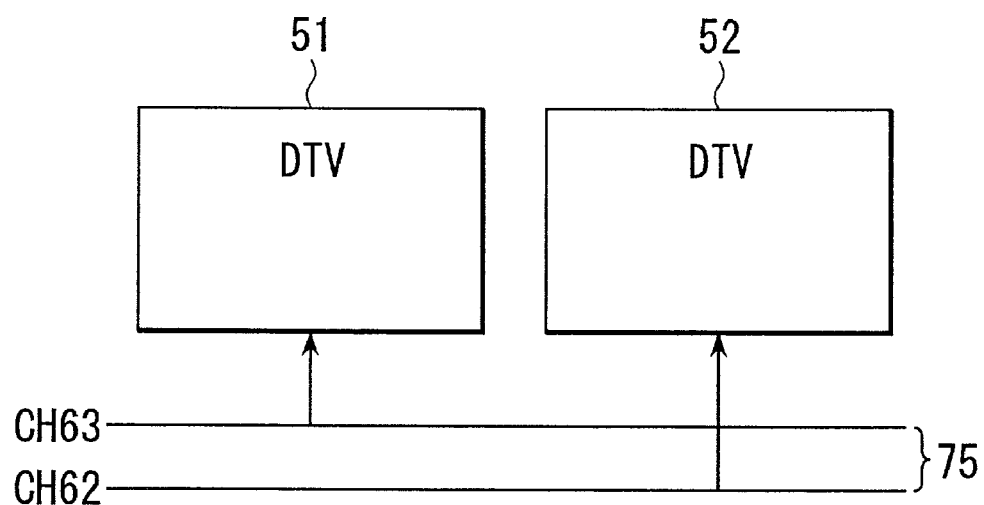
FIG. 18 is a diagram for describing the allocation of a channel for the broadcast connection to a monitor apparatus.
Figure 19:
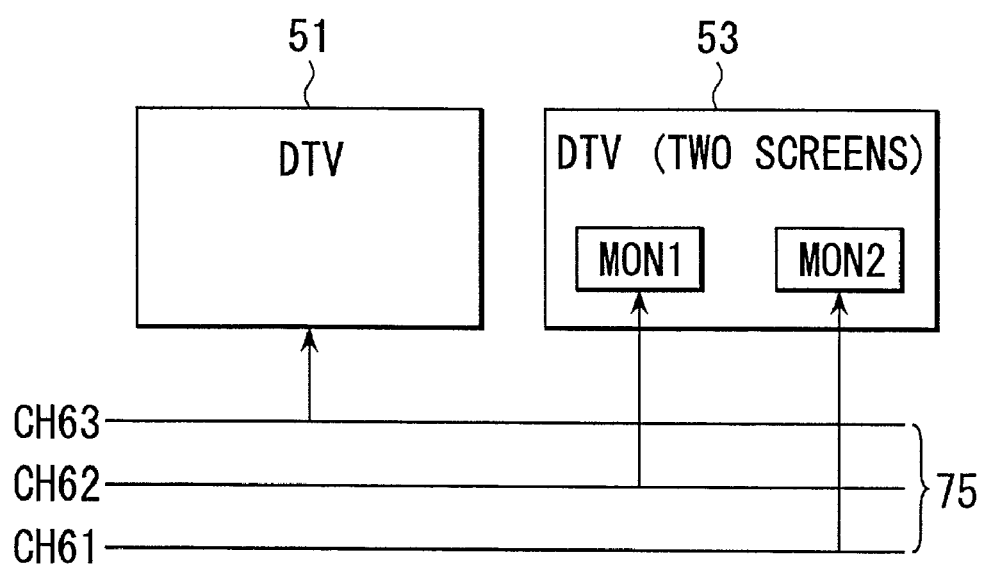
FIG. 19 is a diagram for describing the allocation of a channel for the broadcast connection to a monitor apparatus.

FIG. 18 and FIG. 19 are diagrams for describing the classification of the apparatus and the allocation of the channel attribute. In the present embodiment, the apparatus that executes classification inquires of each apparatus connected to the digital bus 5 and classifies the apparatus into the monitor apparatus and other apparatus as described hereinabove. In the present embodiment, then, the apparatus that executes classification allocates the channel (broadcast channel) to be connected in the broadcast connection mode to the apparatus that has been recognized as the monitor apparatus such as the DTV as shown in FIG. 18.

In FIG. 18, two DTV's 51 and 52 are connected to the digital bus 5. The channel having the channel No. 63 that is usable in the IEEE 1394 standard digital interface is allocated to the DTV 51. Furthermore, the channel having the channel No. 62 is allocated to the DTV 52.

As described hereinabove, in the embodiment of the present invention, one broadcast channel is allocated to a monitor apparatus having a connection terminal of the IEEE 1394 standard digital interface. In other words, different independent broadcast channels are allocated to respective physical monitor apparatus connected to the digital bus 5.

Herein, the channel having the channel No. 63 is simply referred to as channel 63, and the channel having the channel No. 62 is simply referred to as channel 62 hereinafter, and the channel is correlated to the channel No.

Some DTV's among DTV's have a so-called two-screen function or PinP (Picture in Picture) function in which two video signals are processed independently, and respective two pictures corresponding to two video signals are displayed on different display areas on the display screen of the DTV, or one picture is displayed partially on the other picture.

In this case, because one DTV processes two video signals independently and simultaneously, one DTV is equivalent to two monitor apparatus theoretically. In the case that a monitor apparatus can process a plurality of input signals simultaneously, the more other broadcast channels are allocated.

In detail, as shown in FIG. 19, in the case that the DTV 52 has so-called two-screen function, two broadcast channels are allocated independently to the first signal processing system (MON 1) and the second signal processing system (MON 2) respectively. In the exemplary case shown in FIG. 19, the channel 62 is allocated to the first signal processing system (MON 1) of the DTV 53 and the channel 61 is allocated to the second signal processing system (MON 2) of the DTV 53.

As described hereinabove, in the case that one monitor apparatus has a function to process a plurality of information signal inputs such as video signals through it is physically one monitor apparatus, the broadcast channel is allocated with consideration of the theoretical number of monitor apparatus.

In order to discriminate whether a monitor apparatus has a function to process a plurality of information signal inputs simultaneously or not, the monitor apparatus having the function to process a plurality of information signal inputs simultaneously may be provided with the monitor sub-unit information corresponding to the number of functions, or may be provided with the information for instructing that the apparatus has the function to process a plurality of information signal inputs simultaneously. As a matter of course, otherwise, whether a monitor apparatus has a function to process a plurality of information signal inputs simultaneously or not may be discriminated based on other information that is inquired through the IEEE 1394 standard digital interface.

For allocation of the broadcast channel to the monitor apparatus such as the DTV, a flag "1" is set to the register (broadcast connection register) BC used for broadcast connection to the channel allocated to this apparatus in iPCR of the IEEE 1394 I/F circuit of each monitor apparatus. Thereby, the monitor apparatus is brought into a state waiting for the data input through the broadcast channel allocated to this apparatus.

As a matter of course, a method as described herein under may be employed, in which each monitor apparatus stores the channel No. of the broadcast channel allocated to this apparatus in, for example, a memory such as the RAM of the control unit, and when the broadcast channel is connected actually, a flag 1 is set to the broadcast connection register BC of iPCR of the channel.

As described hereinabove, in the present embodiment, the apparatus that executes classification and the electronic apparatus that is classified are classified to the monitor apparatus and other apparatus, and different broadcast channels are allocated to the respective monitor apparatus. In the IEEE 1394 standard digital interface, the number of usable transmission channels is determined previously.

Therefore, by allocating different broadcast channels to every monitor apparatus, the attribute that is the channel to be connected in the broadcast connection mode or that is the channel to be connected in the PtoP connection mode is allocated to each of a plurality of transmission channels that are usable in the IEEE 1394 standard digital interface in the home network system.

[Operation for Categorization of Apparatus and for Allocation of Channel Attribute]

Next, the operation for classification of the apparatus and allocation of the channel attribute performed by means of the apparatus that detects increment/decrement of the apparatus connected to the digital bus 5 and by means of the apparatus that is regarded as the control apparatus of the home network system in the present embodiment will be described with reference to a flowchart shown in FIG. 20.

In the description in the following, it is assumed that the apparatus that detects increment/decrement of the apparatus connected to the digital bus 5 executes the classification of the apparatus and allocation of the channel attribute. In detail, in the present embodiment, each electronic apparatus connected to the digital bus 5 monitors the voltage change of the connection port for the IEEE 1394 standard digital interface to thereby detect the attachment of an electronic apparatus (increment of connected apparatus) to the digital bus and detachment of an apparatus (decrement of connected apparatus) from the digital bus 5.

Figure 20:
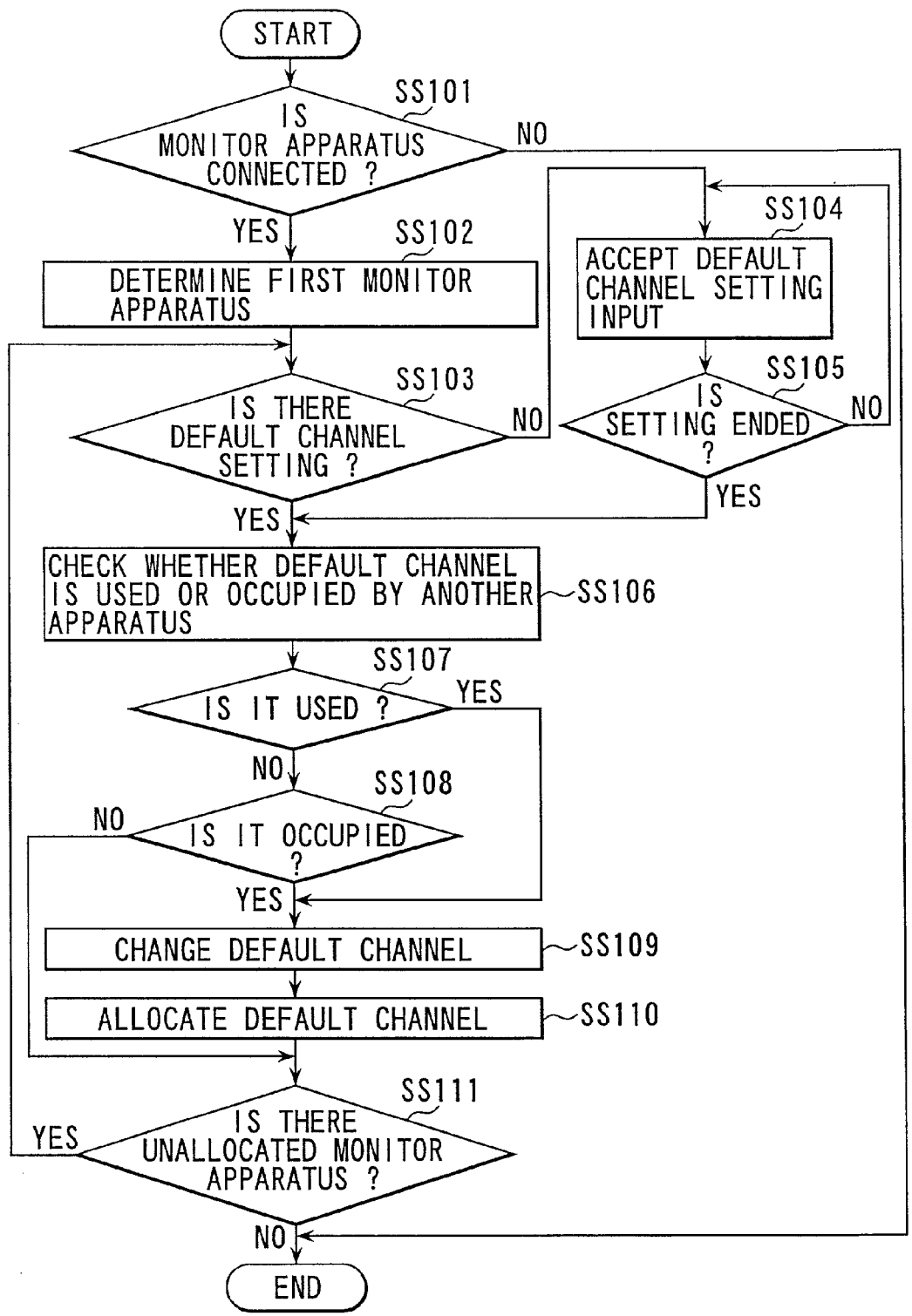
FIG. 20 is a flowchart for describing a routine for categorizing the apparatus and allocating the channel attribute.

An apparatus that detects increment/decrement of the apparatus connected to the digital bus 5 executes classification and implements the routine shown in FIG. 20. Therefore, in the present embodiment, any one of the IRD 1, DTV 2, and DVTR's 3 and 4 that constitute the home network system can be an apparatus that executes the classification, it is assumed herein that the DTV 2 is the apparatus that executes the classification in the following description.

The DTV 2 that is assumed to be the apparatus that detects increment/decrement of the apparatus connected to the digital bus 5 and executes the classification implements the routine shown in FIG. 20 with corporation of the control unit 200 of this apparatus and the IEEE 1394 I/F circuit 25. At first, the control unit 200 of the DTV 2 controls the IEEE 1394 I/F circuit 25 to inquire whether each electronic apparatus connected to the digital bus including this apparatus is a monitor apparatus or not, and determines whether a monitor apparatus is connected to the digital bus 5 or not (step S101).

If it is determined that no monitor apparatus is connected in the determination processing in step S101, then the routine shown in FIG. 20 is brought to an end in the present embodiment. On the other hand, if it is determined that a monitor apparatus is connected in the determination processing in step S101, then the control unit 200 of the DTV 2 determines the first monitor apparatus (step S102). The reason that the operation is performed as described hereinabove is that a plurality of monitor apparatus such as DTV are connected to the digital bus 5 in some cases.

The control unit 200 of the DTV 2 controls the IEEE 1394 I/F circuit 25 to inquire of the determined monitor apparatus whether a previously determined channel to be connected in the broadcast-in connection mode (referred to as default channel hereinafter in the present specification) is set to the determined monitor apparatus or not, and determines whether the default channel is set or not (step S103).

The default channel is set as the channel determined for each apparatus, for example, during fabrication of the apparatus by the maker side of the apparatus as a channel of the apparatus to be connected in the broadcast-in connection mode.

In the present embodiment, the DTV 2 is the only monitor apparatus as shown in FIG. 12. Therefore, in step S103, the DTV 2 inquires of itself about the default channel. In the determination processing of step S103, if it is determined that the default channel is not set, then the DTV 2 accepts a setting input of the default channel to the monitor apparatus through, for example, the remote commander of this apparatus. (step S104).

The control unit 200 of the DTV 2 determines whether the default channel setting end operation has been performed or not (step S105), and if the setting end operation has not been performed, the step S104 and following steps are repeated. In the determination processing in step S103, if it is determined that the default channel is set to the monitor apparatus, or if it is determined that the default channel setting end operation has been performed, then the control unit 200 of the DTV 2 controls the IEEE 1394 I/F circuit 25 to determine whether the default channel of the monitor apparatus is in use (whether the data has been transmitted already) or the default channel has been used exclusively by means of another electronic apparatus (step S106).

Then, the control unit 200 of the DTV 2 determines whether the channel that has been set as the default channel of the monitor apparatus is in use or not (step S107) based on the result obtained in step S106. If it is determined that the channel is not in use in the determination processing in step S107, then the control unit 200 of the DTV 2 determines whether the channel set as the default channel of the monitor apparatus is exclusively occupied already by another electronic apparatus or not (step S108).

If it is determined that the default channel of the monitor apparatus is in use already in the determination processing in step S107, or if it is determined that the default channel of the monitor apparatus is allocated to another electronic apparatus and exclusively occupied already in the determination processing in step S108, then the control unit 200 of the DTV 2 changes the default channel of the monitor apparatus (step S109) and allocates the changed default channel to the monitor apparatus (step S110).

In the present embodiment, when the default channel is to be changed (the channel to be allocated is changed), whether the channel having the channel No. smaller than the default channel by 1 is free or not is detected, and if the channel is free, then the default channel is changed to the channel. On the other hand, if the channel is not free, then the channel No. is reduced by 1, and whether the channel is free or not is detected again.

As described hereinabove, in the present embodiment, the channel No. is shifted one by one to detect a free channel, and the default channel is changed to the detected free channel. Herein, the free channel means a channel that is not being used (no transmission data) and not allocated to another electronic apparatus as described hereinabove.

Then, in the above-mentioned step S110, the iPCR of the IEEE 1394 I/F circuit of the monitor apparatus clears the flag of the register BC corresponding to the default channel before the change, and sets a flag to the register BC corresponding to the default channel after the change.

Furthermore, in the determination processing in step S108, if the default channel of the monitor apparatus is not occupied by another apparatus, then the sequence proceeds to the processing in step S111 because it is not necessary to change the default channel.

If allocation of the default channel in step S110 is ended and if it is determined that the default channel of the monitor apparatus is not occupied by another apparatus, then the control unit 200 of the DTV 2 determines whether there is a monitor apparatus to which the default channel is not yet allocated or not (step S111).

If it is determined that there is a monitor apparatus to which the default channel is not yet allocated in the determination processing in step S111, the monitor apparatus to which the default channel is not yet allocated is subjected to the processing in step 103 and the following steps. On the other hand, if it is determined that there is no monitor apparatus to which the default channel is not yet allocated in the determination processing in step S111, then the routine shown in FIG. 20 is brought to an end because allocation of the default channel that is a channel to be connected in the broadcast connection mode is ended.

Because the DTV 2 is only the monitor apparatus in the present embodiment as shown in FIG. 12, the DTV 2 allocates the channel to be connected in the broadcast connection mode to this apparatus. In the present embodiment, the channel 63 is allocated to the DTV 2 as described hereinbefore.

Then, the DTV 2 waits for the data to be transmitted through the channel 63, and accepts the data input when the data is transmitted. A picture corresponding to the data accepted as described hereinabove is displayed on the display screen of the display element 30 of the DTV 2.

A channel having a predetermined channel No., for example, the channel 63 has been allocated to the monitor apparatus having the IEEE 1394 standard digital interface as the default channel when it was manufactured as described hereinabove. As a matter of course, if the default channel is not set, the default channel can be set correspondingly to the setting input entered by a user as described hereinabove. Furthermore, regardless of the default channel that has been set already, the apparatus that executes classification may be allocated automatically to the monitor apparatus.

Furthermore, in the present embodiment, the case in which the DTV 2 is the apparatus that executes classification is described exemplarily. However, as described hereinabove, each electronic apparatus having the IEEE 1394 standard digital interface has a function to implement the routine shown in FIG. 20 with cooperation of, for example, the control unit of this apparatus and the IEEE 1394 I/F circuit.

Therefore, in the present embodiment, not only the DTV 2 but also the IRD 1 and DVTR's 3 and 4 have the function to implement the routine shown in FIG. 20. An apparatus that detects increment/decrement of an apparatus connected to the digital bus 5 implements the routine shown in FIG. 20 to thereby classify the apparatus always suitably correspondingly to the connection state of the electronic apparatus to the digital bus 5 and to allocate the channel to be connected in the broadcast connection mode to the monitor apparatus.

The classification of the apparatus and allocation of channel attribute shown in FIG. 20 can be implemented at a desired timing, for example, when a user instructs it.

Furthermore, in the present embodiment, in the case that a monitor apparatus has a function to process a plurality of input signals simultaneously, different one channel is allocated to a function to process each of the plurality of input signals for the monitor apparatus as described hereinabove with respect to FIG. 18 and FIG. 19. However, another method may be employed.

In the case that there are a plurality of monitor apparatus, the number of channels to be allocated may be changed correspondingly to the number of monitor apparatus, for example, one channel is allocated to two monitor apparatus. The monitor apparatus selects the channel to be used. However as described hereinabove, it is convenient that different independent channels are allocated to respective monitor apparatus because a plurality of monitor apparatus can be used without any restriction even when the plurality of monitor apparatus are used simultaneously.

Furthermore, the case in which the routine shown in FIG. 20 is implemented with cooperation of the control unit 200 of the DTV 2 and the IEEE 1394 I/F circuit 25 is described in the present embodiment, however, another method may be employed. The IEEE 1394 I/F circuit 25 may have a function to implement the routine shown in FIG. 20. Otherwise, a controller used exclusively for the IEEE 1394 I/F circuit is provided, and the routine shown in FIG. 20 may be implemented with cooperation of the controller and the IEEE 1394 I/F circuit.

In the case that the channel to be connected in the broadcast-in connection mode (default channel) is allocated previously to a monitor apparatus and the data is sent out from the IRD 1 as described herein under, or in the case that the DVTR's 3 and 4 send out the data or the DVTR's 3 and 4 receive supply of the data for recording, the channel that is usable in the IEEE 1394 standard digital interface is used efficiently and the convenient home network system is realized.

[Channel Connection in Playback Output]

As described hereinabove, in the present embodiment, the DTV 2, which cannot be a sender and does not send out the main information data such as the video data and audio data, waits for supply of the data transmitted through the channel 63 allocated to this apparatus.

On the other hand, the IRD 1 and the DVTR's 3 and 4, which are electronic apparatus to be a sender that sends out the main information data such as the video data and audio data, are connected in the broadcast-out connection mode to a channel allocated to the DTV 2 and send out the data in playback output when the data is being sent out from these apparatus.

FIG. 21 is a flowchart for describing the routine implemented in playback output when the data is being sent out in each of the IRD 1, the DVTR 3, and the DVTR 4. The routine shown in FIG. 21 is implemented in a transmission apparatus (output apparatus) for sending out the data when the power source is turned on in the case of the IRD 1 and when "playback key" is operated in the case of the DVTR 3 and the DVTR 4.

In FIG. 21, step S301 that is enclosed by a double line is processing to be performed by a user. In description of the routine shown in FIG. 21, the case in which the above-mentioned DVTR 3 described with respect to FIG. 15 is served as the transmission apparatus and the routine shown in FIG. 21 is implemented by means of the DVTR 3 will be described exemplarily.

When the "playback key" of the remote commander 311 of the DVTR 3 is operated by a user and the playback instruction for playing back the data is entered, the control unit 300 of the DVTR 3 controls the IEEE 1394 I/F circuit 34 of this apparatus to detect the default channel of the DTV 2 that is served as the monitor apparatus through the digital bus 5 (step S201).

The control unit 300 of the DVTR 3 determines whether a plurality of monitor apparatus that are capable of processing the digital data such as the DTV are connected or not based on the detection result obtained in step S201 (step S202). If it is determined that a plurality of monitor apparatus are not connected in the determination processing in step S202, then the sequence proceeds to the processing in step S205.

On the other hand, if it is determined that a plurality of monitor apparatus are connected in the determination processing in step S202, then the control unit 300 of the DVTR 3 notifies the required selection of a monitor apparatus to a user in displaying on the LCD (liquid crystal display) of this apparatus or in lighting or flickering of the LED (light emitting diode) (step S203).

In response to the notice notified in sep S203, the user enters a selection input for selecting a monitor apparatus by use of the remote commander 311 of the DVTR 3 (step S301). Then, the control unit 300 of the DVTR 3 accepts the selection input for selecting a monitor apparatus entered by the user (step S204).

The control unit 300 of the DVTR 3 controls the IEEE 1394 I/F circuit 34 to check the transmission apparatus that sends out the data to the receiver monitor apparatus that receives the output data from the DVTR 3 (step S205). Because the monitor apparatus that can be the receiver for receiving the data from the DVTR 3 is only the DTV 2 in the present embodiment, the control unit 300 of the DVTR 3 checks the transmission apparatus that transmits the data to the default channel (channel 63) of the DTV 2.

In this case, the header of each packet sent out to the digital bus is checked and the DID (apparatus ID) of the packet of the channel No. 63 is checked, and the transmission apparatus that sends out the data to the channel 63 is identified.

Then, the control unit 300 of the DVTR 3 determines whether there is a transmission apparatus that sends out the data to the channel 63 or not (step S206). If it is determined that there is no transmission apparatus that sends out the data to the default channel of the DTV 2 in the determination processing in step S206, then the sequence proceeds to the processing in step S208.

On the other hand, if it is determined that there is a transmission apparatus that sends out the data to the default channel of the DTV 2 in the determination processing in step S206, then the register BC for the broadcast connection of the channel 63 of oPCR of the IEEE 1394 I/F circuit of the transmission apparatus specified in step S205 is cleared (step S207).

The IEEE 1394 I/F circuit 34 of the DVTR 3 sets a flag 1 to the register BC for the broadcast connection of the channel 63 of oPCR of this apparatus to thereby form the broadcast-out connection to the channel 63, and sends out the data to the channel (step S208).

As described hereinabove, in the home network system of the present embodiment, when the data is to be transmitted to a monitor apparatus, the channel allocated to the target monitor apparatus is specified and a connection is formed in the broadcast connection mode to the channel, and the data is sent out.

Therefore, even though a transmission apparatus is transmitting the data already to the monitor apparatus on the receiver side of the data, the data transmission from the transmission apparatus is stopped, and then the apparatus that is to transmit the data later can send out the data.

In other words, with effective utilization of the characteristic of the broadcast connection mode that later transmission of the data is allowed always, the data to be supplied to the monitor apparatus can be changed only by changing the transmission apparatus that sends out the data without any operation of the monitor apparatus.

Therefore, in the case that the digital video signal is played back for monitoring simply, the picture corresponding to the digital video signal supplied from a plurality of transmission apparatus can be switched and viewed easily by connecting the channel in the broadcast connection mode not in the PtoP connection mode.

FIG. 22A and FIG. 22B and FIG. 23A and FIG. 23B are diagrams for describing the playback output processing in the IRD 1 and the DVTR's 3 and 4 in the present embodiment. In FIG. 22A and FIG. 22B and FIG. 23A and FIG. 23B, a solid line arrow represents a broadcast connection and a dotted line arrow represents a PtoP connection. The arrow directed to a predetermined channel of the digital bus 5 represents the data output from an apparatus, and the arrow directed to an apparatus represents the data input.

In the present embodiment, the channel 63 is allocated to the DTV 2 as the default channel that is the channel to be connected in the broadcast connection mode. Therefore, as shown in FIG. 22A, the IRD 1 forms the broadcast-out connection to the channel 63 and transmits the data to thereby supply the video data received from the IRD 1 to the DTV 2, and the DTV 2 displays a picture corresponding to the signal received from the IRD 1 on the display element of this apparatus.

Figure 22A:
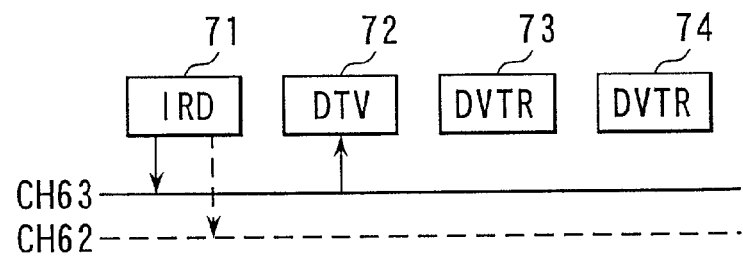
FIG. 22A and FIG. 22B are diagrams for describing the processing for playback output in detail.
Figure 22B:
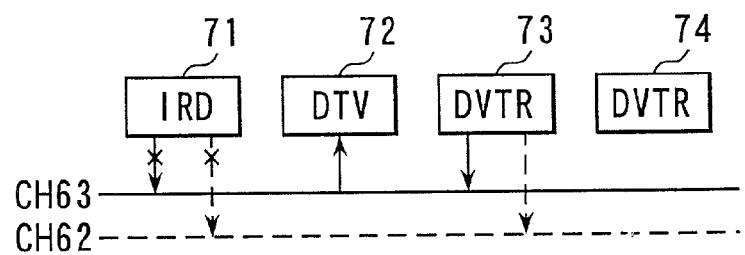

When the "playback key" of the DVTR 3 is pushed down while the state shown in FIG. 22A is being maintained, the DVTR 3 executes the routine shown in FIG. 21 as shown in FIG. 22B to thereby cancel the broadcast-out connection to the channel 63 of the IRD 1, and this apparatus forms the broadcast-out connection to the channel 63. The data supplied from the DVTR 3 is sent out to the channel 63, and viewed by way of the DTV 2.

Figure 23A:
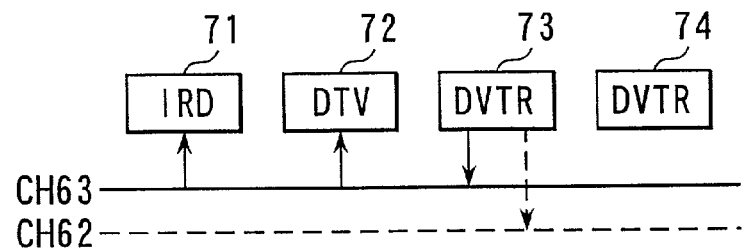
FIG. 23A and FIG. 23B are diagrams for describing the processing for playback output in detail.

Similarly, as shown in FIG. 23A, the DVTR 3 forms the broadcast-out connection to the channel 63 and sends out the data to thereby display a picture corresponding to the digital signal supplied from the DVTR 3 on the DTV 2.

Figure 23B:
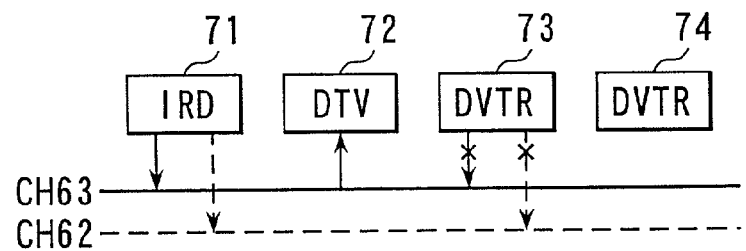

When the power source of the IRD 1 is turned on while the state shown in FIG. 23A is being maintained, the IRD 1 implements the routine shown in FIG. 21, cancels the broadcast-out connection to the channel 63 of the DVTR 3 as shown in FIG. 23B, the IRD 1 forms the broadcast-out connection to the channel 63, the data is sent out from the IRD 1 to the channel 63, and the data is viewed by means of the DTV 2.

The picture displayed on the display screen of the display element of the DTV 2 is changed to a picture supplied from another transmission apparatus simply only by changing the data transmission apparatus as described hereinabove.

In the present embodiment, the selection input to select a monitor apparatus from among a plurality of monitor apparatus is accepted in the case that the plurality of monitor apparatus are connected to the digital bus 5. However, the present invention is by no means limited to this case.

For example, the monitor apparatus that transmits the data has been previously set to, for example, the IRD 1 or the DVTR 3 or 4. The data may be transmitted to the monitor apparatus that has been previously set when the data is sent out for playing back in the IRD 1 or DVTR 3 or 4. Otherwise, the selection input entered by a user is accepted, and the data is transmitted to the monitor apparatus that has been previously set if the selection input is not entered within a predetermined certain time period.

[Channel Connection for Recording]

In the present embodiment, when the DVTR 3 or 4 receives supply of the digital data and the digital data is recorded in a recording medium, the channel formed in the PtoP connection mode is connected to a channel other than the default channel allocated to the DTV 2 that is served as the monitor apparatus as shown with a dotted line arrow in FIG. 22A and FIG. 22B and FIG. 23A and FIG. 12B.

Figure 24:
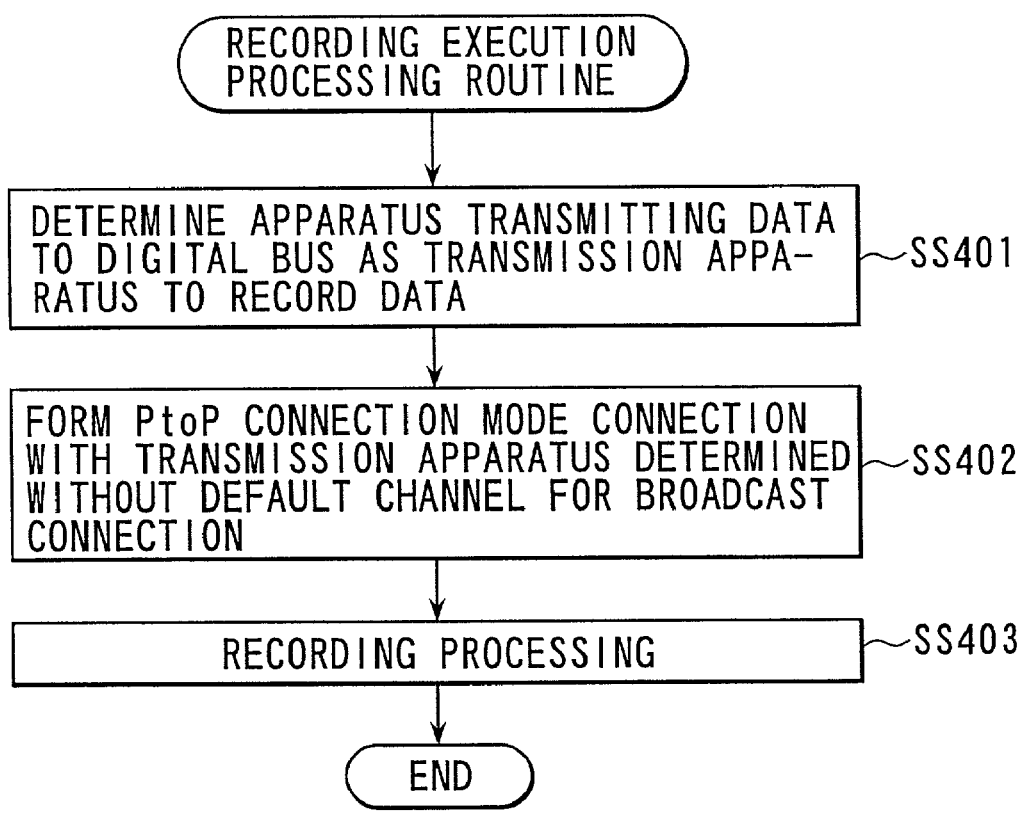
FIG. 24 is a flowchart for describing a routine for recording.

FIG. 24 is a flowchart for describing the recording execution routine for recording the data supplied through the digital bus 5 in a recording apparatus or a recording/reproducing apparatus connected to the digital bus 5. In detail, in the present embodiment, the routine is implemented in the apparatus when "recording start key (REC key)" is operated in the DVTR 3 or DVTR 4.

When the selector 33 is switched so that the DVTR 3 records the data supplied through the digital bus 5 and the "recording start key" of the remote commander 311 is operated, the control unit 300 of the DVTR 3 implements the routine shown in FIG. 24. At first, the control unit 300 of the DVTR 3 controls the IEEE 1394 I/F circuit 34 to detect the SID (apparatus ID) included in the header of a packet sent out to the digital bus 5, and determines the apparatus to be the transmission apparatus that transmits the data to be recorded (step S401).

The DVTR 3 or 4 determines the electronic apparatus that is sending out the data to the digital bus 5 as the transmission apparatus that transmits the data to be recorded when recording is started as described hereinabove in the present embodiment.

The control unit 300 of the DVTR 3 controls the IEEE 1394 I/F circuit 34 to refer iPCR and oPCR of each electronic apparatus connected to the digital bus 5 and to thereby detect the default channel allocated to the monitor apparatus, and connects a channel in the PtoP connection mode to a channel other than the default channel between the DVTR 3 and the transmission apparatus determined in step S401 (step S402).

After a channel is connected in the PtoP connection mode between this apparatus and the target transmission apparatus as described hereinabove, the data transmitted through the connected channel is received, and recording is started (step S403).

Thereby, the data supplied from the transmission apparatus is received surely through the digital bus 5 and recorded in a recording medium until the DVTR 3 is operated to stop the recording ("stop key" is pushed down) without snatching of the channel by another apparatus.

Moreover, as described hereinafter, a channel in the PtoP connection mode is connected avoiding the channel to be connected in the broadcast-in connection mode allocated to the DTV 2 (default channel). Thereby, the function that has not been realized can be realized, for example, the data that is being recorded can be monitored.

The case in which the apparatus that is sending out the data to the digital bus 5 is determined as the transmission apparatus that transmits the data to be recorded by means of the DVTR 3 when the DVTR 3 starts recording herein, however, the present invention is by no means limited to this case. Otherwise, the transmission apparatus may be selected by a user.

In detail, when "recording start key" of the DVTR 3 is operated, the DVTR 3 prompts a user to enter a selection input for selecting a transmission apparatus that is to be a sender of the data. In the processing, for example, the apparatus information is collected through the IEEE 1394 I/F circuit 34 immediately after bus resetting, the information about the transmission apparatus that transmits the data out of the collected information is displayed on, for example, the LCD for prompting the user to select the transmission apparatus.

In detail, two electronic apparatus, namely the IRD 1 and the DVTR 4, can be the transmission apparatus in the view from the DVTR 3. The DVTR 3 displays on the LCD a display to show that the selectable apparatus is the IRD 1 or the DVTR 4, and prompts the user to select it.

In response to the display, the user enters a selection input for selecting a transmission apparatus by use of the remote commander 311 of the DVTR 3. The control unit 300 of the DVTR 3 accepts the selection input for selecting a transmission apparatus supplied from the user. The control unit 300 of the DVTR 3 controls the IEEE 1394 I/F circuit 34 to connect a channel in the PtoP connection mode to a channel other than the channel allocated to the monitor apparatus between the DVTR 3 and the apparatus selected by the user. The DVTR 3 records the data supplied from the selected transmission apparatus through the channel connected in the PtoP connection mode in a recording medium.

The method described hereinabove in which the transmission apparatus that transmits the data to be recorded is determined correspondingly to the selection input entered by the user and a channel formed in the PtoP connection mode is connected between the receiving apparatus and the transmission apparatus avoiding the channel for the broadcast connection allocated to the DTV 2 (default channel) may be employed.

FIG. 25A to FIG. 25C and FIG. 26A to FIG. 26D are diagrams for describing the processing in detail for recording in the DVTR's 3 and 4 in the present embodiment. In FIG. 25A to FIG. 25C and FIG. 26A to FIG. 26D, a solid line arrow represents a broadcast connection, and the dotted line arrow represents a PtoP connection. The arrow directed to a predetermined channel of the digital bus 5 represents the data output from an apparatus, and the arrow directed to an apparatus represents the data input.

Figure 25A:
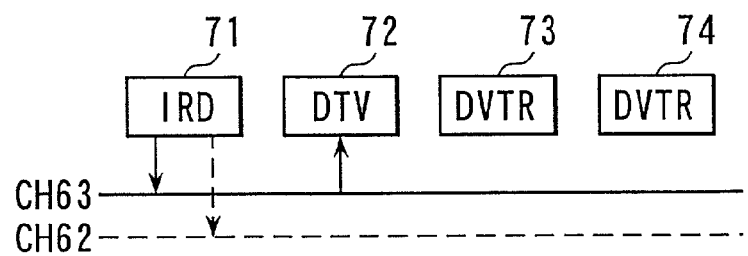
FIG. 25A to FIG. 25C are diagrams for describing the processing for recording in detail.
Figure 25B:
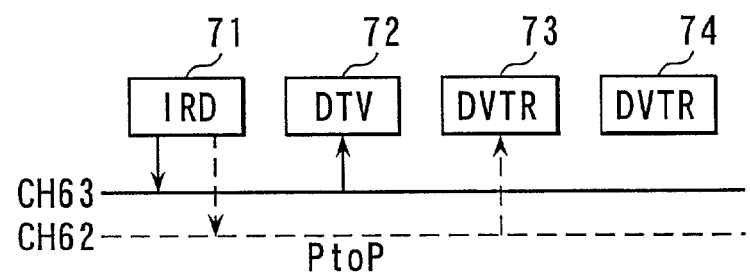
Figure 25C:
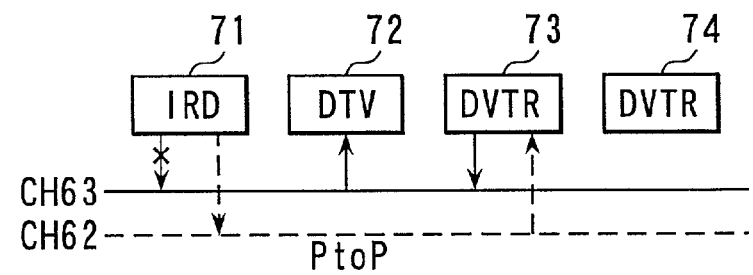

An example shown in FIG. 25A to FIG. 25C is described at first. As described hereinabove, in the present embodiment, the channel 63 is allocated to the DTV 2 as the default channel that is the channel to be connected in the broadcast-in connection mode. Therefore, as shown in FIG. 25A, the IRD 1 transmits the data through the channel 63 connected in the broadcast-out connection mode to thereby supply the digital data from the IRD 1 to the DTV 2, and the DTV 2 displays a picture corresponding to the signal supplied from the IRD 1 on the display element of this apparatus.

When a user pushes down the "recording start key" of the DVTR 3 while the state shown in FIG. 25A is being maintained, the control unit 300 of the DVTR 3 implements the routine shown in FIG. 24. Then, the control unit 300 of the DVTR 3 controls the IEEE 1394 I/F circuit 34 to determine the apparatus that is sending out the data to the digital bus 5 currently as the transmission apparatus that transmits the data to be recorded, the IRD 1 in this example, based on the information of the header of the data (packet) transmitted to the digital bus 5.

Then, the control unit 300 of the DVTR 3 controls the IEEE 1394 I/F circuit 34 to connect a channel in the PtoP connection mode between the IRD 1 and DVTR 3 to a channel other than the default channel allocated to the DTV 2 as shown in FIG. 25B, and the data supplied from the IRD 1 is recorded. In the case of this example, the PtoP connection mode channel is connected to the channel 62 between the IRD 1 and the DVTR 3.

As described hereinabove, because the channel connected in the PtoP connection mode between the IRD 1 and the DVTR 3 is connected avoiding the default channel allocated to the DTV 2, the data supplied from the IRD 72 is remained in supplying to the DTV 2, and the playback of a picture by means of the DTV 2 corresponding to the video data supplied from the IRD 1 will not be stopped.

The DVTR's 3 and 4 used in the present embodiment are provided with "monitor key (monitor button switch)" The "monitor key" of the DVTR's 3 and 4 is pushed down when the data that is being recorded is to be monitored. When the "monitor key" is pushed down, the control unit 300 of the DVTR's 3 and 4 implements the playback output routine described with respect to FIG. 21 while recording is being performed.

Thereby, as shown in FIG. 25C, the DVTR 3 clears the register BC for the broadcast-out connection to the channel 63 of the oPCR of the IRD 1, and cancels the broadcast-out connection to the channel 63 of the IRD 1.

The DVTR 3 forms the broadcast-out connection to the channel 63 that is the default channel of the DTV 2 by itself, and transmits the data that is being recorded to the channel 63. As described hereinabove, a user can monitor the data that is being recorded by means of the DVTR 3 on the DTV 2.

In the case of this example, when stop or change of sending out of the data that is now being recorded is instructed due to shutdown of the power source, switching of the channel selection signal, or switching of the selected program in the IRD 1 to which a channel is connected in the PtoP connection mode, the stop or change of sending out of the data that is now being recorded may be notified to a user before the IRD 1 operates in response to the instruction.

This is by no means limited to the above-mentioned case in which the transmission apparatus that transmits the data to be recorded is the IRD 1, the notice is notified also in the case that the transmission apparatus is another apparatus such as the DVTR 3 or 4. Thereby, the erroneous operation of the transmission apparatus for transmitting the data, and the data to be recoded is surely recorded.

Figure 26A:
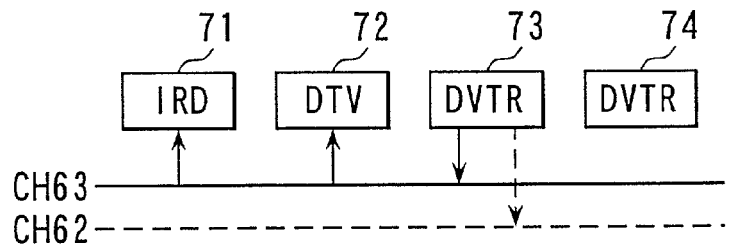
FIG. 26A to FIG. 26D are diagrams for describing the processing for recording in detail.

Next, an example shown in FIG. 26A to FIG. 26D will be described. In the case of this example, the DVTR 3 is in playback mode, and the DVTR 3 is connected in the broadcast-out connection mode to the default channel of the DTV 2 as shown in FIG. 26A when the above-mentioned playback output routine shown in FIG. 21 is implemented. Thereby, the video data supplied from the DVTR 3 is supplied to the DTV 2, and the DTV 2 displays a picture corresponding to the video data supplied from the DVTR 3.

When a user pushed down the "recording start key" of the DVTR 4 while the state shown in FIG. 26A is being maintained, the DVTR 4 implements the above-mentioned recording execution routine shown in FIG. 24. Thereby, the DVTR 4 connects a channel in the PtoP connection mode with the DVTR 3 avoiding the default channel allocated to the DTV 2 as shown in FIG. 26B, and starts recording of the video data supplied from the DVTR 3.

Figure 26B:
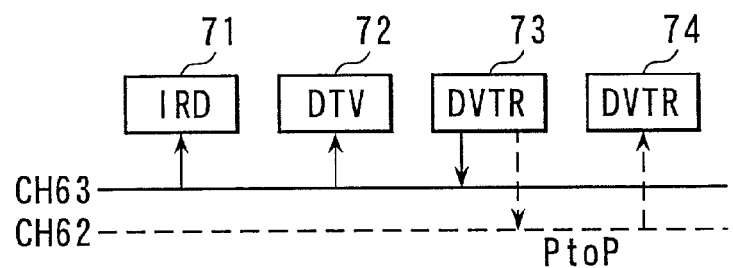

In the state shown in FIG. 26B, because the broadcast-out connection of the DVTR 3 to the channel 63 that is the default channel of the DTV 2 is not canceled, a picture corresponding to the video data supplied from the DVTR 3 is monitored by means of the DTV 2.

Figure 26C:
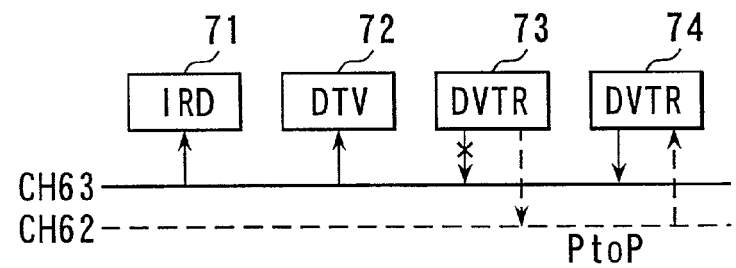
Figure 26D:
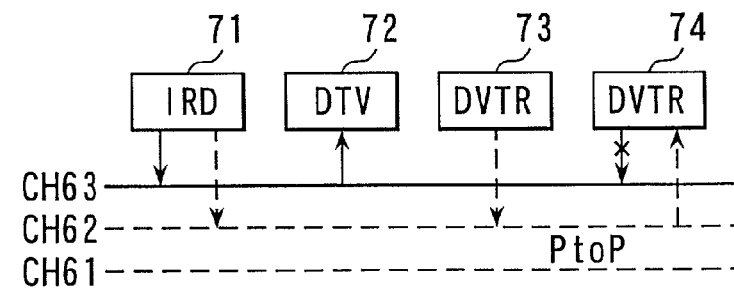

When a user pushes down the above-mentioned "monitor key" of the DVTR 4, the DVTR 4 implements the above-mentioned playback output routine described with respect to FIG. 21 while recording as shown in FIG. 26C, cancels the broadcast-out connection to the channel 63 of the DVTR 3, and the DVTR 4 forms broadcast-out connection to the channel 63 that is the default channel of the DTV 2, and sends out the video data that is being recorded to the channel 63. Thereby, the user can monitor the video data that is being recorded in the DVTR 4 by means of the DTV 2.

In some cases, a user wants to view a digital television broadcast program that is now being broadcasted and wants to view the video data that is now being recorded by means of the DVTR 4 later. The IRD 1 of the present embodiment has an operation button such as "monitor input key", and when the "monitor input key" is pushed down, the playback output routine described with respect to FIG. 21 is implemented.

Therefore, in the state shown in FIG. 26C, when the "monitor input key" is pushed down, the IRD 1 implements the above-mentioned routine shown in FIG. 21, and cancels the broadcast-out connection to the channel 63 of the DVTR 4 as shown in FIG. 25D.

The IRD 1 forms broadcast-out connection to the channel 63 that is the default channel allocated to the DTV 2 and the video data of the digital television broadcast program is supplied to the DTV 2. Thereby, the video data supplied from the IRD 1 is played back and viewed on the DTV 2 while the video data played back by means of the DVTR 3 is being doubled by means of the DVTR 4.

A channel is connected in the PtoP connection mode between the transmission apparatus for transmitting the data and the recording apparatus for recording the data avoiding the default channel allocated to the DTV 2 when recording as described hereinabove, the data can be thereby recorded without interference by another apparatus.

Furthermore, because the default channel allocated to the DTV 2 is can be connected in the broadcast connection mode, a plurality of channels of the IEEE 1394 standard digital interface are used efficiently, and the more convenient use environment of the digital contents is arranged.

[Channel Connection for Viewing Recording Function]

As described hereinabove, the recording apparatus is connected to a channel in the PtoP connection mode between the recording apparatus and the transmission apparatus in recording, and the data supplied from the transmission apparatus is recorded without interference by another apparatus. However, when a user changes the transmission apparatus, the user wants to record the data supplied from the transmission apparatus that has been selected now immediately in some cases.

However, in the case that a channel is connected in the PtoP connection mode between the transmission apparatus and the recording apparatus, at first the recording is stopped temporarily in the recording apparatus to release the channel connected in the PtoP connection mode (step 1), the transmission apparatus is changed (step 2), and the recording is started again in the recording apparatus (step 3). Therefore, it takes some troublesome works and long time for changing the transmission apparatus and restarting of the recording.

To solve the above-mentioned problem, in the home network system of the present embodiment to which the present invention is applied, the data sent out from the transmission apparatus that is selected now can be recorded continuously only by changing the transmission apparatus without any operation of the recording apparatus. This function is realized by using the default channel allocated to the DTV 2. The function is that the video data of a picture that a user is viewing is recorded as it is, and the function is referred to as viewing recording in the present specification.

Figure 27:
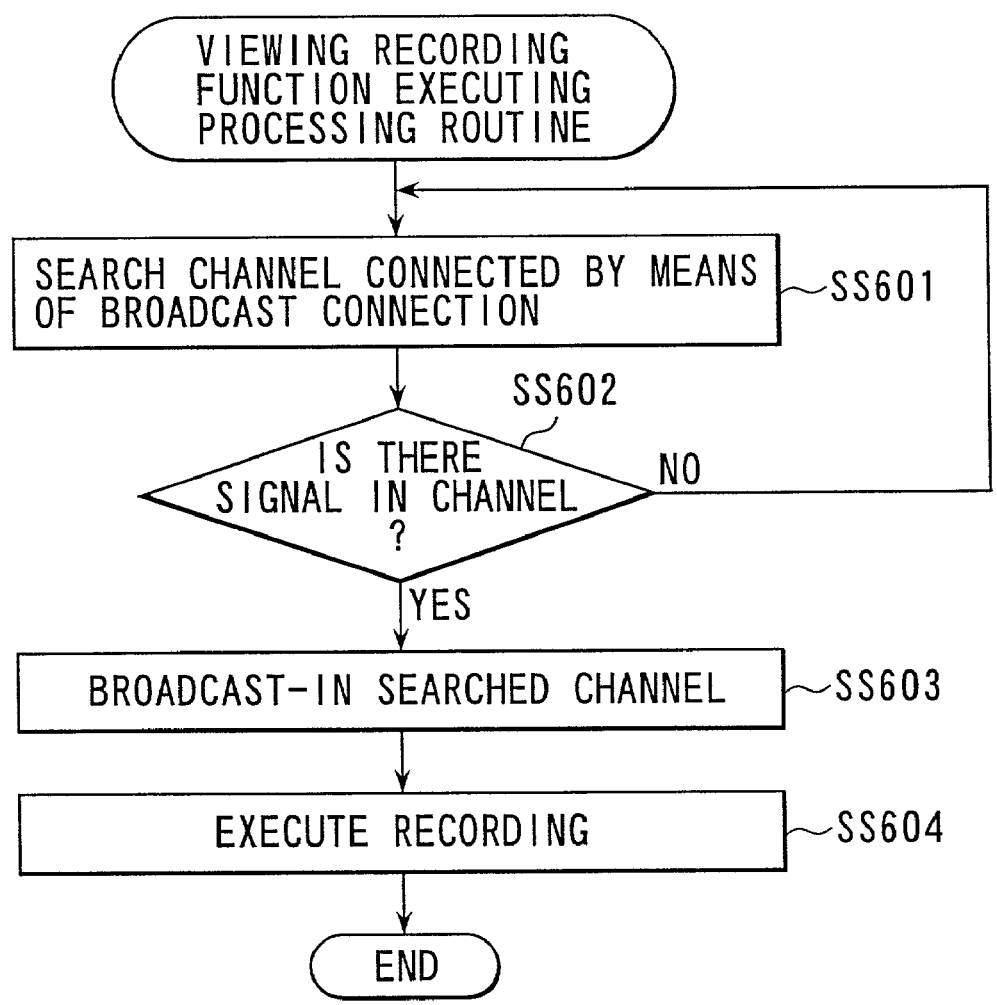
FIG. 27 is a flowchart for describing a routine for implementing the viewing recording function.

FIG. 27 is a flowchart for describing the viewing recording routine realized in the present embodiment. The routine shown in FIG. 27 is a routine implemented by means of the recording apparatus, and the routine is implemented by means of the DVTR's 3 and 4 in the present embodiment.

An exemplary case in which the viewing recording function is performed in the DVTR 3 will be described herein under, however, the same function is performed also in the DVTR 4. In the present embodiment, the DVTR's 3 and 4 are provided with the "viewing recording key (viewing recording button switch)". When a user pushes down the "viewing recording key" of the DVTR 3, the control unit 300 of the DVTR 3 implements the routine shown in FIG. 27.

At first, the control unit 300 of the DVTR 3 controls the IEEE 1394 I/F circuit 34 to refer iPCR and oPCR of each electronic apparatus connected to the digital bus, and searches the channel connected currently in the broadcast connection mode (step S601).

The processing in step S601 corresponds to the processing for detecting the default channel allocated to the monitor apparatus as the channel for connecting in the broadcast connection mode. The control unit 300 of the DVTR 3 determines whether the processable signal (data) is sent out to the detected default channel or not (step S602).

If it is determined that the processable data is not sent out to the detected default channel in the determination processing in step S602, then the processing in step S601 and in the following steps is repeated. On the other hand, if it is determined that the processable data is sent out to the detected default channel in the determination processing in step S602, then the control unit 300 of the DVTR 3 forms the broadcast-in connection to the channel (step S603), and records the data transmitted through the channel (step S604).

The DVTR 3 forms the broadcast-in connection to the default channel of the DTV 2 as described hereinabove, as the result the same data as supplied to the DTV 2 is recorded by means of the DVTR 3 without stopping of the playback of the data in the DTV 2. Furthermore, by changing the apparatus that forms the broadcast-out connection to the default channel of the DTV 2, the video data played back by means of the DTV 2 and the video data recorded by means of the DVTR 3 can be changed.

In other words, the video data of a picture can be recorded by means of the DVTR 3 while the picture is being monitored on the DTV 2, and the video data of a picture to be monitored and the video data to be recorded can be changed only by changing the transmission apparatus. In this case, the video data of a picture to be monitored is the same as the video data to be recorded.

When the apparatus that forms the broadcast-out connection to the default channel of the DTV 2 is to be changed, in the case of the broadcast connection mode, the data sent out from an apparatus that transmit it to the default channel later is always accepted as described hereinbefore. Therefore, an apparatus that transmits the data to the default channel can be changed easily only by operating playback in the target apparatus.

Figure 28A:
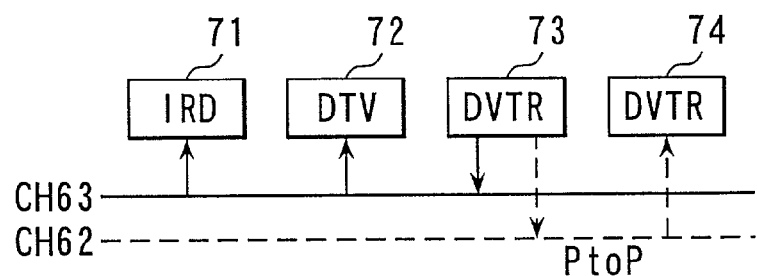
FIG. 28A to FIG. 28C are diagrams for describing the processing for performing the viewing recording function.
Figure 28B:
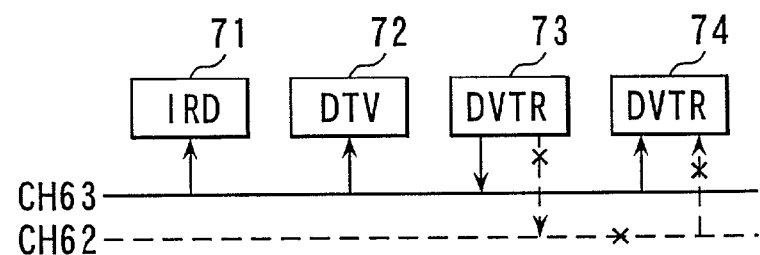
Figure 28C:
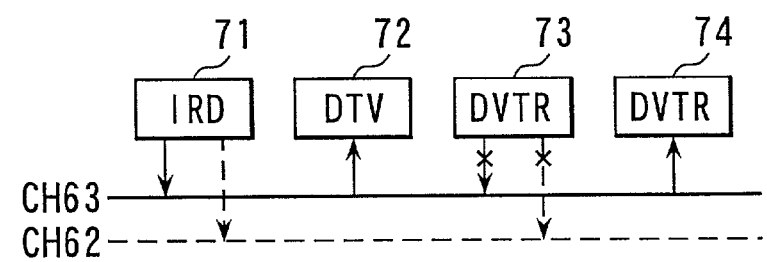

FIG. 28A to FIG. 28C are diagrams for describing the processing in detail for viewing recording function performed by means of the DVTR's 3 and 4 in the present embodiment. In FIG. 28A to FIG. 28C, a slid line arrow represents a broadcast connection and a dotted line arrow represents a PtoP connection. The arrow directed to a predetermined channel of the digital bus 5 represents the data output from an apparatus (output) and the arrow directed to an apparatus represents the data input (input).

As shown in FIG. 28A, the DVTR 3 forms the broadcast-out connection to the channel 63 that is the default channel allocated to the DTV 2 and the output played back from the DVTR 3 is monitored on the DTV 2. When the DVTR 4 starts recording at that time, the DVTR 4 forms a channel (channel 62) in the PtoP connection mode between the DVTR 4 and the DVTR 3 avoiding the default channel of the DTV 2 (channel 63), and starts recording of the playback output supplied from the DVTR 3.

When a user pushes down the "viewing recording key" of the DVTR 4 while the state shown in FIG. 28A is being maintained, the DVTR 4 releases the channel 62 connected in the PtoP connection mode between the DVTR 4 and the DVTR 3, and implements the routine shown in FIG. 27. The DVTR 4 forms the broadcast-in connection to the default channel of the DTV 2 (channel 63) as shown in FIG. 28B to continue recording of the playback output supplied from the DVTR 3.

At that time, because the playback output supplied from the DVTR 3 is supplied through the channel 63 also to the DTV 2, the playback output supplied from the DVTR 3 is monitored on the DTV 2. When the user pushes down the "monitor input key" of the IRD 1, the IRD 1 implements the playback output routine described with respect to FIG. 21, cancels the broadcast-out connection to the channel 63 of the DVTR 3, forms the broadcast-out connection to the channel 63 by itself, and transmits the data to the channel 63.

Thereby, the video data supplied from the IRD 1 is supplied to the DTV 2 and the DVTR 4 through the channel 63. The video data supplied from the IRD 1 is played back and monitored by means of the DTV 2, and the video data supplied from IRD 1 is recorded in a recording medium by means of the DVTR 4.

As described hereinabove, because the video data is recorded also through the default channel allocated to the DTV 2, the video data of a picture monitored on the DTV 2 can be recorded as it is by means of the DVTR 4, wherein the function of the broadcast connection mode is utilized actively. In the case that the transmission apparatus that supplies the video data to the DTV 2 is changed, the transmission apparatus that supplies the video data to the DVTR 4 is changed as it is. As the result, the video data monitored on the DTV 2 is recorded as it is by means of the DVTR 4.

[Other Channel Connections]

[Timer Recording]

When the timer recording is used, because recording is not necessary, a channel is formed in the PtoP connection mode avoiding the default channel also in this case. FIG. 29A to FIG. 29D are diagrams for describing the channel connection when the timer recording function of the IRD 1 is used.

Figure 29A:
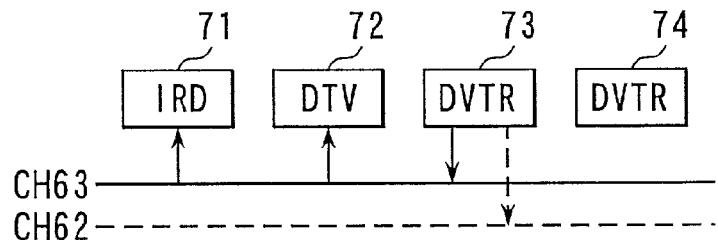
FIG. 29A to FIG. 29D are diagrams for describing the channel connection for the case in which the timer recording function of the IRD 1 is used.
Figure 29B:
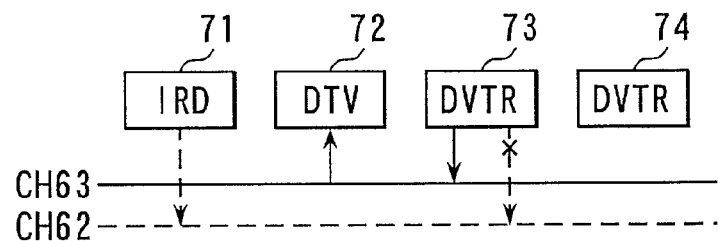

The timer recording function of the IRD 1 is activated as shown in FIG. 29B while the playback output supplied from the DVTR 3 is being monitored on the DTV 2 through the broadcast-out connection from the DVTR 3 to the channel 63 that is the default channel of the DTV 2 as shown in FIG. 29A. In this case, the IRD 1 transmits a control signal to, for example, the DVTR 4 that has been instructed by the user through the digital bus 5 so that a channel is formed in the PtoP connection mode to the DTV 2 avoiding the default channel and recording is started.

Figure 29C:
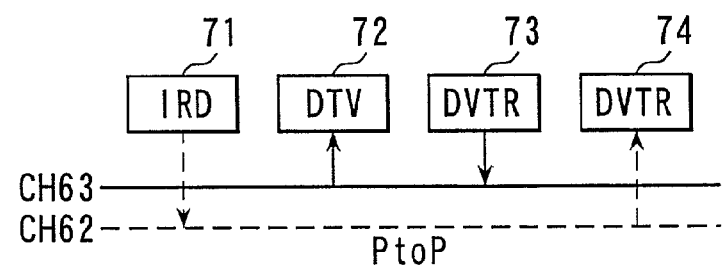

In response to the control signal, the DVTR 4 forms a channel in the PtoP connection mode (channel 62) between the DVTR 4 and the IRD 1 avoiding the channel 63 that is the default channel of the DTV 2 as shown in FIG. 29C, and recording of the video data supplied from the IRD 1 is started.

Figure 29D:
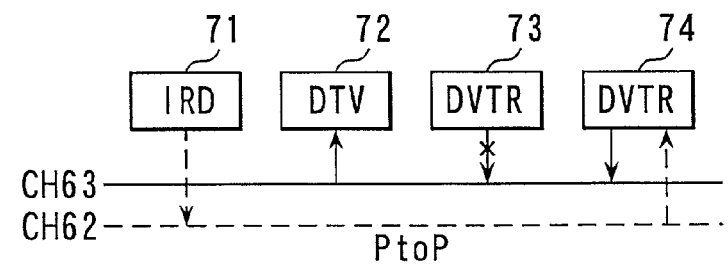

When the user wants to monitor the video data supplied from the IRD 1, the user pushes down the "monitor input key" of the DVTR 4, the DVTR 4 implements the playback output routine described with respect to FIG. 21 to thereby release the broadcast-out connection of the DVTR 3 to the channel 63 that is the default channel of the DTV 2 as shown in FIG. 29D.

The DVTR 4 forms the broadcast-out connection to the channel 63 that is the default channel of the DTV 2 and sends out the video data that is being recorded to the channel 63. Thereby, the video data that is being recorded by means of the DVTR 4 is monitored on the DTV 2.

[Use of Decoding Function of IRD]

In the present embodiment, the IRD 1 decodes the video data supplied through the digital bus 5 and converts it to the analog video signal, and sends it out. When the decoding function is used, the IRD 1 forms the broadcast-in connection to the default channel of the DTV 2.

Figure 30A:
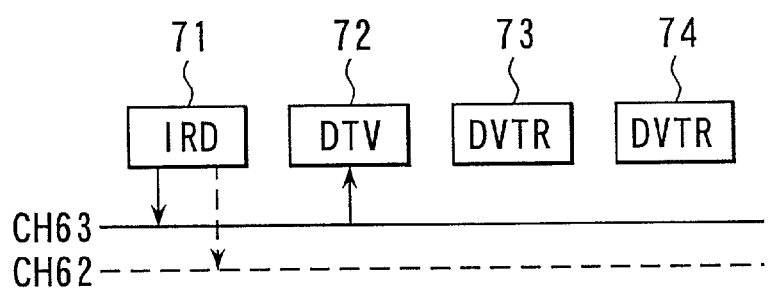
FIG. 30A to FIG. 30C are diagrams for describing the channel connection for the case in which the decoding function of the IRD 1 is used.
Figure 30B:
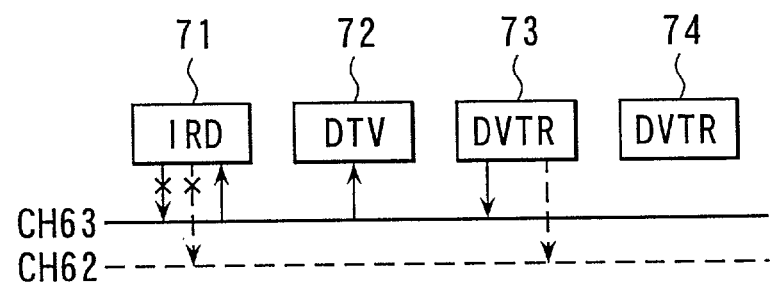
Figure 30C:
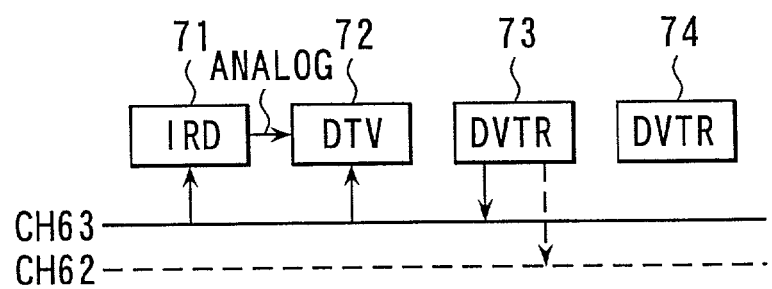

FIG. 30A to FIG. 30C are diagrams for describing the channel connection for using the decoding function of the IRD 1. As shown in FIG. 30A, the IRD 1 forms the broadcast-out connection to the channel 63 that is the default channel of the DTV 2, and the video data supplied from the IRD 1 is being monitored on the DTV 2.

When the DVTR 3 starts playback while the state shown in FIG. 30A is being maintained, the DVTR 3 cancels the broadcast-out connection to the channel 63 of the IRD 1 and forms the broadcast-out connection to the channel 63 by itself, and supplies the playback output to the DTV 2 as shown in FIG. 30B.

When a user pushes down, for example, the "decoding function key" of the IRD 1 while the state shown in FIG. 30B is being maintained, the IRD 1 forms the broadcast-in connection to the default channel of the DTV 2 as shown in FIG. 30C, receives supply of the playback output that is supplied to the DTV 2 from the DVTR 3, decodes it, converts it to the analog signal, and sends it out.

The analog video signal supplied from the IRD 1 is supplied to the DTV 2 through the analog input terminal of the DTV 2 as shown in FIG. 30C, as the result the DTV 2 can playback a picture corresponding to the analog video signal decoded and converted to the analog signal by means of the IRD 1, that is originally the playback output sent out from the DVTR 3.

In the case of an electronic apparatus that is capable of receiving supply of the video data as described hereinabove, by forming the broadcast-in connection to the default channel of the DTV 2, the same video data as the video data supplied to the DTV 2 can be received and processed.

[Example of Channel Connection in the Case of a Plurality of Monitor Apparatus]

Furthermore, as described hereinbefore, in the case that two DTV's, namely monitor apparatus, are connected to the digital bus 5 as shown in FIG. 31A to FIG. 31E, different default channels can be set to the respective monitor apparatus, namely DTV 2 and the DTV 6 respectively in FIG. 31A to FIG. 31E, as described hereinbefore with respect to the flowchart shown in FIG. 20.

Figure 31A:
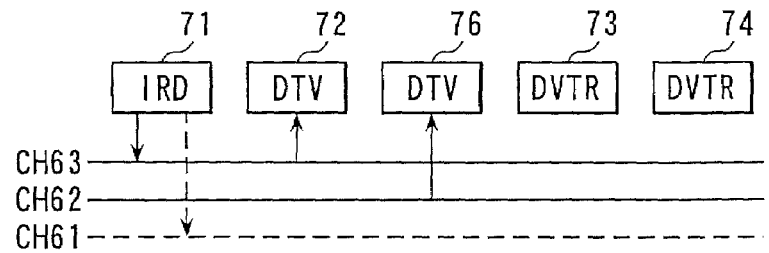
FIG. 31A to FIG. 31E are diagrams for describing the channel connection for the case in which a plurality of monitor apparatus are connected.

In detail, in the case of the example shown in FIG. 31A to FIG. 31E, the channel 63 is allocated to the DTV 2 as the default channel, and the channel 62 is allocated to the DTV 6 as the default channel. As shown in FIG. 31A, the IRD 1 forms the broadcast-out connection to the channel 63 that is the default channel of the DTV 2, and the video data supplied from the IRD 1 is monitored on the DTV 2.

Figure 31B:
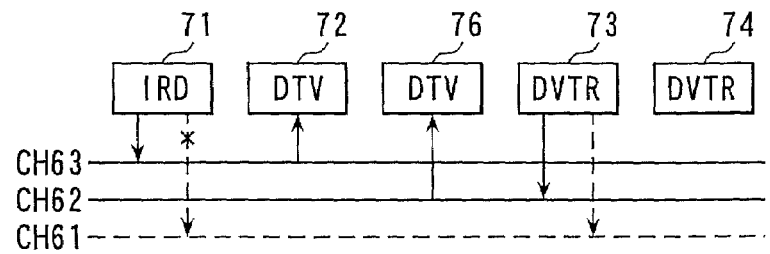

When the DVTR 3 starts playback while the state shown in FIG. 31A is being maintained, the DVTR 3 selects the DTV 6 as the monitor apparatus as described hereinbefore with respect to FIG. 20 to thereby form the broadcast-out connection to the channel 62 that is the default channel of the DTV 6 as shown in FIG. 31B, and the playback output supplied from the DVTR 3 is monitored on the DTV 6. In other words, the respective monitor apparatus connected to the same digital bus 5 receive supply of the data from different transmission apparatus, and play back the video data supplied to this apparatus independently of another monitor apparatus.

The default channel allocated to the DTV's 2 and 6 of the present embodiment can be changed correspondingly to, for example, the instruction entered by a user. For example, when the "channel change key" of the DTV 2 is pushed down, the DTV 2 changes the default channel allocated to this apparatus.

The default channel is changed by changing the flag for the broadcast connection of iPCR of this apparatus to another channel, or by adding a flag for the broadcast connection of iPCR. In detail, a channel selected by a user is allocated to the default channel of this apparatus, or the default channel that has been allocated to another monitor apparatus is changed to the default channel of this apparatus.

Figure 31C:
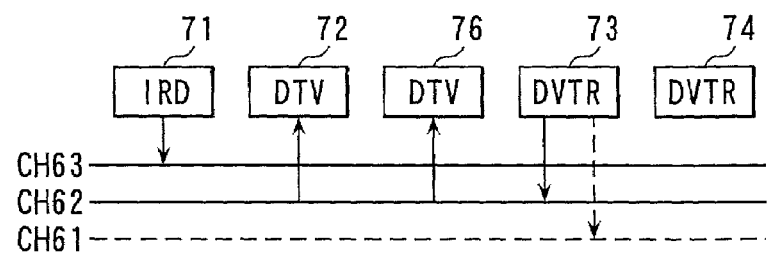

Thereby as shown in FIG. 31C, the DTV 2 changes the default channel allocated to this apparatus from the channel 63 to the channel 62, as the result the DTV 2 and the DTV 6 both can receive supply of the playback output from the DVTR 3 to display a picture of the video data.

Figure 31D:
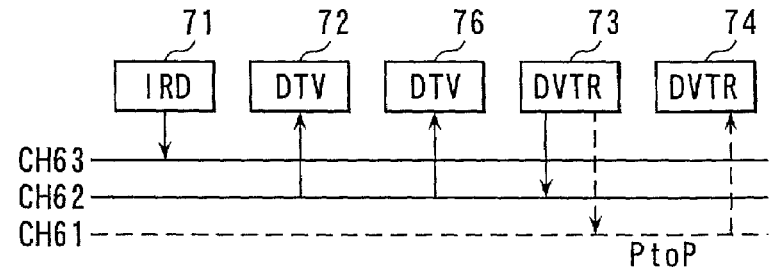
Figure 31E:
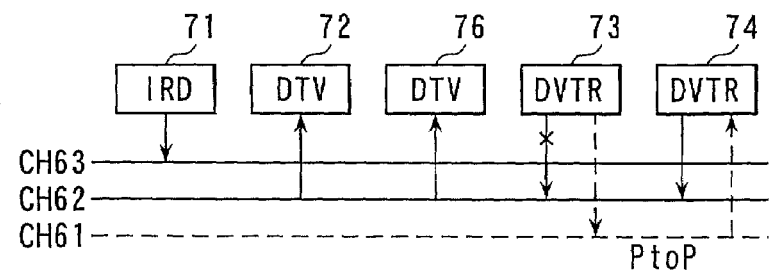

Furthermore, when the DVTR 4 starts recording while the state shown in FIG. 31C is being maintained, the recording routine described hereinbefore with respect to FIG. 24 is implemented, the DVTR 4 forms a channel in the PtoP connection mode between the DVTR 4 and the DVTR 3 avoiding the default channel allocated to the monitor apparatus as shown in FIG. 31D, and the playback output supplied from the DVTR 3 is recorded in a recording medium.

When the "monitor input key" of the DVTR 4 is pushed down, the DVTR 4 cancels the broadcast-out connection of the DVTR 3 that is sending out the data to the default channel (channel 62) allocated to the DTV 6 that is the monitor apparatus selected by this apparatus as shown in FIG. 20E.

Then, the DVTR 4 forms the broadcast-out connection to the default channel of the DTV 6 (channel 62), and sends out the video data that is being recorded to the channel. Thereby, the video data that is being recorded by means of the DVTR 4 can be monitored on the DTV 2 and the DTV 6.

As described hereinabove, in the case that a plurality of monitor apparatus are connected to the digital bus 5, by allocating a default channel to each monitor apparatus, a plurality of channels of the IEEE 1394 standard digital interface are utilized effectively, and the convenient home network system can be structured.

Figure 32A:
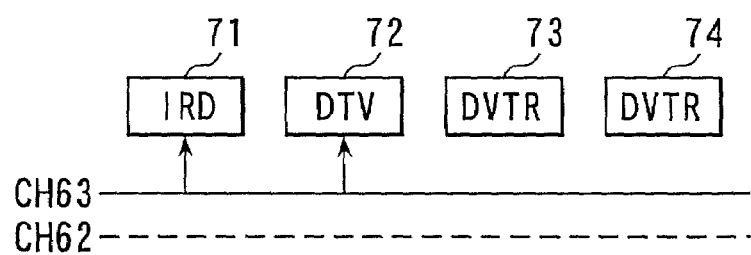
FIG. 32A and FIG. 32B are diagrams for describing the channel connection immediately after the power source is supplied to electronic apparatus of the home network system.
Figure 32B:
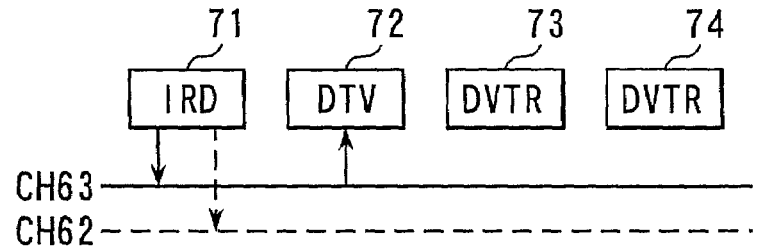

FIG. 32A and FIG. 32B are diagrams for describing the channel connection formed immediately after the power source is supplied to each electronic apparatus of the home network system of the present embodiment. As shown in FIG. 32A and FIG. 32B, when the power source is supplied to each electronic apparatus of the home network system, each electronic apparatus operates so that this apparatus is to be the receiving apparatus for receiving the data (input apparatus).

In the present embodiment, as shown in FIG. 32A, the IRD 1 and the DTV 2 that are not served for recording of the data in response to the instruction entered by a user form the broadcast-in connection to the default channel of the DTV 2 so that this apparatus is to be the receiving apparatus in initialization. Then, the IRD 1 becomes a transmission apparatus (output apparatus) as shown in FIG. 32B if there is no data on the channel to which this apparatus forms the broadcast-in connection, and forms the broadcast-out connection to the default channel of the DTV 2, and the data is sent out.

As described hereinabove, because each apparatus connected to the home network system is operated as the receiving apparatus, in the case that the data is being sent out to the default channel of the DTV 2, stopping of data sending of the default channel is prevented, and the operation that is not the intention of a user is prevented.

Figure 33:
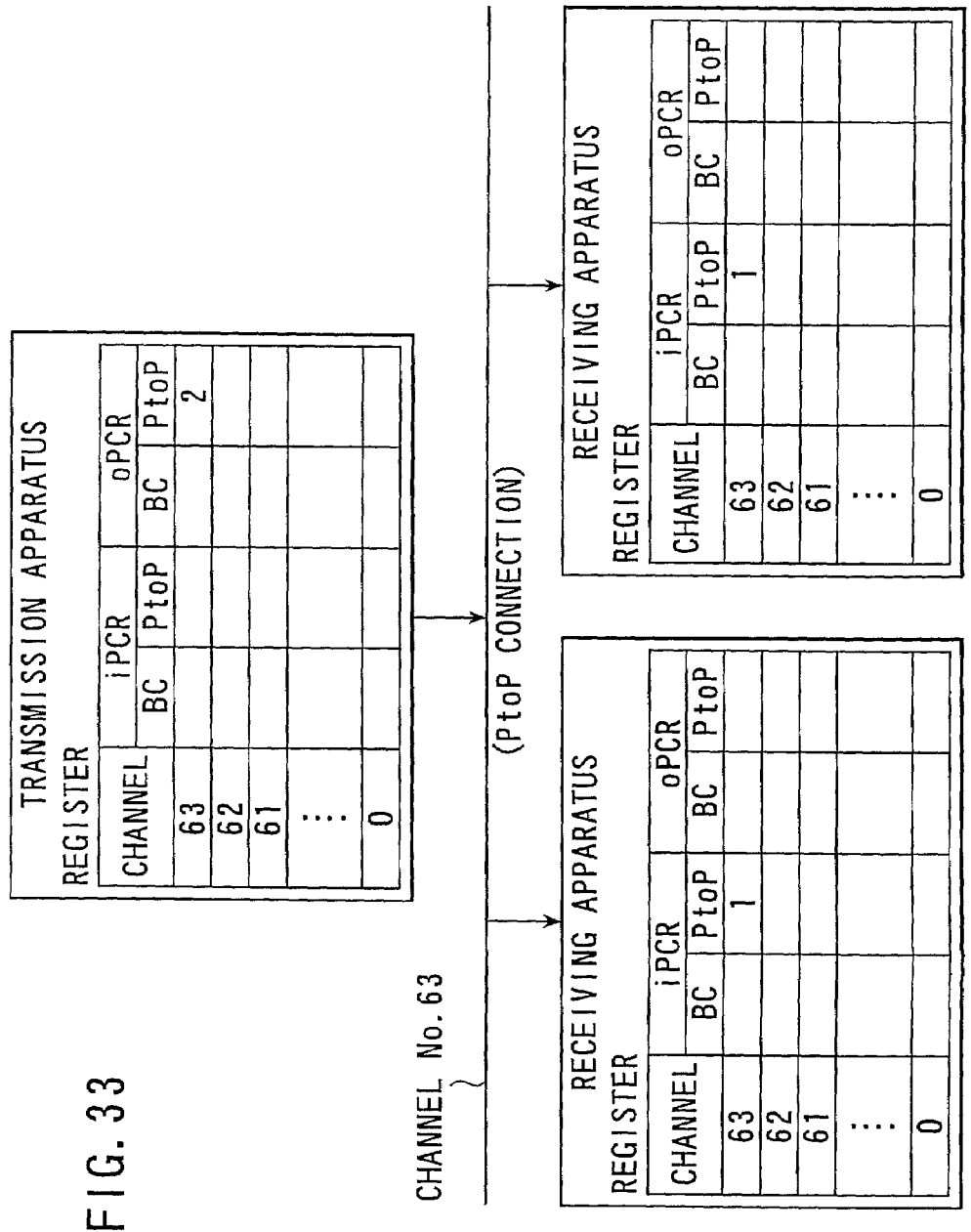
FIG. 33 is a diagram for describing the PtoP connection mode channel connected between one transmission apparatus and a plurality of receiving apparatus.
Figure 34:
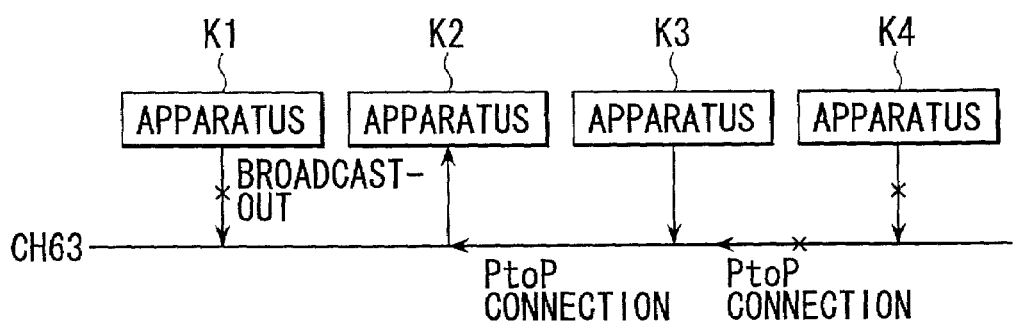
FIG. 34 is a diagram for describing the conventional channel connection for the case in which the IEEE 1394 standard digital interface is used.

In the case of the IEEE 1394 standard digital interface, it is possible to connect a channel in the PtoP connection mode to the same channel between one transmission apparatus and a plurality of receiving apparatus. FIG. 33 is a diagram for describing the case in which a channel is connected in the PtoP connection mode to the same channel between one transmission apparatus and a plurality of receiving apparatus.

As shown in FIG. 33, two receiving apparatus set a flag to the register PtoP for the PtoP connection of the target channel of iPCR of this apparatus and the register PtoP for the PtoP connection of the target channel of oPCR of the transmission apparatus respectively. In this case, the transmission apparatus increments the flag when a flag for the PtoP connection is set.

In other words, when it is requested from two receiving apparatus to connect a channel in the PtoP connection mode, a flag 2 is set to the register PtoP for the PtoP connection of the target channel of oPCR of the transmission apparatus as shown in FIG. 33. As described hereinabove, the register PtoP for the PtoP connection has a counter structure.

By utilizing this function, for example in the above-mentioned embodiment, the DVTR 3 and the DVTR 4 connect a channel in the PtoP connection mode between these apparatus and the IRD 1 avoiding the default channel of the DTV 2 and receive supply of the video data from the IRD 1, and the video data is thereby recorded.

As described hereinabove, in the present embodiment, in the case the picture of the IRD 1 is to be viewed on the DTV 2, for example, when the power source is supplied to the IRD 1, because the IRD 1 forms the broadcast-out connection to the channel for the broadcast connection allocated to the DTV 2 and sends out the data, the data supplied from the IRD 1 is played back and viewed without any operation performed by a user on the DTV 2 side.

Similarly, when the video data recorded in a recording medium mounted on the DVTR 3 is played back and viewed, for example, the "playback key" of the DVTR 3 is pushed down, the DVTR 3 forms the broadcast-out connection to the channel for the broadcast connection allocated to the DTV 2 and sends out the data. Thereby, the video data supplied from the DVTR 3 is viewed on the DTV 2 almost at the time when the "playback key" is pushed down. As a mater of course, the same is true for the DVTR 4.

While the data supplied from the IRD 1 is being received by means of the DTV 2 and the data that is being viewed on the DTV 2 by a user, when the data is to be recorded by means of the DVTR 3 or the DVTR 4, at that time point because the DVTR 3 or 4 can be aware of the sender apparatus of the data from the header information of the data sent out from the IRD 1 that is being viewed on the DTV 2, the DVTR 3 or 4 forms a channel in the PtoP connection mode between this apparatus and the sender apparatus avoiding the default channel of the DTV 2 to thereby record the data transmitted from the transmission apparatus without discontinuity.

The broadcast connection operation key such as the above-mentioned "viewing recording key" of the DVTR 3 or the DVTR 4 is operated to thereby form the broadcast-in connection to the default channel of the DTV 2 without establishment of the channel connection in the PtoP connection mode as in the case of the DTV 2. Thereby, the video data of a picture displayed on the display element of the DTV 2 is always recorded without changing the signal of the transmission apparatus and without complex operation.

A recording apparatus is provided with an exclusive key such as "viewing recording key" in the present embodiment, however, otherwise a method in which a transmission apparatus for transmitting the data is provided with an exclusive key such as "viewing recording key" and the transmission apparatus side controls a receiving apparatus may be employed.

Furthermore, because a transmission apparatus (output apparatus) for transmitting the data is specified previously in the case of application so-called timer recording or reservation recording, a channel is formed in the PtoP connection mode between the transmission apparatus and a recording apparatus without confirming the signal to be recorded on the DTV 2, and the data supplied from the transmission apparatus is recorded by means of the recording apparatus without interference by another apparatus.

In this case, for example, when the "monitor input key" of the transmission apparatus is pushed down, the transmission apparatus forms the broadcast-out connection to the default channel of the DTV 2 and sends out the same data as the video data that is being recorded to the DTV 2. Thereby, the video data that is being recorded is monitored on the DTV 2 for confirming the recording content.

Furthermore, a user can view the data supplied from the transmission apparatus only by operating the transmission apparatus that transmits the data without any operation such as change operation of the transmission apparatus on the DTV 2.

It is assumed that the "recording start key" and the "monitor key" are separate two keys in the above-mentioned embodiment. However, other methods may be employed. For example, the "recording and monitor key" is provided and when this key is pushed down, a channel is formed in the PtoP connection mode between this apparatus and the transmission apparatus avoiding the default channel for recording, and forms the broadcast-out connection to the default channel of the monitor apparatus for monitoring the recording data.

As described hereinabove with respect to the flowchart shown in FIG. 20 in the above-mentioned embodiment, when a channel is to be secured in the broadcast connection mode for the monitor apparatus, if the data that is impossible to be processed by the monitor apparatus is sent out to the default channel set to the monitor apparatus or if the default channel set to the monitor apparatus is allocated to another apparatus, the default channel is changed. This is the processing for securing the default channel to the monitor apparatus.

However, in some cases, the data that is impossible to be processed by the monitor apparatus is sent out to the digital bus after the default channel has been set. To avoid the trouble, a method as described herein under may be employed, in which whether the data that is impossible to be processed by the monitor apparatus is sent out to the default channel of the monitor apparatus or not is monitored, and an apparatus that detects the sending out of the unacceptable data changes the default channel or other used channels.

Otherwise, a method in which the monitor apparatus is detected so as to secure a transmission line of the broadcast connection mode may be employed in response to an instruction entered by a user, or a method in which a secured transmission line for forming a channel of the broadcast connection mode is changed may be employed.

Furthermore, the execution timing of the detection of the monitor apparatus and the securing of the transmission line for forming a connection of the broadcast connection may be arbitrary as required. For example, it may be the predetermined time or it may be the time when the power source is supplied to the first apparatus.

Furthermore otherwise, for example, when the IRD 1 shown in FIG. 22A forms the broadcast-out connection to the channel 63, the IRD 1 declares that a channel other than the default channel of the DTV 2, namely the channel 62 as shown by the dotted line arrow from the IRD 1 in this example, will be used for the PtoP connection in preparation for the PtoP connection request from another apparatus.

Thereby, the PtoP connection request can be responded immediately. In this case, when the PtoP connection is requested, the IRD 1 may holds the information for instructing that the channel 62 is used in the memory of the register of the IEEE 1394 I/F circuit 17 or the memory of the control unit 100.

The case in which the processing for categorizing the apparatus and allocating the channel, the processing for forming channel connection for playback output, the processing for forming channel connection for recording, and the processing for forming channel connection for viewing recording function are performed by cooperation of the IEEE 1394 I/F circuit and the control unit of the respective electronic apparatus is described in the above-mentioned embodiment. However, the present invention is by not means limited to this case.

For example, a method in which functions to perform the above-mentioned processing may be mounted on the IEEE 1394 I/F circuits of the respective apparatus may be employed. Otherwise, a method in which a controller that is exclusively used for the IEEE 1394 I/F circuit and the above-mentioned processing is performed by cooperation of the above-mentioned controller and the IEEE 1394 I/F circuit may be employed.

The case in which the home network comprises the IRD, DTV, and DVTR is described in the above-mentioned embodiment, however, the present invention is by no means limited to this case. For example, the present invention may be applied to an information transmission system formed by connecting various electronic apparatus such as DVD (digital video disc) players, DVD recording/reproducing apparatus, and personal computers to a digital bus.

As a matter of course, the electronic apparatus in accordance with the present invention may be applied to the electronic apparatus for transmitting the data or for receiving and processing the data. The digital interface is by no means limited to the IEEE 1394 standard digital interface, but the present invention may be applied to the information transmission system formed by use of a digital interface such as USB (universal serial bus).

As described hereinbefore, according to the present embodiment, a plurality of transmission channels provided by the digital interface are utilized efficiently, and different connection modes are both used effectively to arrange the convenient environment for utilizing digital contents.

What is claimed is:

1. A method for using a plurality of transmission lines of a digital bus having a plurality of transmission lines operable in a first connection mode and a second connection mode, comprising the steps of:

forming a first transmission line using said first connection mode with the first transmission line being adapted to transmit data sent out from one of plural electronic apparatuses coupled to the digital bus so as to be receivable by all other electronic apparatus, forming a second transmission line using said second connection mode with the second transmission line being adapted to transmit data between only two predetermined electronic apparatus and said second line not communicating data transmitted from electronic apparatus other than said predetermined electronic apparatus, pre-selecting the plurality of transmission lines of the digital bus into groups before any transmission lines among the plurality of transmission lines is formed, said groups including a first group that transmits data only in said first connection mode, and a second group that transmits data only in said second connection mode, classifying said plurality of electronic apparatus connected to said digital bus into groups including a first group that receives data substantially through a transmission line of said first connection mode and a second group that receives data substantially through a transmission line of said second connection mode, wherein the plurality of electronic apparatus connected to said digital bus are classified into the first and second groups by inquiring whether each electronic apparatus connected to said digital bus includes a monitor apparatus to display a supplied signal; and assigning some of said plurality of transmission lines to said first connection mode based on the status of whether a default channel for an electronic apparatus having said monitor apparatus is used or occupied by another apparatus and the remaining transmission lines to the second connection mode.

2. The method of claim 1, wherein a plurality of transmission lines are secured for said first connection mode correspondingly to the number of said first receiving apparatus connected to said digital bus.

3. The method of claim 1, wherein, in the case that said first receiving apparatus functions to receive data through another transmission line while said first receiving apparatus is receiving data through one transmission line, a plurality of transmission lines are secured for said first connection mode correspondingly to the number of said first receiving apparatus obtained on the assumption that there is said first receiving apparatus on every receivable transmission line.

4. The method of claim 1, wherein an electronic apparatus that detects the necessity to classify the electronic apparatus into said first receiving apparatus and said second receiving apparatus and the necessity to secure the transmission line performs classification of the electronic apparatus into said first receiving apparatus and said second receiving apparatus and secures the transmission line.

5. The method of claim 4, wherein, the necessity to classify the electronic apparatus into said first receiving apparatus and said second electronic apparatus and to secure the transmission line are recognized when attaching of an electronic apparatus to said digital bus or detaching of an electronic apparatus from said digital bus are detected, and the electronic apparatus is classified into said first receiving apparatus and said second electronic apparatus and the transmission line is secured.

6. The method of claim 4, wherein a necessity to classify the electronic apparatus into said first receiving apparatus and said second electronic apparatus and to secure the transmission line is recognized when an instruction is given by a user, and the electronic apparatus is classified into said first receiving apparatus and said second electronic apparatus and the transmission line is secured.

7. The method of claim 1, wherein a predetermined electronic apparatus out of the electronic apparatus connected to said digital bus classifies the electronic apparatus into said first receiving apparatus and said second receiving apparatus and secures the transmission line, and when said predetermined electronic apparatus detects the necessity to classify the electronic apparatus into said first receiving apparatus and said second receiving apparatus and the necessity to secure the transmission line, said predetermined electronic apparatus performs classification of the electronic apparatus into said first receiving apparatus and said second receiving apparatus and securing of the transmission line.

8. The method of claim 1, wherein:

said second receiving apparatus, when said second receiving apparatus receives a supply of data from a target electronic apparatus connected to said digital bus, forms a transmission line of said second connection mode avoiding the transmission line that has been secured as the transmission line of said first connection mode, and receives said supply of data through the formed transmission line, and when said second receiving apparatus receives supply of data transmitted through the transmission line of said first connection mode of said digital bus, said second receiving apparatus forms a transmission line of said first connection mode used for transmission of data, and receives said supply of data.

9. The method of claim 8, wherein, when said second receiving apparatus is to receive a supply of data that is being transmitted through the transmission line of said first connection mode, then through a transmission line of said second connection mode, said second receiving apparatus specifies a sender of data transmitted through the transmission line of said first connection mode as said target electronic apparatus that supplies data to this apparatus, and forms a transmission line of said second connection mode between said second receiving apparatus and the specified electronic apparatus.

10. The method of claim 8, wherein, when said second receiving apparatus is to receive supply of data from the target electronic apparatus, said second receiving apparatus accepts a selection input entered by a user to select a sender electronic apparatus from among said plurality of electronic apparatus connected to said digital bus, specifies said target electronic apparatus that supplies data to this apparatus correspondingly to said selection input, and forms a transmission line of said second connection mode between said second receiving apparatus and the specified electronic apparatus.

11. The method of claim 1, wherein a sending out apparatus that is an electronic apparatus for sending out data to said digital bus is capable of sending out data through both a transmission line connected in said first connection mode and a transmission line connected in said second connection mode.

12. The method of claim 1, wherein a sending out apparatus that is an electronic apparatus for sending out data to said digital bus is connected to a secured transmission line of said first connection mode and sends out data when an instruction input entered by a user instructing that data be sent out to a transmission line connected in said first connection mode is accepted.

13. The method of claim 1, wherein an electronic apparatus connected to said digital bus changes a secured transmission line of said first connection mode when the necessity for changing said secured transmission line of said first connection mode.

14. The method of claim 13, wherein an electronic apparatus connected to said digital bus changes a secured transmission line of said first connection mode when sending out of data that cannot be processed by mean of said first receiving apparatus to said secured transmission line of said first connection mode is detected.

15. The method of claim 13, wherein an apparatus connected to said digital bus changes a transmission line of said first connection mode secured for said first receiving apparatus when the change of secured transmission line of said first connection mode is instructed by a user.

16. The method of claim 1, wherein said digital bus is the IEEE 1394 standard digital serial interface.

17. A method for using a plurality of transmission lines of a digital bus having said plurality of transmission lines operable in a first connection mode and a second connection mode, comprising the steps of:

forming a first transmission line using said first connection mode with the first transmission line being adapted to transmit data sent out from one of plural electronic apparatuses coupled to the digital bus so as to be receivable by all other electronic apparatuses, forming a second transmission line using said second connection mode with the second transmission line being adapted to transmit data between only two predetermined electronic apparatuses and not accepting data transmitted from electronic apparatus other than said predetermined electronic apparatuses, pre-selecting the plurality of transmission lines of the digital bus into groups before any transmission lines among the plurality of transmission lines is formed said groups including a first group that transmits data only in said first connection mode, and a second group that transmits data only in said second connection mode, classifying said plurality of electronic apparatus connected to said digital bus into groups including a first group that receives data substantially through a transmission line of said first connection mode and a second group that receives data substantially through a transmission line of said second connection mode, wherein the plurality of electronic apparatus connected to said digital bus are classified into the first and second groups by inquiring whether each electronic apparatus connected to said digital bus includes a monitor apparatus to display a supplied signal; and assigning a transmission line of said first connection mode to each of said first receiving apparatus that receive data substantially through a transmission line of said first connection mode with one-to-one correspondence and based on the status of whether a default channel for an electronic apparatus having said monitor apparatus is used or occupied by another apparatus.

18. The method of claim 17, wherein said plurality of transmission lines comprises:
a transmission line of said first connection mode is previously set to each said first receiving apparatus, and
a transmission line different from said previously set transmission line is allocated to said first transmission apparatus when data that said first receiving apparatus cannot process is found on the previous set transmission line of said first receiving apparatus.

19. The method of claim 17, wherein one of said plurality of transmission lines, when the transmission line that is to be allocated to said first receiving apparatus is exclusively occupied by another apparatus, the transmission line that is to be allocated to said first receiving apparatus is changed.

20. The method of claim 19, wherein said plurality of transmission lines comprises:
a transmission line of said first connection mode is previously set to each of said first receiving apparatus,
each setting information of said first receiving apparatus connected to said digital bus is referred, and
when the transmission line that is to be allocated to said first receiving apparatus has been already allocated to another electronic apparatus, the transmission line is regarded as exclusively occupied by another electronic apparatus, and the transmission line that is to be allocated to the first receiving apparatus is changed.

21. An information transmission system comprising:
a plurality of electronic apparatus respectively coupled to a digital bus having a plurality of transmission lines;
each transmission line being predetermined to operate in a first connection mode and a second connection mode;
said plurality of transmission lines comprising:
at least one transmission line operating in said first connection mode that transmits data sent out from one electronic apparatus so as to be receivable for all other electronic apparatus connected to said digital bus,
at least one transmission line operating in said second connection mode that transmits data between only two predetermined electronic apparatuses and does not accept data transmitted from other electronic apparatuses, wherein the connection mode of each transmission line is pre-selected before one of said connection modes is established, at least one electronic apparatus among said plurality of electronic apparatus connected to said digital bus comprising:

apparatus classification means for categorizing said plurality of electronic apparatus connected to said digital bus into a first receiving apparatus that receives data substantially through a transmission line of said first connection mode and a second receiving apparatus that receives data substantially through a transmission line of said second connection mode; wherein the plurality of electronic apparatus connected to said digital bus are categorized into first and second receiving apparatus by inquiring whether each electronic apparatus connected to said digital bus includes a monitor apparatus to display a supplied signal; and transmission line securing means for securing some of said plurality of transmission lines for said first connection mode based on the status of whether a default channel for an electronic apparatus having said monitor apparatus is used or occupied by another apparatus and for allocating the remaining transmission lines for said second connection mode.

22. The information transmission system as claimed in claim 21, wherein said transmission line securing means of said electronic apparatus secures a plurality of transmission lines for said first connection mode correspondingly to the number of said first receiving apparatus connected to said digital bus.

23. The information transmission system as claimed in claim 21, wherein, in the case that said first receiving apparatus functions to receive data through another transmission line while said first receiving apparatus is receiving data through one transmission line, said transmission line securing means of said electronic apparatus secures a plurality of transmission lines for said first connection mode correspondingly to the number of said first receiving apparatus obtained on the assumption that there is said first receiving apparatus on every receivable transmission line.

24. The information transmission system as claimed in claim 21, wherein:
there is provided detection means for detecting the necessity to classify the electronic apparatus into said first receiving apparatus and said second receiving apparatus and the necessity to secure a transmission line among said plurality of transmission lines,
said electronic apparatus classification means of said electronic apparatus classifies the electronic apparatus when said detection means detects the necessity to classify the electronic apparatus into said first receiving apparatus and said second receiving apparatus and the necessity to secure the transmission line, and
said transmission line securing means of said electronic apparatus secures a transmission line when said detection means detects the necessity to classify the electronic apparatus into said first receiving apparatus and said second receiving apparatus and the necessity to secure the transmission line.

25. The information transmission system as claimed in claim 24, wherein said detection means of said electronic apparatus detects attaching of an electronic apparatus to said digital bus or detaching of an electronic apparatus from said digital bus.

26. The information transmission system as claimed in claim 24, wherein said detection means of said electronic apparatus detects an execution instruction input entered by a user that instructs the classification of the electronic apparatus into said first receiving apparatus and said second receiving apparatus and that instructs securing of a transmission line.

27. The information transmission system as claimed in claim 21, wherein:
an electronic apparatus comprising said apparatus classification means and said transmission line securing means is a predetermined electronic apparatus out of said plurality of electronic apparatus connected to said digital bus,
said predetermined electronic apparatus comprises said detection means for detecting the necessity to classify the electronic apparatus into said first receiving apparatus and said second receiving apparatus and the necessity to secure a transmission line,
said electronic apparatus classification means of said predetermined electronic apparatus classifies the apparatus when said detection means detects the necessity to classify the electronic apparatus into said first receiving apparatus and said second receiving apparatus and the necessity to secure a transmission line, and
said transmission line securing means of said predetermined electronic apparatus secures a transmission line when said detection means detects the necessity to classify the electronic apparatus into said first receiving apparatus and said second receiving apparatus and the necessity to secure a transmission line.

28. The information transmission system as claimed in claim 21, wherein said second receiving apparatus comprises:
transmission line forming means for forming a transmission line of said second connection mode avoiding the transmission line that has been secured as the transmission line of said first connection mode when said second receiving apparatus receives supply of data from a target electronic apparatus connected to said digital bus; and
connection means for connecting to a transmission line of said first connection mode used for transmission of data when said second receiving apparatus receives supply of data transmitted through the transmission line of said first connection mode of said digital bus.

29. The information transmission system as claimed in claim 28, wherein:
said second receiving apparatus comprises a transmission apparatus specifying means for specifying the sender of data transmitted through the transmission line of said first connection mode as said target electronic apparatus that supplies data to this apparatus when said second receiving apparatus is to receive a supply of data that is being transmitted through the transmission line of said first connection mode, then through a transmission line of said second connection mode, and
said transmission line forming means forms a transmission line of said second connection mode between said second receiving apparatus and the specified electronic apparatus.

30. The information transmission system as claimed in claim 28, wherein:
said second receiving apparatus comprises apparatus selection input accepting means for accepting a selection input entered by a user to select an sender electronic apparatus from among said plurality of electronic apparatus connected to said digital bus when said second receiving apparatus is to receive supply of data from the target electronic apparatus, and
said transmission line forming means forms a transmission line of said second connection mode between said second receiving apparatus and the electronic apparatus instructed according to the apparatus selection input accepted by means of said apparatus selection input accepting means.

31. The information transmission system as claimed in claim 21, wherein a sending out apparatus that is an electronic apparatus for sending out data to said digital bus comprises data sending out means that is capable of sending out data through both a transmission line connected in said first connection mode and a transmission line connected in said second connection mode.

32. The information transmission system as claimed in claim 31, wherein:
said sending out apparatus comprises an instruction input accepting means for accepting an instruction input entered by a user instructing that data is sent out to a transmission line connected in said first connection mode, and
said data sending out means sends out data to a transmission line of said first connection mode when said data sending means accepts an instruction input entered by a user through said instruction input accepting means.

33. The information transmission system as claimed in claim 21, wherein an electronic apparatus connected to said digital bus comprises:
changing necessity detection means for detecting the necessity to change the transmission line secured for said first receiving apparatus, and
transmission line changing means for changing the transmission line of said first connection mode secured for said first receiving apparatus when said changing necessity detection means detects the necessity to change the transmission line secured for said first receiving apparatus.

34. The information transmission system as claimed in claim 33, wherein said changing necessity detection means detects the necessity to change the transmission line secured for said first receiving apparatus when data that cannot be processed by mean of said first receiving apparatus is being sent to the transmission line secured for said first receiving apparatus.

35. The information transmission system as claimed in claim 33, wherein:
change instruction input accepting means for accepting a change instruction input entered by a user for changing the transmission line, and
said changing necessity detection means detects the necessity to change the transmission line secured for said first receiving apparatus when a change instruction input is accepted through said changing instruction input accepting means.

36. The information transmission system as claimed in claim 21, wherein said digital bus is the IEEE 1394 standard digital serial interface.

37. An information transmission system formed by connecting a plurality of electronic apparatus to a digital bus having a plurality of transmission lines with each line capable of selecting among a first connection mode and a second connection mode to form a transmission line comprising:
at least one transmission line, operating in said first connection mode, that transmits data sent out from one electronic apparatus so as to be receivable for all other electronic apparatus connected to said digital bus, at least one transmission line, operating in said second connection mode that transmits data between only two predetermined electronic apparatuses and does not accept data transmitted from other electronic apparatuses, at least one electronic apparatus connected to said digital bus comprising:

apparatus classification means for categorizing said plurality of electronic apparatus connected to said digital bus into a first receiving apparatus that receives data substantially through a transmission line of said first connection mode and a second receiving apparatus that receives data substantially through a transmission line of said second connection mode at a predetermined timing; wherein the plurality of electronic apparatus connected to said digital bus are categorized into first and second receiving apparatus by inquiring whether each electronic apparatus connected to said digital bus includes a monitor apparatus to display a supplied signal; and transmission line securing means for securing a transmission line of said first connection mode for each of said first receiving apparatus that receive data substantially through a transmission line of said first connection mode and based on the status of whether a default channel for an electronic apparatus having said monitor apparatus is used or occupied by another apparatus; and for allocating the transmission lines other than said transmission line secured for said first connection mode to said second connection mode.

38. The information transmission system as claimed in claim 37, wherein:

a transmission line of said first connection mode is previously set to each said first receiving apparatus, and said transmission line securing means of said electronic apparatus allocates a transmission line different from said previously set transmission line to said first transmission apparatus when data that said first receiving apparatus cannot process is found on the previous set transmission line of said first receiving apparatus.

39. The information transmission system as claimed in claim 37, wherein said transmission line securing means of said electronic apparatus changes the transmission line that is to be allocated to said first receiving apparatus when the transmission line is exclusively occupied by another apparatus.

40. The information transmission system as claimed in claim 39, wherein:

a transmission line of said first connection mode is previously set to each of said first receiving apparatus, said transmission line securing means of said electronic apparatus refers each setting information of said first receiving apparatus connection to said digital bus, and when the transmission line that is to be allocated to said first receiving apparatus has been already allocated to another electronic apparatus, changes the transmission line that is to be allocated to the first receiving apparatus.

41. An electronic apparatus connected to a digital bus having a plurality of transmission lines operable in a first connection mode and a second connection mode wherein in said first connection mode, a first transmission line that transmits data sent out from one electronic apparatus so as to be receivable for all other electronic apparatus connected to said digital bus is formed, and in said second connection mode, a second transmission line that transmits data between only two predetermined electronic apparatuses and does not accept data transmitted from other electronic apparatus is formed, said electronic apparatus comprise:

apparatus classification means for categorizing each of said plurality of electronic apparatus connected to said digital bus into a first receiving apparatus that receives data substantially through a transmission line of said first connection mode and a second receiving apparatus that receives data substantially through a transmission line of said second connection mode, wherein the plurality of electronic apparatus connected to said digital bus are categorized into first and second receiving apparatus by inquiring whether each electronic apparatus connected to said digital bus includes a monitor apparatus to display a supplied signal; and transmission line securing means for securing some of said plurality of transmission lines for said first connection mode based on the status of whether a default channel for an electronic apparatus having said monitor apparatus is used or occupied by another apparatus and for allocating the remaining transmission lines of said digital bus to said second connection mode;

wherein the connection mode of each transmission line is pre-selected before the transmission lines are formed.

42. The electronic apparatus as claimed in claim 41, wherein said transmission line securing means secures a plurality of transmission lines for said first connection mode correspondingly to the number of said first receiving apparatus connected to said digital bus.

43. The electronic apparatus as claimed in claim 41, wherein, in the case that said first receiving apparatus functions to receive data through another transmission line while said first receiving apparatus is receiving data through one transmission line, said transmission line securing means secures a plurality of transmission lines for said first connection mode correspondingly to the number of said first receiving apparatus obtained on the assumption that there is said first receiving apparatus on every receivable transmission line.

44. The electronic apparatus as claimed in claim 41, wherein:

there is provided first detection means for detecting the necessity to classify the electronic apparatus into said first receiving apparatus and said second receiving apparatus and the necessity to secure the transmission line, said electronic apparatus classification means classifies the electronic apparatus when said first detection means detects the necessity to classify the electronic apparatus into said first receiving apparatus and said second receiving apparatus and the necessity to secure the transmission line, and said transmission line securing means secures a transmission line when said first detection means detects the necessity to classify the electronic apparatus into said first receiving apparatus and said second receiving apparatus and the necessity to secure the transmission line.

45. The electronic apparatus as claimed in claim 44, wherein said first detection means detects the attaching of an electronic apparatus to said digital bus or detaching of an electronic apparatus from said digital bus.

46. The electronic apparatus as claimed in claim 44, wherein said first detection means of said electronic apparatus detects an execution instruction input for instructing classification of the electronic apparatus into said first receiving apparatus and said second electronic apparatus and securing a transmission line.

47. An electronic apparatus connected to a digital bus having a plurality of transmission lines operable in a first connection mode and second connection mode wherein in said first connection mode, at least one transmission line that transmits data sent out from one electronic apparatus so as to be receivable for all other electronic apparatus connected to said digital bus is formed, and in said second connection mode, at least one transmission line that transmits data between only two predetermined electronic apparatuses and does not accept data transmitted from any other electronic apparatus is formed, said electronic apparatus connected to said digital bus comprises:

apparatus classification means for categorizing said plurality of electronic apparatus connected to said digital bus into a first receiving apparatus that receives data substantially through a transmission line of said first connection mode and a second receiving apparatus that receives data substantially through a transmission line of said second connection mode at predetermined timing periods; wherein the plurality of electronic apparatus connected to said digital bus are categorized into first and second receiving apparatus by inquiring whether each electronic apparatus connected to said digital bus includes a monitor apparatus to display a supplied signal; and transmission line securing means for securing a transmission line of said first connection mode for each of said first receiving apparatus that receives data substantially through a transmission line of said first connection mode and based on the status of whether a default channel for an electronic apparatus having said monitor apparatus is used or occupied by another apparatus; and for allocating the remaining transmission lines of said digital bus to said second connection mode;

wherein the connection mode of each transmission line is pre-selected before being formed.

48. The electronic apparatus as claimed in claim 47, wherein:

transmission line of said first connection mode is previously set to each said first receiving apparatus, and said transmission line securing means allocates a transmission line different from said previously set transmission line to said first transmission apparatus when data that said first receiving apparatus cannot process is found on the previous set transmission line of said first receiving apparatus.

49. The electronic apparatus as claimed in claim 47, wherein said transmission line securing means changes the transmission line that is to be allocated to said first receiving apparatus when the transmission line that is to be allocated to said first receiving apparatus is exclusively occupied by another apparatus.

50. The electronic apparatus as claimed in claim 49, wherein:

a transmission line of said first connection mode is previously set to each of said first receiving apparatus, said transmission line securing means refers each setting information of said first receiving apparatus connection to said digital bus, and when the transmission line that is to be allocated to said first receiving apparatus has been already allocated to another electronic apparatus, changes the transmission line that is to be allocated to the first receiving apparatus.

* * * * *